(12) United States Patent
Takada et al.

(10) Patent No.: US 6,545,810 B1
(45) Date of Patent: Apr. 8, 2003

(54) IMAGE PICKUP OPTICAL SYSTEM AND IMAGE PICKUP APPARATUS USING THE SAME

(75) Inventors: Katsuhiro Takada, Hachioji (JP); Takayoshi Togino, Koganei (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/035,747

(22) Filed: Mar. 6, 1998

(30) Foreign Application Priority Data

| Mar. 6, 1997 | (JP) | 9-051488 |
| Jul. 1, 1997 | (JP) | 9-175765 |
| Jun. 27, 1997 | (JP) | 9-172168 |
| Jun. 4, 1997 | (JP) | 9-146306 |

(51) Int. Cl.[7] ............................................. G02B 27/10
(52) U.S. Cl. ........................ 359/618; 359/627; 359/620
(58) Field of Search ................................. 359/618, 627, 359/628, 620, 621, 622, 637, 631, 633; 357/726, 728, 732, 733

(56) References Cited

U.S. PATENT DOCUMENTS

| 3,810,221 A | 5/1974 | Plummer ..................... 396/382 |
| 3,836,931 A | 9/1974 | Plummer ..................... 396/352 |
| 5,274,406 A | 12/1993 | Tejima et al. ................. 353/70 |
| 5,982,429 A | * 11/1999 | Kamamoto et al. ......... 348/333 |
| 6,166,866 A | * 12/2000 | Kimura et al. .............. 359/729 |
| 6,195,207 B1 | * 2/2001 | Takahashi .................... 359/637 |
| 6,201,648 B1 | * 3/2001 | Togino ......................... 359/728 |

FOREIGN PATENT DOCUMENTS

| JP | 59-84201 | 5/1984 |
| JP | 62-144127 | 6/1987 |
| JP | 62-205547 | 9/1987 |
| JP | 1-257834 | 10/1989 |
| JP | 8-292368 | 11/1996 |
| JP | 8-292371 | 11/1996 |
| JP | 8-292372 | 11/1996 |

* cited by examiner

Primary Examiner—Jordan M. Schwartz
Assistant Examiner—Tim Thompson
(74) Attorney, Agent, or Firm—Pillsbury Winthrop LLP

(57) ABSTRACT

A compact image pickup optical system capable of providing a clear image of minimal distortion even at a wide field angle, and an image pickup apparatus using such an image pickup optical system. The image pickup optical system forms an object image on the surface of an image pickup device (8). At least a rear optical unit (4) is provided on the image side of a pupil plane (1). The rear optical unit (4) has at least one reflecting surface decentered such that the whole surface is tilted with respect to an axial principal ray (2) defined by a light ray emanating from the object center and passing through the pupil center to reach the image center. The reflecting surface has a rotationally asymmetric surface configuration that corrects rotationally asymmetric decentration aberrations caused by decentration, thereby reducing rotationally asymmetric aberrations of the object image.

30 Claims, 14 Drawing Sheets

IMAGE PICKUP OPTICAL SYSTEM AND IMAGE PICKUP APPARATUS USING THE SAME

BACKGROUND OF THE INVENTION

The present invention relates to an image pickup optical system and an image pickup apparatus using the same. More particularly, the present invention relates to an optical system which is most suitable for an image pickup apparatus designed to form an image relatively small in size and in which at least one reflecting surface having an image-forming power required for image formation is decentered. The present invention also relates to an image pickup apparatus using such an optical system.

There has heretofore been known a compact reflecting decentered optical system as disclosed in Japanese Patent Application Unexamined Publication Number [hereinafter referred to as "JP(A)"] 59-84201. This is an invention of a one-dimensional light-receiving lens comprising a cylindrical reflecting surface; therefore, two-dimensional imaging cannot be effected with this conventional optical system. JP(A) 62-144127 discloses an optical system wherein the identical cylindrical surface is used twice to effect reflection in order to reduce spherical aberration in the above-mentioned invention.

JP(A) 62-205547 discloses the use of an aspherical reflecting surface as a reflecting surface, but makes no mention of the configuration of the reflecting surface.

U.S. Pat. Nos. 3,810,221 and 3,836,931 both disclose an example in which a rotationally symmetric aspherical mirror and a lens system having a surface which has only one plane of symmetry are used to constitute a finder optical system of a reflex camera. In this example, however, the surface having only one plane of symmetry is utilized for the purpose of correcting the tilt of a virtual image for observation.

JP(A) 1-257834 (U.S. Pat. No. 5,274,406) discloses an example in which a surface having only one plane of symmetry is used for a reflecting mirror to correct image distortion in a rear projection type television. In this example, however, a projection lens system is used for projection onto a screen, and the surface having only one plane of symmetry is used for correction of image distortion. An example of a back-coated mirror type decentered optical system using an anamorphic surface and a toric surface as an observation optical system is also disclosed. However, the decentered optical system is not sufficiently corrected for aberrations, including image distortion.

None of the above-described prior arts use a surface having only one plane of symmetry as a back-coated mirror to form a folded optical path.

JP(A) 8-292368, 8-292371 and 8-292372 each disclose an image pickup optical system (i.e. a fixed focal length optical system or a zoom optical system) using a surface having only one plane of symmetry as a reflecting surface. However, the disclosed image pickup optical system has an unfavorably long optical path length from an entrance surface of an optical system constituent element including a rotationally asymmetric surface to an exit surface thereof or from a rotationally asymmetric surface of the optical system that is closest to the object to a rotationally asymmetric surface thereof that is closest to the image (in an example, image formation takes place once in the course of travel of light along the optical path). This causes the optical system to increase in size. Therefore, there is no merit in using rotationally asymmetric surfaces, which are difficult to produce.

In the conventional rotationally symmetric optical systems, a transmitting rotationally symmetric lens having refracting power is assigned to exert the required refracting power. Therefore, many constituent elements are needed for aberration correction. In the conventional decentered optical systems, however, an imaged figure or the like is undesirably distorted and the correct shape cannot be recorded unless the formed image is favorably corrected for aberrations, particularly rotationally asymmetric distortion.

In a rotationally symmetric optical system comprising a refracting lens which is formed from a surface rotationally symmetric about an optical axis, a straight-line optical path is formed. Therefore, the entire optical system undesirably lengthens in the direction of the optical axis, resulting in an unfavorably large-sized image pickup apparatus.

SUMMARY OF THE INVENTION

In view of the problems associated with the prior arts, an object of the present invention is to provide a compact image pickup optical system capable of providing a clear image of minimal distortion even at a wide field angle and also provide an image pickup apparatus using such an image pickup optical system.

To attain the above-described object, the present invention provides an image pickup optical system for forming an image of an object on a surface of an image pickup device. The image pickup optical system has at least a rear optical unit on the image side of a pupil plane. The rear optical unit has at least one reflecting surface decentered such that the whole surface is tilted with respect to an axial principal ray defined by a light ray emanating from the center of the object and passing through the center of the pupil to reach the center of the image. The reflecting surface has a rotationally asymmetric surface configuration that corrects rotationally asymmetric decentration aberrations caused by decentration, thereby reducing rotationally asymmetric aberrations of the object image.

In this case, the reflecting surface may be formed from a totally reflecting surface or a semitransparent reflecting surface so as to have both transmitting and reflecting actions. The reflecting surface may be formed from a coated mirror surface.

It is desirable for the rear optical unit to further have at least a second reflecting surface disposed to face the first reflecting surface.

Moreover, assuming that a direction in which the axial principal ray travels until it reaches a first surface of the optical system is defined as a Z-axis direction, and a Y-axis direction is taken in the plane of decentration of decentered surfaces, and further an axis constituting an orthogonal coordinate system in combination with the Y- and Z-axes is defined as an X-axis, and further that the axial principal ray and a light ray which is parallel to the axial principal ray at a slight distance d in the Y-axis direction are made to enter the optical system from the entrance surface side thereof, and the sine of an angle formed between the two rays in the YZ-plane at the exit side of the optical system is denoted by NA'yi, and further that a value obtained by dividing NA'yi by the distance d between the parallel rays, i.e. NA'yi/d, is defined as a power Py in the Y-axis direction of the optical system, and p is an optical path length from a point at which the axial principal ray enters a constituent element of the optical system disposed closest to the object and having a rotationally asymmetric surface to a point at which the axial principal ray exits from a constituent element of the optical system disposed closest to the image and having a rotationally asymmetric surface, it is desirable to satisfy the following condition:

$$0.1 < px Py < 8 \tag{1}$$

First of all, a coordinate system used in the following description will be explained.

As shown in FIG. 12, it is assumed that a light ray passing through the center of an object point and passing through the center of a stop 1 to reach the center of an image plane 8 is defined as an axial principal ray 2. It is also assumed that an optical axis defined by a straight line along which the axial principal ray 2 travels until it intersects the first surface of the optical system is defined as a Z-axis, and that an axis perpendicularly intersecting the Z-axis in the decentration plane of decentered surfaces constituting the image pickup optical system is defined as a Y-axis, and further that an axis perpendicularly intersecting the Z-axis and also perpendicularly intersecting the Y-axis is defined as an X-axis.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole. On the other hand, aspherical surfaces and the like are used to favorably effect aberration correction with a minimal number of surfaces. The reason for this is to reduce various aberrations which would be produced by spherical surfaces. However, in a decentered optical system, rotationally asymmetric aberrations due to decentration cannot be corrected by a rotationally symmetric optical system.

The arrangement and operation of the present invention will be described below.

When a rotationally symmetric optical system is decentered, rotationally asymmetric aberrations occur, and it is impossible to correct these aberrations only by a rotationally symmetric optical system. Rotationally asymmetric aberrations due to decentration include image distortion, curvature of field, and astigmatic and comatic aberrations, which occur even on the axis. FIG. 13 shows curvature of field produced by a decentered concave mirror M. FIG. 14 shows astigmatism produced by a decentered concave mirror M. FIG. 15 shows axial comatic aberration produced by a decentered concave mirror M. Accordingly to the present invention, a rotationally asymmetric surface is disposed in the optical system to correct such rotationally asymmetric aberrations caused by decentration.

Rotationally asymmetric aberrations produced by a decentered concave mirror include rotationally asymmetric curvature of field. For example, when light rays from an infinitely distant object point are incident on a decentered concave mirror, the light rays are reflected by the concave mirror to form an image. In this case, the back focal length from that portion of the concave mirror on which the light rays strike to the image surface is a half the curvature of the portion on which the light rays strike. Consequently, an image surface tilted with respect to the axial principal ray is formed as shown in FIG. 13. It has heretofore been impossible to correct such rotationally asymmetric curvature of field by a rotationally symmetric optical system. The tilted curvature of field can be corrected by forming the concave mirror M from a rotationally asymmetric surface, and, in this example, arranging it such that the curvature is made strong (refracting power is increased) in the positive Y-axis direction (the upward direction in the figure), whereas the curvature is made weak (refracting power is reduced) In the negative Y-axis direction (the downward direction in the figure). It is also possible to obtain a flat image surface with a minimal number of constituent surfaces by disposing a rotationally asymmetric surface having the same effect as that of the above-described arrangement in the optical system separately from the concave mirror M.

Next, rotationally asymmetric astigmatism will be explained. A decentered concave mirror M produces astigmatism even for axial rays, as shown in FIG. 14, as in the case of the above. The astigmatism can be corrected by appropriately changing the curvatures in the X- and Y-axis directions of the rotationally asymmetric surface as in the case of the above.

Rotationally asymmetric coma will be explained below. A decentered concave mirror M produces coma even for axial rays, as shown in FIG. 15, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

If the image pickup optical system according to the present invention is arranged to have a folded optical path, it is possible to impart power to a reflecting surface and hence possible to omit a transmission lens. Moreover, because the optical path is folded, the optical system can be formed in a compact structure.

If the reflecting surface is a totally reflecting surface tilted with respect to light rays so that the light rays are incident thereon at an angle exceeding the critical angle, a high reflectivity can be obtained, and it is possible to enable the surface to have both reflecting and transmitting actions. The reflecting surface is preferably a reflecting surface having a thin film of a metal, e.g. aluminum or silver, formed thereon, or a reflecting surface formed from a dielectric multilayer film, or a semitransparent reflecting surface. In the case of a metal thin film having reflecting action, a high reflectivity can be readily obtained. The use of a dielectric reflecting film is advantageous in a case where a reflecting film having wavelength selectivity or a reflecting film having minimal absorption is to be formed.

It is preferable to use a rotationally asymmetric surface as a reflecting surface. By doing so, no chromatic aberration is produced in contrast to a case where it is used as a transmitting surface. Moreover, even if the tilt of the surface is small, the surface can bend light rays. Accordingly, the amount of other aberrations produced by the surface is also small. In other words, when the same refracting power is to be obtained, the amount of aberration produced by a reflecting surface is smaller than by a refracting surface.

Regarding an optical system designed to form an image relatively small in size as in the image pickup optical system according to the present invention, the optical system can be made compact in size on drawings by the principle of coefficient multiplication. However, in view of the actual production, it is not preferable to make the image pickup optical system excessively small in size because the thickness of the edge and center of the lens would be excessively reduced and the lens diameter would become excessively small, causing the production cost to increase unfavorably. In the case of a conventional optical system comprising a refracting lens system, if the optical system is constructed in conformity to a producible size, an unfavorably long distance must be ensured between refracting surfaces having power because the optical axis is straight, resulting in a waste of space. If the optical axis is spatially folded by using reflecting surfaces, an optical path necessary for image formation can be ensured by effectively utilizing a relatively small space. In this case, if the optical path length of the image pickup optical system is unnecessarily long, the optical system increases in size contrary to the purpose of effectively using the space by employing an arrangement in which the optical axis is folded by decentration. In addition, if the optical path length is excessively long in comparison to the image formed by the optical system, it is difficult to ensure the back focus required for disposing a member for capturing an optical image, e.g. a film or an image pickup device.

According to the present invention, a compact optical system is successfully constructed by adopting a folded optical path and, at the same time, satisfying the following conditions.

That is, in the image pickup optical system according to the present invention, it is desirable for the rear optical unit to further have at least a second reflecting surface disposed to face the first reflecting surface.

Moreover, assuming that a direction in which the axial principal ray travels until it reaches a first surface of the optical system is defined as a Z-axis direction, and a Y-axis direction is taken in the plane of decentration of decentered surfaces, and further an axis constituting an orthogonal coordinate system in combination with the Y- and Z-axes is defined as an X-axis, and further that the axial principal ray and a light ray which is parallel to the axial principal ray at a slight distance d in the Y-axis direction are made to enter the optical system from the entrance surface side thereof, and the sine of an angle formed between the two rays in the YZ-plane at the exit side of the optical system is denoted by NA'yi, and further that a value obtained by dividing NA'yi by the distance d between the parallel rays, i.e. NA'yi/d, is defined as a power Py in the Y-axis direction of the optical system, and p is an optical path length from a point at which the axial principal ray enters an optical system constituent element of the optical system disposed closest to the object and having a rotationally asymmetric surface to a point at which the axial principal ray exits from an optical system constituent element of the optical system disposed closest to the image and having a rotationally asymmetric surface, it is desirable to satisfy the following condition:

$$0.1 < p \times Py < 8 \tag{1}$$

First, let us define the power of the optical system according to the present invention. As shown in FIG. 16, when the direction of decentration of the optical system is taken in the Y-axis direction, the axial principal ray 2 and a light ray which is parallel to the axial principal ray 2 and which has a small height d in the YZ-plane are made to enter the optical system from the object side thereof, and the sine of an angle formed between the two rays in the YZ-plane at the exit side of the optical system is denoted by NA'yi. Further, NA'yi/d is defined as the power Py in the Y-axis direction of the entire optical system. Similarly, the axial principal ray 2 and a light ray which is parallel to the axial principal ray 2 and which has a small height d in the XZ-plane are made to enter the optical system from the object side thereof, and the sine of an angle formed between the two rays in a plane perpendicular to the YZ-plane and containing the emergent axial principal ray 2 at the exit side of the optical system is denoted by NA'xi. Further, NA'xi/d is defined as the power Px in the X-axis direction of the entire optical system.

Further, assuming that p is an optical path length from a point at which the axial principal ray enters a constituent element of the optical system disposed closest to the object and having a rotationally asymmetric surface to a point at which the axial principal ray exits from a constituent element of the optical system disposed closest to the image and having a rotationally asymmetric surface (in FIG. 16, the two optical system constituent elements form the same decentered prism optical system 4; therefore, p is the optical path length of the axial principal ray 2 in the decentered prism optical system 4), it is desirable to arrange the optical system so as to satisfy the above condition (1) from the viewpoint of forming the optical system in a compact structure.

It is more desirable to satisfy the following condition:

$$0.5 < p \times Py < 5.0 \tag{1'}$$

By satisfying the above condition (1)', a compact lens system can be attained.

It is even more desirable to satisfy the following condition:

$$0.5 < p \times Py < 0.7 \tag{1''}$$

By satisfying the above condition (1)", an even more compact lens system can be attained.

If the optical system constituent elements having rotationally asymmetric surfaces in the image pickup optical system according to the present invention are formed from a first and second reflecting surfaces and a first and second transmitting surfaces, the optical axis can be folded by the two reflecting surfaces, and thus the optical system can be made compact in size. Further, because there are two transmitting surfaces, even more favorable results can be obtained with respect to the principal point position and curvature of field.

Further, if the two reflecting surfaces are back-coated mirrors, even more favorable aberration correcting performance can be obtained.

Incidentally, if the pupil is not positioned outside the optical system on the object side, the optical system becomes large in size, and the optical path length p becomes excessively long. Alternatively, it becomes difficult to ensure the required back focus. Further, if a decentered rotationally asymmetric surface is assigned an excessively strong power, it becomes difficult to correct asymmetric aberrations caused by decentration, particularly comatic aberrations due to decentration. Therefore, it is useful for improving the optical performance to assign a part of the power to an optical system additionally disposed on the object side of the rotationally asymmetric surface.

In a case where a stop is disposed on the object side of an optical system constituent element having a rotationally asymmetric surface, it is useful for protecting the stop member to dispose an optical member on the object side of the stop. In a case where a reflecting surface is formed from a surface-coated mirror, the provision of such an optical member is useful as a dustproof measure.

In the image pickup optical system according to the present invention, decentration aberrations can be corrected by a decentered rotationally asymmetric surface, and it is preferable to dispose an optical member on the object side of the decentered rotationally asymmetric surface so that the optical member performs overall aberration correction in combination with the decentered rotationally asymmetric reflecting surface. In this case, if the optical member is decentered, aberration correction can be uniformly made. Therefore, it is preferable to decenter the optical member from the viewpoint of favorably correcting asymmetric aberrations.

In the image pickup optical system according to the present invention, if the number of surfaces of optical system constituent elements having decentered rotationally asymmetric reflecting surfaces is reduced or the optical system constituent elements are constructed in the form of a prism block, the optical system becomes large in size unless the stop is positioned outside the optical system on the object side. In this case, all the powers deviate to the image side relative to the stop. Correction of distortion needs both negative and positive powers. If the negative power is made excessively strong, the optical system becomes large in size, and the optical path length increases unfavorably. Therefore, it is preferable to dispose a positive lens on the object side of the stop to thereby correct distortion. In a case where the optical system constituent elements having decentered rotationally asymmetric reflecting surfaces are formed as a prism block, it becomes difficult to correct chromatic aberration produced to an extent by transmitting surfaces; the chromatic aberration can be effectively corrected by disposing a positive lens on the object side of the stop. To correct asymmetric aberrations in particular, it is preferable to decenter the positive lens.

When it is intended to construct a wide-angle lens system having a particularly wide field angle, the focal length shortens, making it difficult to ensure the required back focus. In such a case, it is preferable to adopt a retrofocus type in which a negative power and a positive power are distributed in order from the object side. Moreover, it is preferable to strengthen the negative power and to widen the distance between the negative and positive lens units as much as possible. However, if a negative power is given to a decentered rotationally asymmetric surface, decentration aberrations become so large that they are difficult to correct. In particular, it is difficult to correct the asymmetry of coma.

Therefore, it is preferable to dispose a concave lens on the object side, assign the negative power to an ordinary refracting lens, widen the distance between the negative and positive lens units and fold the optical axis to thereby arrange the optical system in a compact form.

In a case where the optical system constituent elements having decentered rotationally asymmetric reflecting surfaces are constructed in the form of a single block and a stop is provided, it is preferable to provide the stop on the object side of the block from the viewpoint of avoiding an increase in the size of the block. In this case, it is preferable to dispose on the object side of the stop an optical member which serves also as a stop protecting device and whose optical power is approximately zero. In a case where an electronic image pickup device is used, the back focus can be effectively shortened by imparting an optical low-pass filter function to a surface, for example, by a method wherein the area in the surface is divided into regions, and a small amount of tilt is given to the surface for each region, thereby providing the surface with the function of slightly changing the travel direction of light.

Assuming that $\Delta\theta$ and $\Delta h$ are the amounts of change in angle and position, respectively, of the axial principal ray introduced between the entrance into and the exit from a front optical unit disposed on the object side of the optical system constituent elements having decentered rotationally asymmetric reflecting surfaces, it is desirable to satisfy at least one of the following conditions (2) and (3):

$$0.1°<\Delta\theta<45° \quad (2)$$

$$0<\Delta h \times Py<1.0 \quad (3)$$

where $Py$ is the power in the Y-axis direction of the optical system.

If $\Delta\theta$ is not larger than the lower limit of the condition (2) or $\Delta h \times Py$ is not larger than the lower limit of the condition (3), there is no sense in decentering the surfaces. If $\Delta\theta$ is not smaller than the upper limit of the condition (2) or $\Delta h \times Py$ is not smaller than the upper limit of the condition (3), decentration aberrations at each part become excessively large and hence difficult to correct.

It is more desirable to satisfy at least one of the following conditions (2)' and (3)':

$$1°<\Delta\theta<30° \quad (2)'$$

$$0.005<\Delta h \times Py<0.5 \quad (3)'$$

Incidentally, if the first reflecting surface and second transmitting surface of the optical system constituent elements having decentered rotationally asymmetric reflecting surfaces are arranged to be the identical surface, the number of surfaces to be formed is three, and the productivity improves.

If the first reflecting surface is arranged to use total reflection as reflection taking place at it, a high reflectivity can be obtained as described above, and the loss of light can be minimized. In addition, the production becomes easy when the reflecting and transmitting surfaces are arranged to be the identical surface.

It is possible to expect reduction in the size and cost of the optical system through a reduction in the number of components by arranging the optical system constituent elements having decentered rotationally asymmetric reflecting surfaces in the form of a single block.

It is desirable that a rotationally asymmetric reflecting surface should be formed as a back-coated mirror of an optical material which has the function of a wavelength selecting device and that the wavelength selecting device should have an infrared cutoff function and further that the mole percentage a of CuO contained in the optical material should satisfy the following condition:

$$a<1 \quad (4)$$

Infrared cutoff filters and so forth can be produced by mixing impurities such as copper. However, as the impurity content increases, it becomes difficult to control the wavelength selectivity. Therefore, the lower the impurity content, the easier the production. It is common practice to use a fluorophosphate network for the purpose of improving the resistance of glass containing a large amount of copper or the like, and if the impurity content can be reduced, it is possible to adopt a network structure of high resistance effectively. However, if the impurity content is reduced, the thickness of the filter must be increased in order to ensure the wavelength selectivity, and this causes the lens system to increase in size because an extra space must be ensured.

In an optical system in which the optical axis is folded as in the present invention, an optical path length longer than the actual thickness of the optical system can be obtained; therefore, effective wavelength selecting characteristics can be attained by a reduced impurity content. The copper content may be adjusted according to the optical path length of each particular optical system designed. However, it is particularly desirable to satisfy the following condition:

$$a<1 \quad (4)$$

where a is the mole percentage of CuO.

It is more desirable to satisfy the following condition:

$$1 \times 10^{-5}<a<1 \quad (4)'$$

It is even more desirable to satisfy the following condition:

$$1\times10^{-5} < a < 0.5 \quad (4)''$$

In the image pickup optical system according to the present invention, it is desirable that at least one reflecting surface having a decentered rotationally asymmetric surface configuration should use a plane-symmetry free-form surface having only one plane of symmetry. A free-form surface (FFS) used in the present invention may be defined by the following equation:

$$Z = C_2 + C_3 y + C_4 x + C_5 y^2 + C_6 yx + C_7 x^2 + C_8 y^3 + C_9 y^2 x + \quad (a)$$
$$C_{10} yx^2 + C_{11} x^3 + C_{12} y^4 + C_{13} y^3 x + C_{14} y^2 x^2 + C_{15} yx^3 +$$
$$C_{16} x^4 + C_{17} y^5 + C_{18} y^4 x + C_{19} y^3 x^2 + C_{20} y^2 x^3 + C_{21} yx^4 +$$
$$C_{22} x^5 + C_{23} y^6 + C_{24} y^5 x + C_{25} y^4 x^2 + C_{26} y^3 x^3 + C_{27} y^2 x^4 +$$
$$C_{28} yx^5 + C_{29} x^6 + C_{30} y^7 + C_{31} y^6 x + C_{32} y^5 x^2 + C_{33} y^4 x^3 +$$
$$C_{34} y^3 x^4 + C_{35} y^2 x^5 + C_{36} yx^6 + C_{37} x^7 \ldots$$

where $C_m$ (m is an integer of 2 or higher) are coefficients.

In general, the above-described free-form surface does not have planes of symmetry in both the XZ- and YZ-planes. In the present invention, a free-form surface having only one plane of symmetry parallel to the YZ-plane is obtained by making all terms with odd-numbered powers of x zero. For example, in the above defining equation (a), the coefficients of the terms $C_4$, $C_6$, $C_9$, $C_{11}$, $C_{13}$, $C_{15}$, $C_{18}$, $C_{20}$, $C_{22}$, $C_{24}$, $C_{26}$, $C_{28}$, $C_{31}$, $C_{33}$, $C_{35}$, $C_{37}$, ... are set equal to zero. By doing so, it is possible to obtain a free-form surface having only one plane of symmetry parallel to the YZ-plane.

A free-form surface having only one plane of symmetry parallel to the XZ-plane is obtained by making all terms with odd-numbered powers of y zero. For example, in the above defining equation (a), the coefficients of the terms $C_3$, $C_6$, $C_8$, $C_{10}$, $C_{13}$, $C_{15}$, $C_{17}$, $C_{19}$, $C_{21}$, $C_{24}$, $C_{26}$, $C_{28}$, $C_{30}$, $C_{32}$, $C_{34}$, $C_{36}$, ... are set equal to zero. By doing so, it is possible to obtain a free-form surface having only one plane of symmetry parallel to the XZ-plane. The use of a free-form surface having such a plane of symmetry makes it possible to improve the productivity.

Rotationally asymmetric aberrations due to decentration can be effectively corrected by using a free-form surface having either a plane of symmetry parallel to the YZ-plane or a plane of symmetry parallel to the XZ-plane.

It should be noted that the above defining equation is shown as merely an example, and that the feature of the present invention resides in that rotationally asymmetric aberrations due to decentration are corrected by a rotationally asymmetric surface having only one plane of symmetry. Therefore, the same advantageous effect can be obtained for any other defining equation.

In a case where the rear optical unit has a first transmitting surface, a first reflecting surface, a second reflecting surface and a second transmitting surface, and the first and second reflecting surfaces each have a rotationally asymmetric surface configuration, and where at least one of the first and second reflecting surfaces is formed from a plane-symmetry free-form surface having only one plane of symmetry, and the first reflecting surface and the second transmitting surface are formed from a common surface, if a strong power is given to this surface, chromatic aberrations occur to a considerable extent. It would be good if a region used as the first reflecting surface and a region used as the second transmitting surface can be substantially isolated from each other. However, if the two regions are isolated from each other, the prism block that constitutes the rear optical unit increases in size. Therefore, the area where the first reflecting surface and the second transmitting surface overlap each other inevitably enlarges. Accordingly, it is preferable not to give a strong power to the common surface from the viewpoint of facilitating the control for enabling the action at the first reflecting surface and the action at the second transmitting surface to be compatible with each other. More specifically, assuming that the only one plane of symmetry of the plane-symmetry free-form surface is a YZ-plane, and a direction perpendicularly intersecting the plane is defined as an X-axis direction, and further that Px1 and Px2 are powers in the X-axis direction in the vicinities of intersections between the axial principal ray on the one hand and the first and second reflecting surfaces on the other, it is desirable to satisfy the following condition:

$$|Px1| < |Px2| \quad (5)$$

It is more desirable to satisfy the following condition:

$$1 < |Px2/Px1| < 20 \quad (6)$$

If |Px2/Px1| is not smaller than the upper limit of the condition (6), i.e. 20, the power of the second reflecting surface becomes extremely strong, making it impossible to ensure the required back focus. Moreover, the surface configuration becomes more complicated unfavorably to correct aberrations. It is even more desirable to satisfy the following condition:

$$1.1 < |Px2/Px1| < 10 \quad (6)'$$

It is still more desirable to satisfy the following condition:

$$2.0 < |Px2/Px1| < 5 \quad (6)''$$

Assuming that Px3 is the power in the X-axis direction in the vicinity of an intersection between the axial principal ray and the second transmitting surface, it is desirable to satisfy the following condition:

$$|Px3/Px2| < 0.5 \quad (7)$$

It should be noted that if the second transmitting surface has a plurality or infinite number of planes of symmetry, a plane that forms the smallest angle with the only one plane of symmetry of the second reflecting surface among those planes is defined as the plane of symmetry of the second transmitting surface. That is, if a strong power is given to the second transmitting surface, distortion and chromatic aberrations occur to a considerable extent unfavorably. Therefore, it is desirable to satisfy the condition (7):

It is more desirable to satisfy the following condition:

$$|Px3/Px2| < 0.2 \quad (7)'$$

Assuming that the only one plane of symmetry of the plane-symmetry free-form surface is a YZ-plane, and a direction perpendicularly intersecting the plane is defined as an X-axis direction, and further that DY is a difference between the value of the tangent of a line normal to the surface in the YZ-plane at a position where a principal ray at the maximum field angle in the X-axis direction impinges on the surface and the value of the tangent of a line normal to the surface in the YZ-plane at a position where the axial principal ray impinges on the surface, it is desirable to satisfy the following condition:

$$0 \leq |DY| < 0.1 \tag{8}$$

The condition (8) relates to a bow-shaped rotationally asymmetric image distortion in which a horizontal line, for example, is undesirably curved in a bow shape when imaged. Assuming that, as shown in the perspective view of FIG. 17(a) and FIG. 17(b), which is a projection of FIG. 17(a) onto the YZ-plane, DY denotes the difference between the value of the tangent in the YZ-plane of a line n' normal to a rotationally asymmetric surface A at a point where a principal ray at the maximum field angle in the direction X intersects the rotationally asymmetric surface A and the value of the tangent in the YZ-plane of a line n normal to the rotationally asymmetric surface A at a point where the axial principal ray intersects the rotationally asymmetric surface A, it is important to satisfy the condition (8). If |DY| is smaller than the lower limit of the condition (8), i.e. 0, it becomes impossible to correct the bow-shaped image distortion. If |DY| is not smaller than the upper limit, i.e. 0.1, the bow-shaped image distortion is over-corrected. In either case, the image is distorted in a bow shape.

It is more desirable to satisfy the following condition:

$$0 \leq |DY| < 0.01 \tag{8'}$$

Assuming that a direction in which the axial principal ray travels until it reaches the first surface of the optical system is a Z-axis direction, and the only one plane of symmetry of the plane-symmetry free-form surface is a YZ-plane, and further a direction perpendicularly intersecting the YZ-plane is an X-axis direction, and further that Cxn is the difference between the curvature in the X-axis direction of a portion of the surface at which a principal ray at the maximum field angle in the positive direction of the Y-axis impinges on the surface and the curvature in the X-axis direction of a portion of the surface at which a principal ray at the maximum field angle in the negative direction of the Y-axis impinges on the surface, and Pxn is the power in the X-axis direction of a portion of the surface at which the axial principal ray impinges on the surface, it is important to satisfy the following condition:

$$0 \leq |Cxn/Pxn| < 10 \tag{9}$$

The condition (9) relates to a trapezoidal image distortion. If |Cxn/Pxn| is not smaller than the upper limit of the condition (9), i.e. 10, a trapezoidal distortion occurs to a considerable extent and becomes difficult to correct by another surface.

It is more desirable to satisfy the following condition:

$$0 \leq |Cxn/Pxn| < 1 \tag{9'}$$

If the rotationally asymmetric surface is a plane-symmetry free-form surface which is disposed in a decentered optical system and which has a plane of symmetry approximately coincident with the decentration plane of decentered surfaces, both sides of the plane of symmetry can be made symmetric. This makes it possible to favorably effect aberration correction and to improve the productivity to a considerable extent.

Assuming that Px is the power of the entire optical system in the X-axis direction, and Pxn is the power in the X-axis direction of that portion of the rotationally asymmetric surface on which the axial principal ray strikes, it is desirable from the viewpoint of aberration correction to satisfy the following condition:

$$0 < |Pxn/Px| < 100 \tag{10}$$

If |Pxn/Px| is not smaller than the upper limit of the condition (10), i.e. 100, the power of the rotationally asymmetric surface becomes excessively stronger than the power of the entire optical system. Consequently, the rotationally asymmetric surface has excessively strong refracting power, and aberrations produced by the rotationally asymmetric surface become impossible to correct by another surface. If |Pxn/Px| is not larger than the lower limit, i.e. 0, the power of the rotationally asymmetric surface in the X-axis direction becomes zero, and it becomes necessary to provide another surface that provides a power in the X-axis direction. Consequently, the number of necessary surfaces increases, which is contrary to the purpose of reducing the size of the optical system by using rotationally asymmetric surfaces in the present invention.

It is more desirable from the viewpoint of aberration correction to satisfy the following condition:

$$0.05 < |Pxn/Px| < 10 \tag{10'}$$

By satisfying the condition (10)', rotationally asymmetric aberrations can be corrected even more favorably.

Assuming that Py is the power of the entire optical system in the Y-axis direction, and Pyn is the power in the Y-axis direction of that portion of the rotationally asymmetric surface on which the axial principal ray strikes, it is desirable from the viewpoint of aberration correction to satisfy the following condition:

$$0 < |Pyn/Py| < 100 \tag{11}$$

The meanings of the lower limit 0 and the upper limit 100 of the condition (11) are the same as in the condition (10).

It is more desirable from the viewpoint of aberration correction to satisfy the following condition:

$$0 < |Pyn/Py| < 10 \tag{11'}$$

By satisfying the condition (11)', rotationally asymmetric aberrations can be corrected even more favorably. Assuming that Px and Py are the powers in the X- and Y-axis directions, respectively, of the entire optical system, it is desirable from the viewpoint of aberration correction to satisfy the following condition:

$$0.3 < |Px/Py| < 2 \tag{12}$$

If |Px/Py| is not larger than the lower limit of the condition (12), i.e. 0.3, or not smaller than the upper limit, i.e. 2, the focal lengths in the X- and Y-axis directions of the entire optical system become excessively different from each other, and it becomes difficult to favorably correct the image distortion. Consequently, the image is undesirably distorted.

It is more desirable from the viewpoint of aberration correction to satisfy the following condition:

$$0.8 < |Px/Py| < 1.2 \tag{12'}$$

By satisfying the condition (12)', rotationally asymmetric aberrations can be corrected even more favorably.

In the image pickup optical system according to the present invention, it is desirable that the transverse aberration of the optical system should be not more than 200 micrometers. In the optical system according to present invention, if the transverse aberration is not more than 200 micrometers, the aberration can be satisfactorily ignored. Thus, favorable image-formation performance can be obtained.

It is desirable that the image distortion of the image pickup optical system according to the present invention should be not more than 20%. In the optical system according to the present invention, if the image distortion is not more than 20%, the aberration can be satisfactorily ignored. Thus, favorable image-formation performance can be obtained.

It is preferable that the first transmitting surface should be a lens having a positive power with respect to transmitted light. If the first transmitting surface is such a lens, it is possible to suppress divergence of light rays at the first reflecting surface and hence possible to reduce the size of the first reflecting surface.

If the optical system is arranged such that light rays travel successively via the first transmitting surface, the first reflecting surface and the second transmitting surface, it is possible to form the first reflecting surface from a back-coated mirror. If the first reflecting surface is formed from a back-coated mirror, curvature of field can be corrected more favorably than in the case of a surface-coated mirror.

If either or both of the first and second transmitting surfaces are given a power of the same sign as that of the first reflecting surface, curvature of field can be corrected approximately completely.

On the other hand, if the powers of the first and second transmitting surfaces are made approximately zero, favorable effects can be produced on chromatic aberrations. That is, the first reflecting surface produces no chromatic aberration in theory and hence need not correct chromatic aberration with another surface. Therefore, the powers of the first and second transmitting surfaces are made approximately zero so that no chromatic aberration is produced by these surfaces. This makes it possible to construct an optical system having minimal chromatic aberration as a whole.

It is preferable that the rear optical unit should have, in order from the object side toward the image side thereof, at least a first transmitting surface, a first reflecting surface, a second reflecting surface and a second transmitting surface, and the first and second reflecting surfaces should be each formed from a rotationally asymmetric surface configuration. In this case, it is possible to vary the powers of the two reflecting surfaces. Accordingly, the principal point can be positioned in front of or behind the optical system by using a combination of a positive power and a negative power or a combination of a negative power and a positive power. This also makes it possible to produce favorable effects on the curvature of field.

Further, it is also possible to substantially eliminate field curvature by forming the two reflecting surfaces from back-coated mirrors. In the case of an electronic image pickup optical system requiring a long back focus in comparison to the focal length in particular, it is desirable to distribute a negative power to the object side or to give a negative power to the first reflecting surface. However, if a strong negative power is given to the first reflecting surface, distortion is aggravated. In such a case, if the first reflecting surface and the second transmitting surface are identical with each other, the negative power of the transmitting surface also becomes strong, causing chromatic aberrations to be aggravated. Therefore, it is preferable for the first reflecting surface to have a configuration in which a region used as a reflecting surface has a negative power, and in which the negative power weakens as the distance from a predetermined point in the region increases toward a region used as the second transmitting surface, and the second transmitting surface has a weak power. It should be noted that in a case where a negative power is distributed to the object side as stated above, the first reflecting surface should be arranged to have a weak positive or negative power.

In a case where the image pickup optical system according to the present invention is used as a taking lens of an electronic image pickup apparatus in which an image is formed on an electronic image pickup device, it is preferable to provide a function whereby distortion and lateral chromatic aberrations produced in the optical system are corrected by using a digital image processing technique on the basis of information concerning distortion and lateral chromatic aberrations of the optical system previously stored in a memory or the like in a processing part of the image pickup apparatus. By doing so, the amount of aberration to be corrected by the optical system reduces. Consequently, the load of correcting aberrations that is imposed on the optical system is reduced. This is particularly effective in the case of a compact taking lens arranged to exhibit satisfactory optical performance with a reduced number of lens constituent elements as in the present invention. The arrangement may be such that information concerning aberrations in the optical system is prepared in the form of data written in image processing software instead of storing the information in the processing part of a camera, and the software is installed in a processor, e.g. a personal computer, so that the image is subjected to image processing on the processor. This arrangement also provides the same function as the above.

It should be noted that the present invention includes an image pickup apparatus having an image pickup device provided to capture an object image formed by an image pickup optical system arranged as described above. In this case, the image pickup device is desirably an electronic image pickup device having the function of converting light received thereby into electrical information, and it is desirable for the image pickup apparatus to have an observation device for observing the object image captured by the electronic image pickup device.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
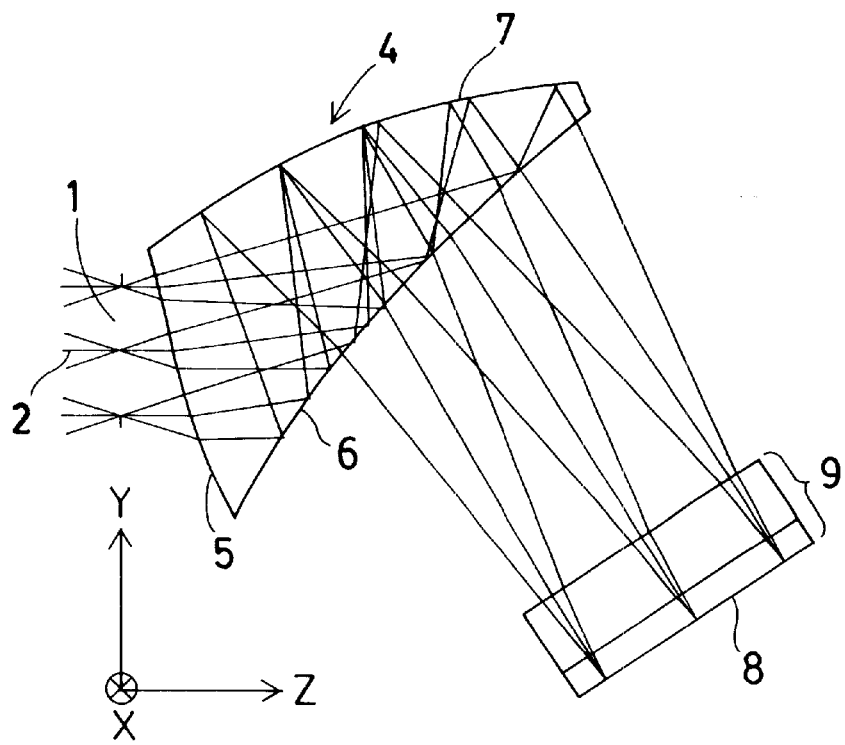
FIG. 1 is a sectional view of an image pickup optical system according to Example 1 of the present invention, taken along a plane containing an optical axis thereof.

Examples 1 to 10 of the image pickup optical system according to the present invention will be described below. Constituent parameters of each example will be described later. In constituent parameters in Examples 1 to 8, as shown in FIG. 1, one plane (the plane of a stop 1 in the case of FIG. 1) specified as a reference plane of the optical system is defined as the origin of decentration plane, and an axial principal ray 2 is defined by a light ray emanating from the center of an object (not shown) and passing through the center of the stop 1. A Z-axis is taken in a direction in which the light ray from the object center travels along the axial principal ray 2 until it reaches the first surface of the optical system. A plane containing both the Z-axis and the center of an image plane 8 is defined as a YZ-plane. A Y-axis is taken in a direction perpendicularly intersecting the Z-axis in the YZ-plane. A direction in which the Z-axis extends from the object point to the first surface of the optical system is defined as a positive direction of the Z-axis. The upward direction of the Y-axis as viewed in the figure (i.e. a direction in which light rays are reflected by a first reflecting surface 6) is defined as a positive direction of the Y-axis. An axis which constitutes a right-handed orthogonal coordinate system in combination with the Y- and Z-axes is defined as an X-axis.

In Examples 1 to 8, each surface is decentered in the YZ-plane, and the only one plane of symmetry of each rotationally asymmetric free-form surface is the YZ-plane.

Regarding decentered surfaces, each surface is given displacements (x, y and z, respectively) in the X-, Y- and Z-axis directions of the vertex position of the surface from the origin of the optical system and tilt angles of the center axis of the surface [the Z-axis of the above equation (a) in regard to free-form surfaces] with respect to the X-, Y- and Z-axes [$\alpha$, $\beta$ and $\gamma$ (°), respectively]. In this case, positive $\alpha$ and $\beta$ mean counterclockwise rotation relative to the positive directions of the corresponding axes, and positive $\gamma$ means clockwise rotation relative to the positive direction of the Z-axis.

Among optical surfaces constituting the optical systems according to Examples 1 to 8, each pair of adjacent surfaces which form a coaxial system is given a surface separation. In addition, the refractive index of each medium, together with Abbe's number, is given according to the conventional method.

The surface configuration of each free-form surface is defined by the above equation (a). The Z-axis of the defining equation (a) is the axis of a free-form surface.

It should be noted that terms concerning aspherical surfaces for which no data is shown are zero. The refractive index is expressed by the refractive index for the spectral d-line (wavelength: 587.56 nanometers). Lengths are given in millimeters.

Free-form surfaces may also be defined by Zernike polynomials. That is, the configuration of a free-form surface may be defined by the following equation (b). The Z-axis of the defining equation (b) is the axis of the Zernike polynomial.

$$X = R \times \cos(A) \qquad (b)$$

$$Y = R \times \sin(A)$$

$$Z = D_2 + D_3 R \cos(A) + D_4 R \sin(A) + D_5 R^2 \cos(2A) +$$
$$D_6(R^2 - 1) + D_7 R^2 \sin(2A) + D_8 R^3 \cos(3A) +$$
$$D_9(3R^3 - 2R)\cos(A) + D_{10}(3R^3 - 2R)\sin(A) +$$
$$D_{11} R^3 \sin(3A) + D_{12} R^4 \cos(4A) +$$
$$D_{13}(4R^4 - 3R^2)\cos(2A) + D_{14}(6R^4 - 6R^2 + 1) +$$
$$D_{15}(4R^4 - 3R^2)\sin(2A) + D_{16} R^4 \sin(4A) +$$
$$D_{17} R^5 \cos(5A) + D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) + D_{21}(5R^5 - 4R^3)\sin(3A) +$$
$$D_{22} R^5 \sin(5A) + D_{23} R^6 \cos(6A) +$$
$$D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6 \sin(6A) \ldots$$

Examples 1 to 8 will be described below. FIGS. 1 to 8 are sectional views of Examples 1 to 8, taken along the YZ-plane containing the axial principal ray 2. In each figure, reference numeral 1 denotes a stop; 2 denotes an axial principal ray; 3 denotes a front unit disposed on the object side of the stop 1; 4 denotes a decentered prism optical system constituting a rear unit disposed on the image side of the stop 1; 5 denotes a first surface of the decentered prism optical system 4; 6 denotes a second surface of the decentered prism optical system 4; 7 denotes a third surface of the decentered prism optical system 4; 8 denotes an image plane; and 9 denotes a filter unit including an infrared cutoff filter, an optical low-pass filter, a cover glass, etc. It should be noted that in the decentered prism optical system 4, the first surface 5 forms a first transmitting surface of the rear unit, and the second surface 6 forms both a first reflecting surface and second transmitting surface of the rear unit, and further the third surface 7 forms a second reflecting surface of the rear unit.

In a case where the optical system has the front unit 3 (Examples 4 to 6), light rays emanating from an object (not shown) pass through the front unit 3 and further pass through the aperture of the stop 1 to enter the decentered prism optical system 4, which constitutes the rear unit, through the first surface 5 thereof. The light rays are reflected by the second surface 6 and then reflected by the third surface 7. The reflected light rays come out of the decentered prism optical system 4 through the second surface 6 and pass through the filter unit 9 to form an object image on the image plane 8.

It should be noted that, in Examples 1 to 8, the image size is optimized on the assumption that the optical system uses an image pickup device of ¼ inch size which has an image field size of about 4×3 millimeters, and that the optical system according to each example can be applied to other sizes by coefficient-multiplying the entire optical system.

The present invention includes not only an image pickup optical system but also an image pickup apparatus incorporating the image pickup optical system.

EXAMPLE 1

FIG. 1 is a sectional view of an image pickup optical system according to this example, taken along the YZ-plane containing an optical axis thereof. The specifications of Example 1 are as follows: The horizontal half field angle is 21.32 degrees; the vertical half field angle is 16.31 degrees; the entrance pupil diameter is 1.785 millimeters; and the image size is 3.83×2.93 millimeters. In this example, there is no front unit on the object side of the stop 1, and the image pickup optical system is constructed of only the decentered prism optical system 4.

The image pickup optical system according to this example uses three rotationally asymmetric free-form surfaces each having one plane of symmetry. The image pickup optical system has, in order from the object side thereof, a stop 1, a first transmitting surface 5, a first reflecting surface 6, a second reflecting surface 7, and a second transmitting surface 6. The first reflecting surface and the second transmitting surface are formed from the identical surface 6, and the first reflecting surface utilizes total reflection. Therefore, the optical system comprises as small a number of surfaces as three.

The constituent parameters will be shown later. Displacements of each surface are expressed by amounts of displacement from the surface No. 1. The surface No. 6 is a hypothetic plane. The surface Nos. 7 and higher represent various optical members (filter unit 9) including an infrared cutoff filter, an optical low-pass filter, a cover glass, etc.

Powers in the vicinities of points where the axial principal ray intersects each surface are, in order from the first transmitting surface, 0.183, −1.497, 2.654 and −0.275 in the decentration plane (Y) and −0.483, −1.057, 2.426 and −0.241 in the direction (X) perpendicularly intersecting the decentration plane. Thus, each transmitting surface is assigned a small power, whereas each reflecting surface is assigned a large power, thereby effectively utilizing the point at which aberrations produced by the reflecting surface become small, and reducing chromatic aberrations produced by the transmitting surface. In broad perspective, the image pickup optical system has a retrofocus type power distribution in which a negative power and a positive power are distributed in order from the object side. Further, in this example, the first transmitting surface is assigned a negative power or a small positive power, and the negative power of the first reflecting surface and the positive power of the second reflecting surface are made strong, thereby ensuring a long back focus in comparison to other examples.

Figure 9:
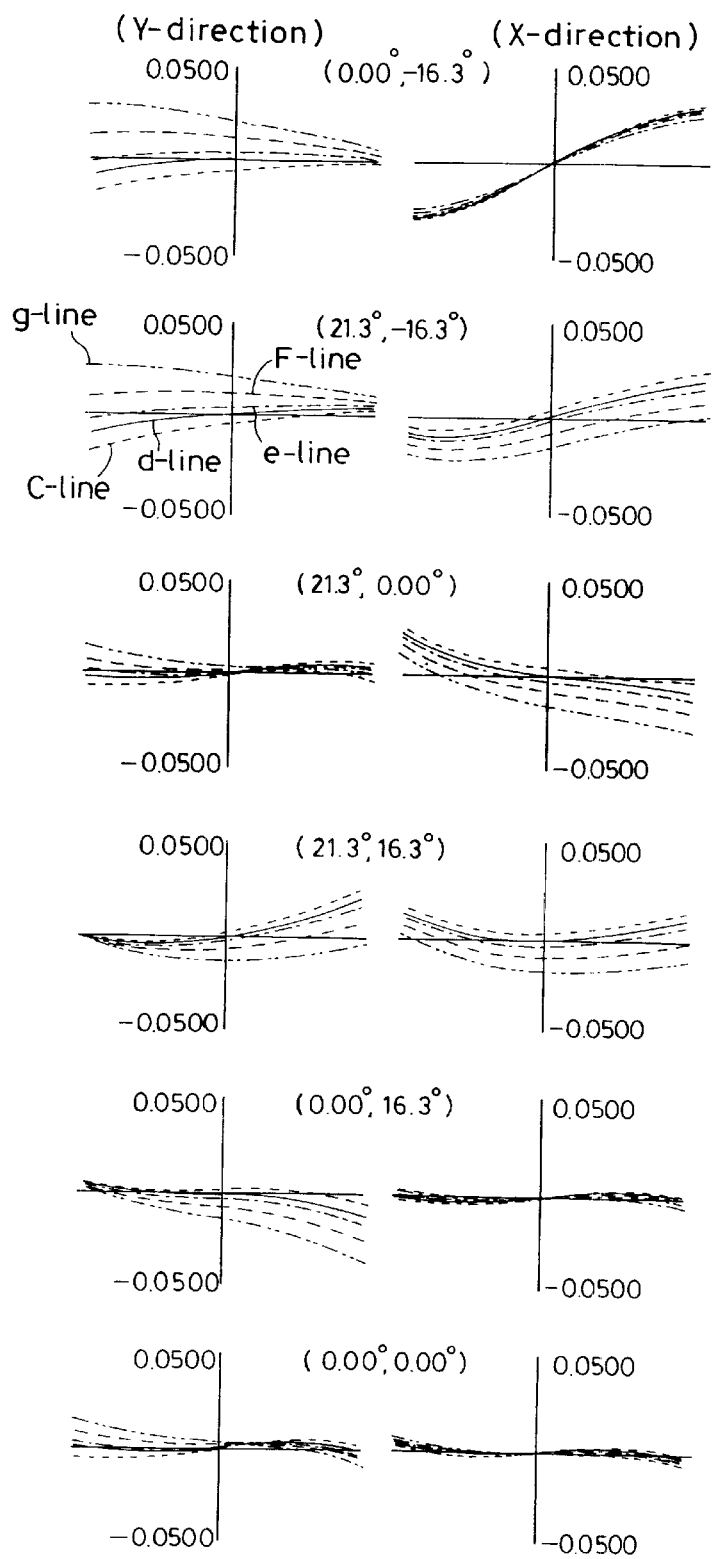
FIG. 9 is an aberrational diagram showing lateral aberrations in Example 1.
Figure 10:
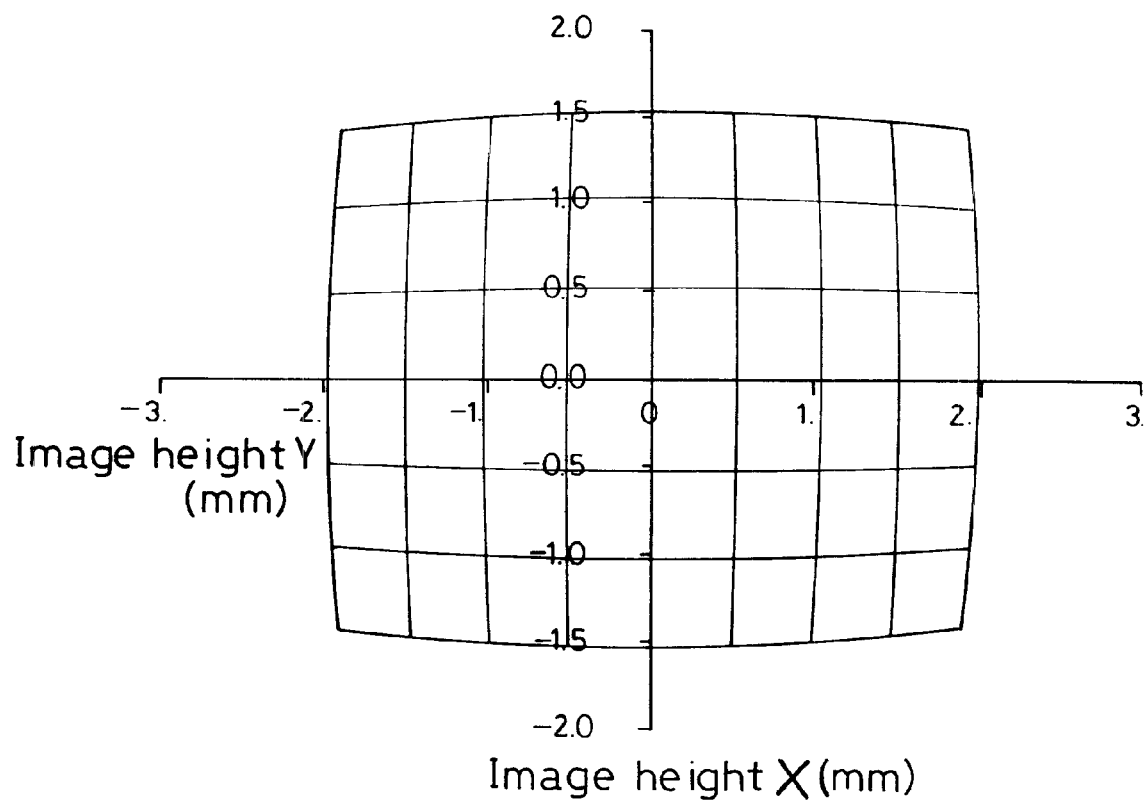
FIG. 10 is an aberrational diagram showing image distortion in Example 1.

Lateral aberrations with respect each field angle in this example are graphically shown in FIG. 9, and the condition of distortion in this example is shown in FIG. 10. In the aberrational diagram of FIG. 9, the parenthesized numerals denote [horizontal (X-direction) field angle, vertical (Y-direction) field angle], and lateral aberrations at the field angles are shown. As will be clear from the sectional view of FIG. 1 and the aberrational diagrams of FIGS. 9 and 10, this example attains favorable optical performance with a simple arrangement comprising a single block having a small size of about 8×6×6 millimeters despite the wide horizontal field angle of 42.6 degrees.

EXAMPLE 2

Figure 2:
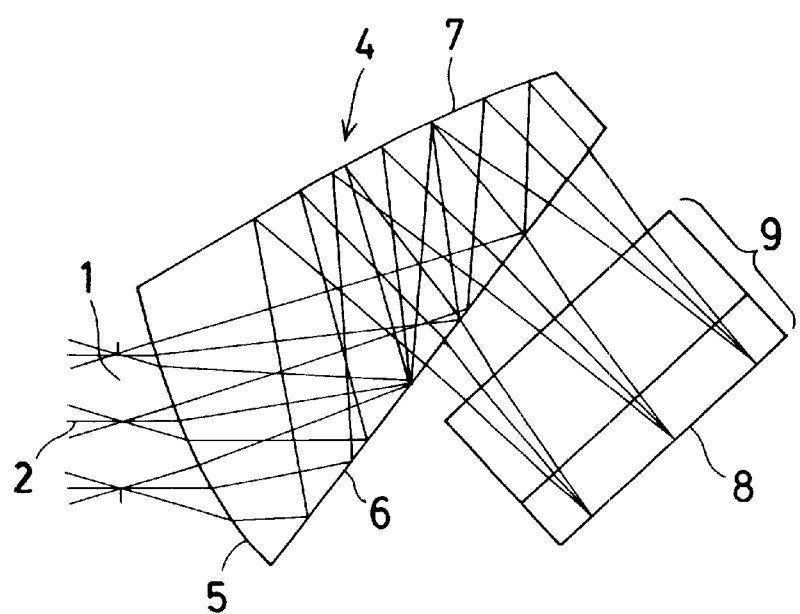
FIG. 2 is a sectional view of an image pickup optical system according to Example 2 of the present invention, taken along a plane containing an optical axis thereof.

FIG. 2 is a sectional view of an image pickup optical system according to this example, taken along the YZ-plane containing an optical axis thereof. The specifications of Example 2 are as follows: The horizontal half field angle is 21.32 degrees; the vertical half field angle is 16.31 degrees; the entrance pupil diameter is 1.785 millimeters; and the image size is 3.90×2.89 millimeters. In this example, there is no front unit on the object side of the stop 1, and the image pickup optical system is constructed of only the decentered prism optical system 4.

The constituent parameters will be shown later. Displacements of each surface are expressed by amounts of displacement from the surface No. 1. The surface No. 6 is a hypothetic plane. This example has an arrangement similar to that of Example 1. In this example, however, the image pickup optical system is designed with great importance placed on the correction of distortion by assigning a positive power to the first transmitting surface 5 and weakening the positive power of the second reflecting surface 7.

EXAMPLE 3

Figure 3:
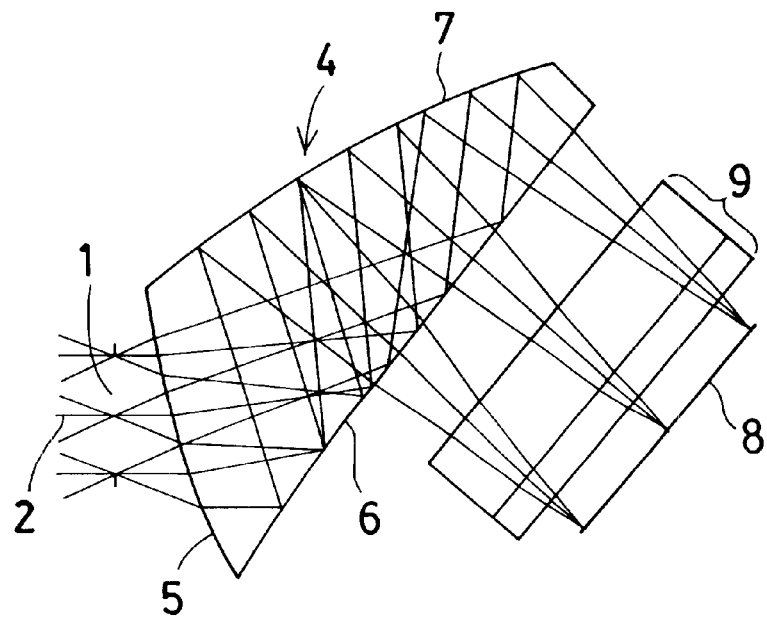
FIG. 3 is a sectional view of an image pickup optical system according to Example 3 of the present invention, taken along a plane containing an optical axis thereof.

FIG. 3 is a sectional view of an image pickup optical system according to this example, taken along the YZ-plane containing an optical axis thereof. The specifications of Example 3 are as follows: The horizontal half field angle is 29.12 degrees; the vertical half field angle is 22.36 degrees; the entrance pupil diameter is 1.350 millimeters; and the image size is 4.02×3.02 millimeters. In this example, there is no front unit on the object side of the stop 1, and the image pickup optical system is constructed of only the decentered prism optical system 4.

The constituent parameters will be shown later. Displacements of each surface are expressed by amounts of displacement from the surface No. 1. The surface No. 6 is a hypothetic plane. This example has an arrangement similar to that of Example 2. In this example, however, the image pickup optical system is arranged to provide a wide field angle equivalent to about 32 millimeters in terms of the focal length of a 35-mm camera by devising the power distribution for each surface. In comparison to Example 2, the power of each surface is weakened to suppress the occurrence of aberrations, and the degree of freedom for aberration correction is increased by introducing higher-order terms of a free-form surface. This example attains a wide-field-angle lens system having high optical performance despite the fact that it comprises only one optical system constituent element and is compact in size, i.e. about 8×8×6 millimeters.

EXAMPLE 4

Figure 4:
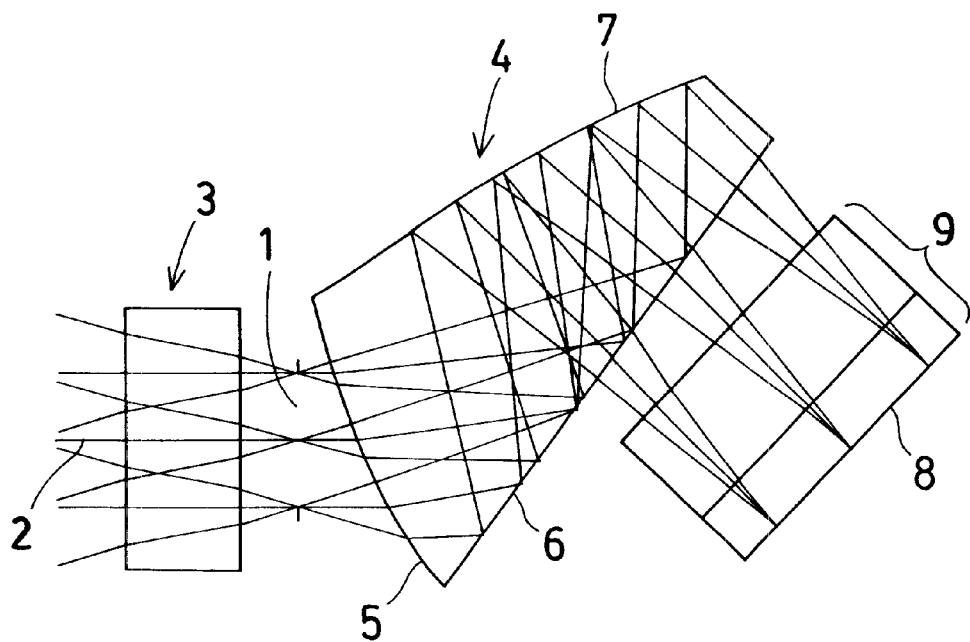
FIG. 4 is a sectional view of an image pickup optical system according to Example 4 of the present invention, taken along a plane containing an optical axis thereof.

FIG. 4 is a sectional view of an image pickup optical system according to this example, taken along the YZ-plane containing an optical axis thereof. The specifications of Example 4 are as follows: The horizontal half field angle is 21.32 degrees; the vertical half field angle is 16.31 degrees; the entrance pupil diameter is 1.785 millimeters; and the image size is 3.90×2.89 millimeters. In this example, a front unit 3 comprising a plane-parallel plate is disposed on the object side of the stop 1, and a decentered prism optical system 4 is disposed as a rear unit on the image side of the stop 1.

The constituent parameters will be shown later. Displacements of each surface are expressed by amounts of displacement from the surface No. 3. The surface No. 8 is a hypothetic plane. In this example, the stop 1 and the front unit 3, which forms a protective glass, are provided on the object side of the decentered prism optical system 4 including decentered rotationally asymmetric reflecting surfaces. The space can be efficiently utilized by adding various functions such as an optical low-pass function and wavelength selecting function to the front unit 3 instead of using it as simply a protective glass, or by disposing an ND filter to add the function of controlling the light quantity.

EXAMPLE 5

Figure 5:
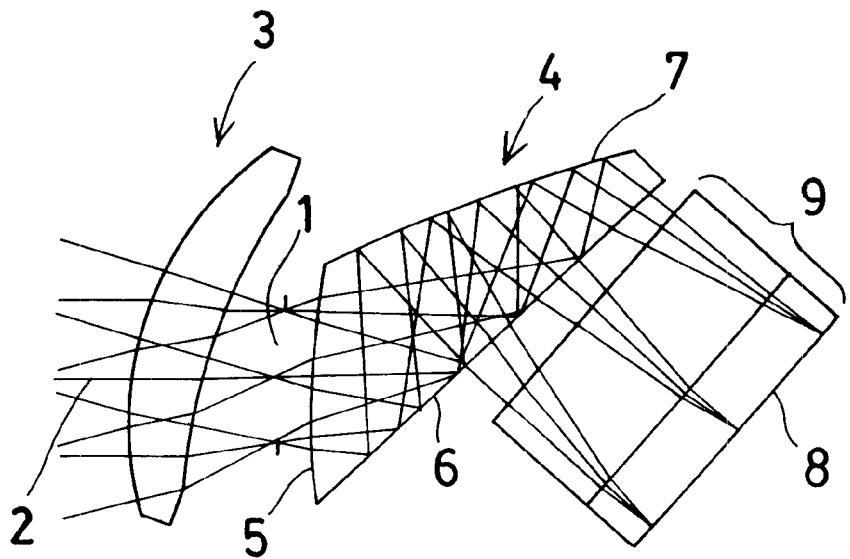
FIG. 5 is a sectional view of an image pickup optical system according to Example 5 of the present invention, taken along a plane containing an optical axis thereof.

FIG. 5 is a sectional view of an image pickup optical system according to this example, taken along the YZ-plane containing an optical axis thereof. The specifications of Example 5 are as follows: The horizontal half field angle is 21.32 degrees; the vertical half field angle is 16.31 degrees; the entrance pupil diameter is 1.785 millimeters; and the image size is 3.89×2.91 millimeters. In this example, a front unit 3 comprising a decentered positive lens is disposed on the object side of the stop 1, and a decentered prism optical system 4 is disposed as a rear unit on the image side of the stop 1.

The constituent parameters will be shown later. Displacements of the surface Nos. 2 and higher are expressed by amounts of displacement from the surface No. 1. The surface Nos. 1 and 9 are hypothetic planes. In this example, the stop 1 and the front unit 3, which comprises a positive lens, are provided on the object side of the decentered prism optical system 4 including decentered rotationally asymmetric reflecting surfaces, thereby reducing distortion and lateral chromatic aberrations. Further, the positive lens 3 is decentered with respect to the stop 1 to reduce the asymmetry of aberrations in the image field. This example makes it possible to attain a compact optical system with minimal distortion and lateral chromatic aberrations by providing a positive lens to form the optical system from two lens blocks 3 and 4.

EXAMPLE 6

Figure 6:
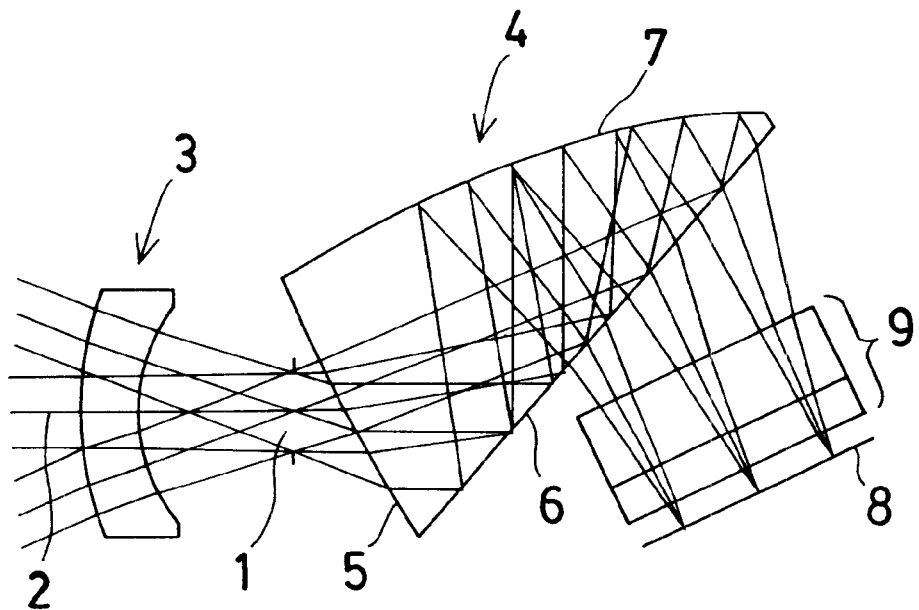
FIG. 6 is a sectional view of an image pickup optical system according to Example 6 of the present invention, taken along a plane containing an optical axis thereof.

FIG. 6 is a sectional view of an image pickup optical system according to this example, taken along the YZ-plane containing an optical axis thereof. The specifications of Example 6 are as follows: The horizontal half field angle is 29.12 degrees; the vertical half field angle is 22.36 degrees; the entrance pupil diameter is 1.350 millimeters; and the image size is 4.03×3.04 millimeters. In this example, a front unit 3 comprising a negative lens is disposed on the object side of the stop 1, and a decentered prism optical system 4 is disposed as a rear unit on the image side of the stop 1.

The constituent parameters will be shown later. Displacements of the surface Nos. 4 and higher are expressed by amounts of displacement from the surface No. 3. The surface No. 8 is a hypothetic plane. In this example, a negative lens is provided on the object side of a decentered rotationally asymmetric reflecting surface to shift the negative power in a retrofocus type power distribution toward the object side so as to widen the space between the negative power and the positive power, thereby reducing the power of the rotationally asymmetric reflecting surface and thus attaining a wide field angle without aggravating the asymmetry of aberrations. This example is improved in the asymmetry of aberrations in the image field and makes it possible to attain a wide field angle equivalent to a focal length of about 32 millimeters in terms of the focal length of a 35-mm camera and favorable optical performance despite a simple arrangement comprising two optical system constituent elements although the number of constituent elements increases and the lens system becomes large in size in comparison to Example 3.

EXAMPLE 7

Figure 7:
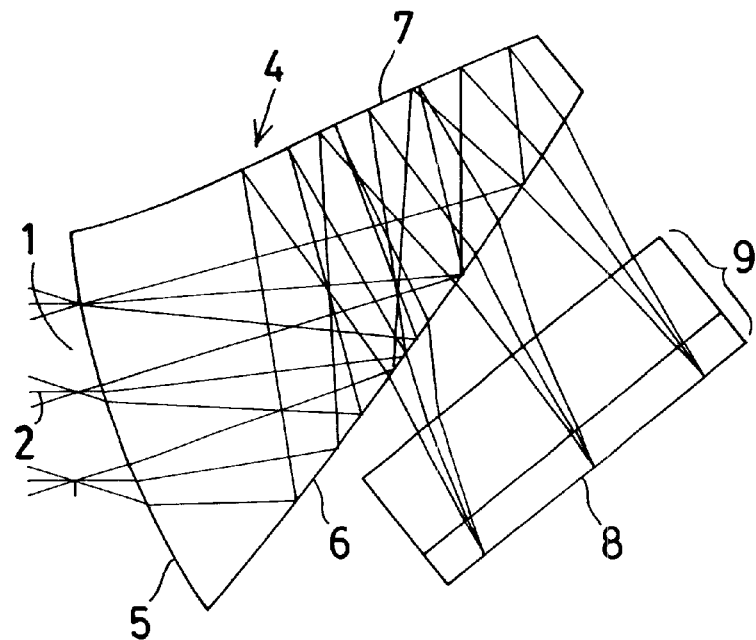
FIG. 7 is a sectional view of an image pickup optical system according to Example 7 of the present invention, taken along a plane containing an optical axis thereof.

FIG. 7 is a sectional view of an image pickup optical system according to this example, taken along the YZ-plane containing an optical axis thereof. The specifications of Example 7 are as follows: The horizontal half field angle is 21.32 degrees; the vertical half field angle is 16.31 degrees; the entrance pupil diameter is 1.785 millimeters; and the image size is 3.90×2.93 millimeters. In this example, there is no front unit on the object side of the stop 1, and the image pickup optical system is constructed of only the decentered prism optical system 4.

The constituent parameters will be shown later. Displacements of each surface are expressed by amounts of displacement from the surface No. 1. The surface No. 6 is a hypothetic plane.

EXAMPLE 8

Figure 8:
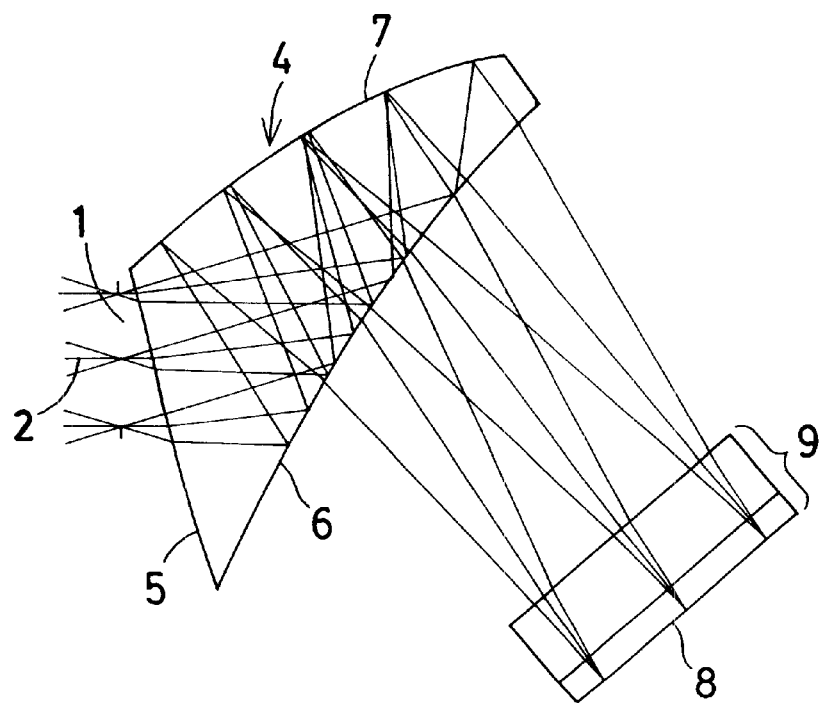
FIG. 8 is a sectional view of an image pickup optical system according to Example 8 of the present invention, taken along a plane containing an optical axis thereof.

FIG. 8 is a sectional view of an image pickup optical system according to this example, taken along the YZ-plane containing an optical axis thereof. The specifications of Example 8 are as follows: The horizontal half field angle is 21.32 degrees; the vertical half field angle is 16.31 degrees; the entrance pupil diameter is 1.785 millimeters; and the image size is 3.90×2.93 millimeters. In this example, there is no front unit on the object side of the stop 1, and the image pickup optical system is constructed of only the decentered prism optical system 4.

The constituent parameters will be shown later. Displacements of each surface are expressed by amounts of displacement from the surface No. 1. The surface No. 6 is a hypothetic plane.

EXAMPLE 9

This is an example of an image pickup optical system according to a second aspect of the present invention, which will be described later in detail.

Figure 18:
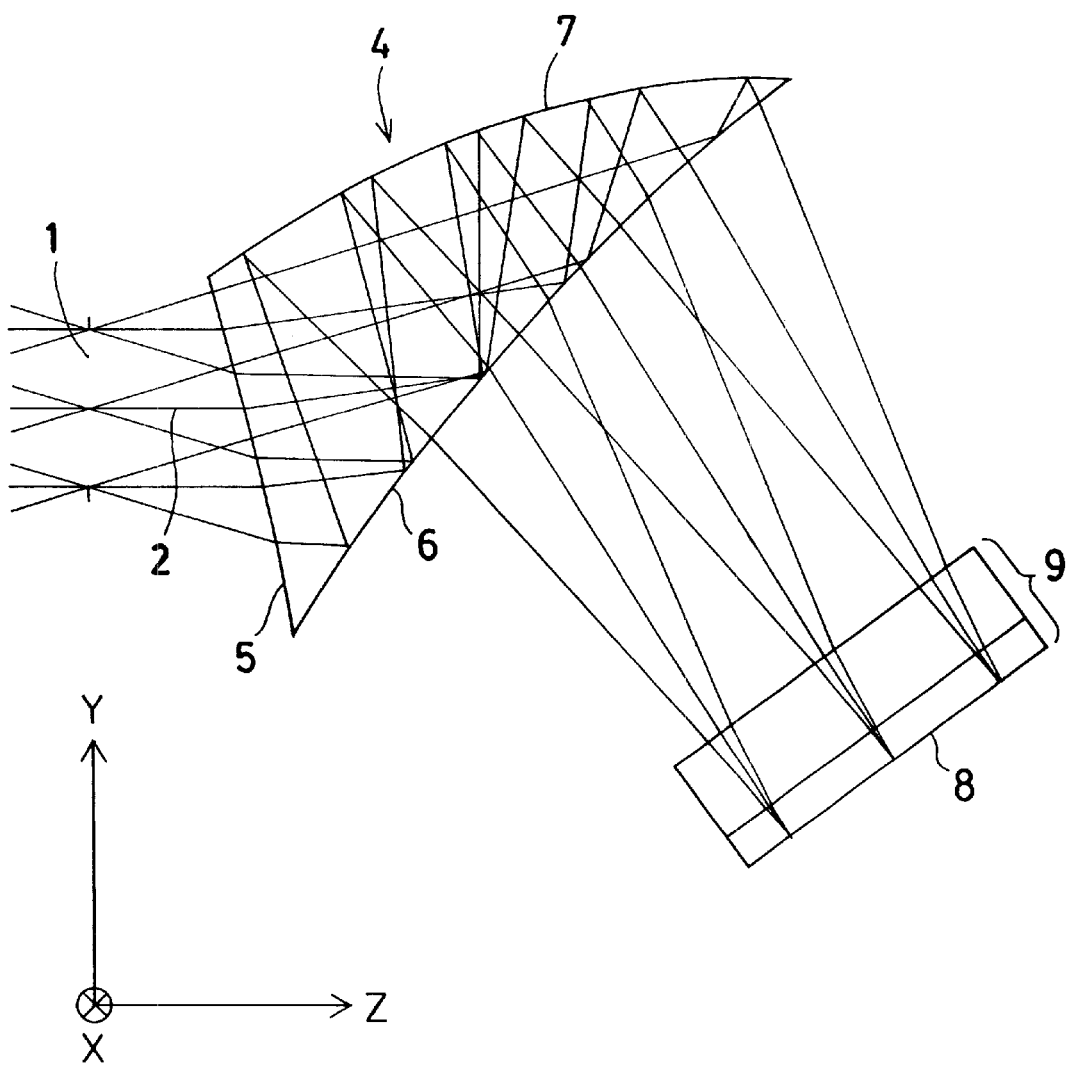
FIG. 18 is a sectional view of an image pickup optical system according to Example 9 of the present invention (according to a second aspect of the present invention), taken along a plane containing an optical axis thereof.

Constituent parameters of Example 9 will be described later. In the constituent parameters, as shown in FIG. 18, the plane of a stop 1 is defined as the origin of decentration plane, and an axial principal ray 2 is defined by a light ray emanating from the center of an object (not shown) and passing through the center of the stop 1. A Z-axis is taken in a direction in which the light ray from the object center travels along the axial principal ray 2 until it reaches the first surface of the optical system. A plane containing both the Z-axis and the center of an image plane 8 is defined as a YZ-plane. A Y-axis is taken in a direction perpendicularly intersecting the Z-axis in the YZ-plane. A direction in which the Z-axis extends from the object point to the first surface of the optical system is defined as a positive direction of the Z-axis. The upward direction of the Y-axis as viewed in the figure (i.e. a direction in which light rays are reflected by a first reflecting surface 6) is defined as a positive direction of the Y-axis. An axis which constitutes a right-handed orthogonal coordinate system in combination with the Y- and Z-axes is defined as an X-axis.

In Example 9 shown in FIG. 18, each surface is decentered in the YZ-plane, and the only one plane of symmetry of each rotationally asymmetric free-form surface is the YZ-plane.

Regarding decentered surfaces, each surface is given displacements (x, y and z, respectively) in the X-, Y- and Z-axis directions of the vertex position of the surface from the origin of the optical system and tilt angles (°) of the center axis of the surface [the Z-axis of the above equation (a) in regard to free-form surfaces] with respect to the X-, Y- and Z-axes ($\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis.

Among optical surfaces constituting the optical system according to Example 9, each spherical surface is given a radius of curvature, and each pair of adjacent surfaces which form a coaxial system is given a surface separation. In addition, the refractive index of each medium, together with Abbe's number, is given according to the conventional method.

The surface configuration of each free-form surface is defined by the above equation (a). The Z-axis of the defining equation (a) is the axis of a free-form surface.

It should be noted that terms concerning aspherical surfaces for which no data is shown are zero. The refractive index is expressed by the refractive index for the spectral d-line (wavelength: 587.56 nanometers). Lengths are given in millimeters.

Free-form surfaces may also be defined by Zernike polynomials as expressed by the above equation (b).

FIG. 18 is a sectional view of Example 9 taken along the YZ-plane containing the axial principal ray 2. In the figure, reference numeral 1 denotes a stop; 2 denotes an axial principal ray; 4 denotes a decentered prism optical system constituting a rear unit disposed on the image side of the stop 1; 5 denotes a first surface of the decentered prism optical system 4; 6 denotes a second surface of the decentered prism optical system 4; 7 denotes a third surface of the decentered prism optical system 4; 8 denotes an image plane; and 9 denotes a filter unit including an infrared cutoff filter, an optical low-pass filter, a cover glass, etc. It should be noted that in the decentered prism optical system 4, the first surface 5 forms a first transmitting surface of the rear unit, and the second surface 6 forms both a first reflecting surface and second transmitting surface of the rear unit, and further the third surface 7 forms a second reflecting surface of the rear unit. In Example 9, there is no front unit disposed on the object side of the stop 1.

Light rays emanating from an object (not shown) pass through the aperture of the stop 1 and enter the decentered prism optical system 4, which constitutes the rear unit, through the first surface 5 thereof. The light rays are reflected by the second surface 6 and then reflected by the third surface 7. The reflected light rays come out of the decentered prism optical system 4 through the second surface 6 and pass through the filter unit 9 to form an object image on the image plane 8.

It should be noted that the image size is optimized on the assumption that the optical system uses an image pickup device of ¼ inch size which has an image field size of about 4×3 millimeters, and that the optical system can be applied to other sizes by coefficient-multiplying the entire optical system.

The technique according to the second aspect of the present invention includes not only an image pickup optical system but also an image pickup apparatus incorporating the image pickup optical system.

The specifications of Example 9 are as follows: The horizontal half field angle is 21.32 degrees; the vertical half field angle is 16.31 degrees; the entrance pupil diameter is 2.061 millimeters; and the image size is 3.90×2.93 millimeters. In this example, there is no front unit on the object side of the stop 1, and the image pickup optical system is constructed of only the decentered prism optical system 4.

The image pickup optical system according to this example uses two rotationally asymmetric free-form surfaces each having one plane of symmetry. The image pickup optical system has, in order from the object side thereof, a stop 1, a first transmitting surface 5, a first reflecting surface 6, a second reflecting surface 7, and a second transmitting surface 6. The first reflecting surface and the second transmitting surface are formed from the identical surface 6, and the first reflecting surface utilizes total reflection. Therefore, the optical system comprises as small a number of surfaces as three. In this example, a rotationally symmetric spherical surface is used for the first reflecting surface 6 (second transmitting surface 6). It is also possible to use a rotationally symmetric aspherical surface for the first reflecting surface 6 (second transmitting surface 6).

The constituent parameters will be shown later. Displacements of each surface are expressed by amounts of displacement from the surface No. 1. The surface No. 6 is a hypothetic plane. The surface Nos. 7 and higher represent various optical members (filter unit 9) including an infrared cutoff filter, an optical low-pass filter, a cover glass, etc.

EXAMPLE 10

This is an example of an image pickup optical system according to a third aspect of the present invention, which will be described later in detail.

Figure 19:
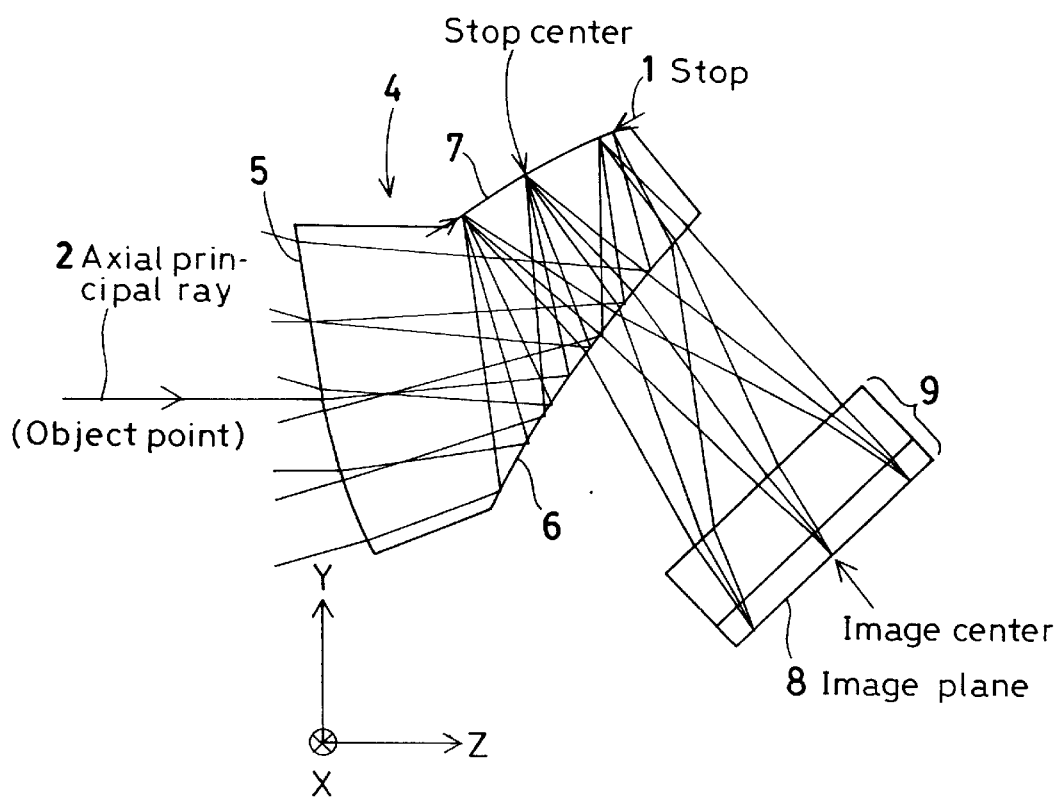
FIG. 19 is a sectional view of an image pickup optical system according to Example 10 of the present invention (according to a third aspect of the present invention), taken along a plane containing an optical axis thereof.

Constituent parameters of Example 10 will be described later. In the constituent parameters, as shown in FIG. 19, the vertex position of a first surface 5 is defined as the origin, and an axial principal ray 2 is defined by a light ray emanating from the center of an object (not shown) and passing through the center of a stop 1. A Z-axis is taken in a direction in which the light ray from the object center travels along the axial principal ray 2 until it reaches the first surface 5 of the optical system. A plane containing both the Z-axis and the center of an image plane 8 is defined as a YZ-plane. A Y-axis is taken in a direction perpendicularly intersecting the Z-axis in the YZ-plane. A direction in which the Z-axis extends from the object point to the first surface 5 of the optical system is defined as a positive direction of the Z-axis. The upward direction of the Y-axis as viewed in the figure (i.e. a direction in which light rays are reflected by a first reflecting surface 6) is defined as a positive direction of the Y-axis. An axis which constitutes a right-handed orthogonal coordinate system in combination with the Y- and Z-axes is defined as an X-axis.

In this example, each surface is decentered in the YZ-plane, and the only one plane of symmetry of each rotationally asymmetric free-form surface is the YZ-plane.

Regarding decentered surfaces, each surface is given displacements (x, y and z, respectively) in the X-, Y- and Z-axis directions of the vertex position of the surface from the origin of the optical system and tilt angles of the center axis of the surface [the Z-axis of the above equation (a) in regard to free-form surfaces] with respect to the X-, Y- and Z-axes [$\alpha$, $\beta$ and $\gamma$ (°), respectively]. In this case, positive $\alpha$ and $\beta$ mean counterclockwise rotation relative to the positive directions of the corresponding axes, and positive $\gamma$ means clockwise rotation relative to the positive direction of the Z-axis.

Among optical surfaces constituting the optical system according to Example 10, each pair of adjacent surfaces which form a coaxial system is given a surface separation. In addition, the refractive index of each medium, together with Abbe's number, is given according to the conventional method.

The surface configuration of each free-form surface is defined by the above equation (a). The Z-axis of the defining equation (a) is the axis of a free-form surface.

It should be noted that terms concerning aspherical surfaces for which no data is shown are zero. The refractive index is expressed by the refractive index for the spectral d-line (wavelength: 587.56 nanometers). Lengths are given in millimeters.

Free-form surfaces may also be defined by Zernike polynomials as expressed by the above equation (b).

Example 10 will be described below. FIG. 19 is a sectional view of this example taken along the YZ-plane containing the axial principal ray 2. In the figure, reference numeral 1 denotes a stop; 2 denotes an axial principal ray; 4 denotes a decentered prism optical system according to the present invention; 5 denotes a first surface of the decentered prism optical system 4; 6 denotes a second surface of the decentered prism optical system 4; 7 denotes a third surface of the decentered prism optical system 4; 8 denotes an image plane; and 9 denotes a filter unit including an infrared cutoff filter, an optical low-pass filter, a cover glass, etc. It should be noted that in the decentered prism optical system 4, the first surface 5 forms a first transmitting surface of the optical system according to the present invention, and the second surface 6 forms both a first reflecting surface and second transmitting surface of the optical system, and further the third surface 7 forms a second reflecting surface of the optical system.

Light rays emanating from an object (not shown) enter the decentered prism optical system 4 through the first surface 5 thereof. The light rays are reflected by the second surface 6 and then reflected by the third surface 7. The reflected light rays come out of the decentered prism optical system 4 through the second surface 6 and pass through the filter unit 9 to form an object image on the image plane 8. It should be noted that the stop 1 is provided at the position of the third surface 7.

It should be noted that the image size is optimized on the assumption that the optical system uses an image pickup device of ¼ inch size which has an image field size of about 4×3 millimeters, and that the optical system can be applied to other sizes by coefficient-multiplying the entire optical system.

The specifications of Example 10 are as follows: The horizontal half field angle is 21.32 degrees; the vertical half field angle is 16.31 degrees; the entrance pupil diameter is 1.785 millimeters; and the image size is 3.90×2.93 millimeters. In this example, the image pickup optical system is constructed of only the decentered prism optical system 4.

The image pickup optical system according to this example uses three rotationally asymmetric free-form surfaces each having one plane of symmetry. The image pickup optical system has, in order from the object side thereof, a first transmitting surface 5, a first reflecting surface 6, a second reflecting surface 7 (stop 1), and a second transmitting surface 6. The first reflecting surface and the second transmitting surface are formed from the identical surface 6, and the first reflecting surface utilizes total reflection. Therefore, the optical system comprises as small a number of surfaces as three.

It should be noted that displacements in the constituent parameters (described below) are expressed by amounts of displacement from the surface No. 1. The surface No. 6 is a hypothetic plane. The surface Nos. 6 and higher represent various optical members (filter unit 9) including an infrared cutoff filter, an optical low-pass filter, a cover glass, etc.

Constituent parameters in the foregoing Examples 1 to 10 are shown below. It should be noted that each free-form surface is denoted by "FFS".

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) (Reference plane) | | | | |
| 2 | FFS [1] | | (1) | 1.8061 | 40.9 |
| 3 | FFS [2] | | (2) | 1.8061 | 40.9 |
| 4 | FFS [3] | | (3) | 1.8061 | 40.9 |
| 5 | FFS [2] | | (2) | | |
| 6 | ∞ | 0.00 | (4) | | |
| 7 | ∞ | 1.00 | | 1.5163 | 64.1 |
| 8 | ∞ | 0.40 | | 1.5163 | 64.1 |
| Image plane | ∞ | | | | |

FFS [1]

$C_5$  $1.3831 \times 10^{-2}$  $C_7$  $-3.6090 \times 10^{-2}$  $C_8$  $-7.3679 \times 10^{-3}$
$C_{10}$  $1.5720 \times 10^{-3}$

FFS [2]

$C_5$  $2.5299 \times 10^{-2}$  $C_7$  $1.7622 \times 10^{-2}$  $C_8$  $-8.4559 \times 10^{-4}$
$C_{10}$  $2.4760 \times 10^{-4}$

FFS [3]

$C_5$  $-4.4848 \times 10^{-2}$  $C_7$  $-4.0459 \times 10^{-2}$  $C_8$  $5.2867 \times 10^{-4}$
$C_{10}$  $4.0114 \times 10^{-4}$  $C_{12}$  $-1.0522 \times 10^{-4}$  $C_{14}$  $-2.5073 \times 10^{-4}$
$C_{18}$  $-1.0204 \times 10^{-4}$  $C_{17}$  $1.2722 \times 10^{-5}$  $C_{19}$  $2.1529 \times 10^{-5}$
$C_{21}$  $4.3005 \times 10^{-6}$ -continued

|  | Displacement and tilt (1) | | | | |
|---|---|---|---|---|---|
| x | 0.000 | y | 0.000 | z | 0.803 |
| α | 15.34 | β | 0.00 | γ | 0.00 |
|  | Displacement and tilt (2) | | | | |
| x | 0.000 | y | 0.333 | z | 3.551 |
| α | −40.74 | β | 0.00 | γ | 0.00 |
|  | Displacement and tilt (3) | | | | |
| x | 0.000 | y | 3.101 | z | 3.473 |
| α | 109.99 | β | 0.00 | γ | 0.00 |
|  | Displacement and tilt (4) | | | | |
| x | 0.000 | y | −2.637 | z | 7.430 |
| α | −56.89 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) (Reference plane) | | | | |
| 2 | FFS [1] | | (1) | 1.5400 | 59.4 |
| 3 | FFS [2] | | (2) | 1.5400 | 59.4 |
| 4 | FFS [3] | | (3) | 1.5400 | 59.4 |
| 5 | FFS [2] | | (2) | | |
| 6 | ∞ | 0.00 | (4) | | |
| 7 | ∞ | 1.50 | | 1.5163 | 64.1 |
| 8 | ∞ | 0.75 | | 1.5163 | 64.1 |
| Image plane | ∞ | | | | |

FFS [1]

| $C_5$ | $5.8068 \times 10^{-2}$ | $C_7$ | $7.5553 \times 10^{-2}$ | $C_8$ | $-1.9541 \times 10^{-3}$ |
| $C_{10}$ | $-8.6638 \times 10^{-3}$ | | | | |

FFS [2]

| $C_5$ | $6.1572 \times 10^{-5}$ | $C_7$ | $1.3306 \times 10^{-2}$ | $C_8$ | $-2.7595 \times 10^{-4}$ |
| $C_{10}$ | $-3.0763 \times 10^{-3}$ | | | | |

FFS [3]

| $C_5$ | $-2.3482 \times 10^{-2}$ | $C_7$ | $-3.5660 \times 10^{-2}$ | $C_8$ | $8.8353 \times 10^{-4}$ |
| $C_{10}$ | $1.8668 \times 10^{-4}$ | $C_{12}$ | $2.6198 \times 10^{-4}$ | $C_{14}$ | $1.0252 \times 10^{-3}$ |
| $C_{16}$ | $1.5324 \times 10^{-4}$ | $C_{17}$ | $2.1707 \times 10^{-5}$ | $C_{19}$ | $9.1571 \times 10^{-5}$ |
| $C_{21}$ | $5.3976 \times 10^{-5}$ | | | | |

|  | Displacement and tilt (1) | | | | |
|---|---|---|---|---|---|
| x | 0.000 | y | 0.000 | z | 0.807 |
| α | 22.84 | β | 0.00 | γ | 0.00 |
|  | Displacement and tilt (2) | | | | |
| x | 0.000 | y | 0.437 | z | 3.825 |
| α | −37.89 | β | 0.00 | γ | 0.00 |
|  | Displacement and tilt (3) | | | | |
| x | 0.000 | y | 3.630 | z | 3.491 |
| α | 116.17 | β | 0.00 | γ | 0.00 |
|  | Displacement and tilt (4) | | | | |
| x | 0.000 | y | 1.358 | z | 5.791 |
| α | −46.87 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) (Reference plane) | | | | |
| 2 | FFS [1] | | (1) | 1.8061 | 40.9 |
| 3 | FFS [2] | | (2) | 1.8061 | 40.9 |
| 4 | FFS [3] | | (3) | 1.8061 | 40.9 |
| 5 | FFS [2] | | (2) | | |
| 6 | ∞ | 0.00 | (4) | | |
| 7 | ∞ | 1.00 | | 1.5163 | 64.1 |
| 8 | ∞ | 0.40 | | 1.5163 | 64.1 |
| 9 | ∞ | 0.50 | | | |
| Image plane | ∞ | | | | |

FFS [1]

| $C_5$ | $3.7924 \times 10^{-2}$ | $C_7$ | $5.4447 \times 10^{-2}$ | $C_8$ | $-2.0761 \times 10^{-3}$ |
| $C_{10}$ | $1.3115 \times 10^{-2}$ | $C_{12}$ | $1.5630 \times 10^{-3}$ | $C_{14}$ | $-2.5577 \times 10^{-3}$ |
| $C_{16}$ | $3.8112 \times 10^{-3}$ | $C_{17}$ | $-4.8199 \times 10^{-4}$ | $C_{19}$ | $1.9456 \times 10^{-3}$ |

FFS [2]

| $C_5$ | $6.4342 \times 10^{-3}$ | $C_7$ | $2.6055 \times 10^{-2}$ | $C_8$ | $-1.0043 \times 10^{-3}$ |
| $C_{10}$ | $-6.9334 \times 10^{-3}$ | $C_{12}$ | $3.6671 \times 10^{-4}$ | $C_{14}$ | $-3.8133 \times 10^{-3}$ |
| $C_{16}$ | $2.3354 \times 10^{-3}$ | $C_{17}$ | $-8.2425 \times 10^{-5}$ | $C_{19}$ | $7.3303 \times 10^{-4}$ |

FFS [3]

| $C_5$ | $-3.4481 \times 10^{-2}$ | $C_7$ | $-4.4610 \times 10^{-2}$ | $C_8$ | $1.7095 \times 10^{-4}$ |
| $C_{10}$ | $-2.9202 \times 10^{-3}$ | $C_{12}$ | $-1.8844 \times 10^{-5}$ | $C_{14}$ | $2.5151 \times 10^{-3}$ |
| $C_{16}$ | $-5.8488 \times 10^{-4}$ | $C_{17}$ | $-4.4293 \times 10^{-5}$ | $C_{19}$ | $2.3318 \times 10^{-5}$ |
| $C_{21}$ | $1.8061 \times 10^{-4}$ | | | | |

|  | Displacement and tilt (1) | | | | |
|---|---|---|---|---|---|
| x | 0.000 | y | 0.248 | z | 0.625 |
| α | 12.51 | β | 0.00 | γ | 0.00 |
|  | Displacement and tilt (2) | | | | |
| x | 0.000 | y | 0.258 | z | 3.077 |
| α | −39.02 | β | 0.00 | γ | 0.00 |
|  | Displacement and tilt (3) | | | | |
| x | 0.000 | y | 2.987 | z | 2.798 |
| α | 117.39 | β | 0.00 | γ | 0.00 |
|  | Displacement and tilt (4) | | | | |
| x | 0.000 | y | 0.939 | z | 5.127 |
| α | −41.84 | β | 0.00 | γ | 0.00 |

EXAMPLE 4

| Surface No. | Radius of curvature | Surface separation | Displacement and tilt | Refractive index | Abbe's No. |
|---|---|---|---|---|---|
| Object plane | ∞ | ∞ | | | |
| 1 | ∞ | 1.50 | | 1.5163 | 64.2 |
| 2 | ∞ | 0.75 | | | |
| 3 | ∞ (Stop) (Reference plane) | | | | |
| 4 | FFS [1] | | (1) | 1.5400 | 59.4 |
| 5 | FFS [2] | | (2) | 1.5400 | 59.4 |
| 6 | FFS [3] | | (3) | 1.5400 | 59.4 |
| 7 | FFS [2] | | (2) | | |
| 8 | ∞ | 0.00 | (4) | | |
| 9 | ∞ | 1.50 | | 1.5163 | 64.2 |
| 10 | ∞ | 0.75 | | 1.5163 | 64.2 |

-continued

| | | | |
|---|---|---|---|
| Image plane | ∞ | | |

FFS [1]

| | | | | | |
|---|---|---|---|---|---|
| $C_5$ | $5.5611 \times 10^{-2}$ | $C_7$ | $7.3954 \times 10^{-2}$ | $C_8$ | $-2.2062 \times 10^{-3}$ |
| $C_{10}$ | $-9.3451 \times 10^{-3}$ | | | | |

FFS [2]

| | | | | | |
|---|---|---|---|---|---|
| $C_5$ | $7.1877 \times 10^{-4}$ | $C_7$ | $1.4712 \times 10^{-2}$ | $C_8$ | $-3.4549 \times 10^{-4}$ |
| $C_{10}$ | $-3.3241 \times 10^{-3}$ | | | | |

FFS [3]

| | | | | | |
|---|---|---|---|---|---|
| $C_5$ | $-2.4606 \times 10^{-2}$ | $C_7$ | $-3.6544 \times 10^{-2}$ | $C_8$ | $7.8613 \times 10^{-4}$ |
| $C_{10}$ | $-2.4000 \times 10^{-4}$ | $C_{12}$ | $2.2952 \times 10^{-4}$ | $C_{14}$ | $9.1669 \times 10^{-4}$ |
| $C_{16}$ | $1.2169 \times 10^{-4}$ | $C_{17}$ | $1.8425 \times 10^{-5}$ | $C_{19}$ | $7.3383 \times 10^{-5}$ |
| $C_{21}$ | $4.7013 \times 10^{-5}$ | | | | |

Displacement and tilt (1)

| x | 0.000 | y | 0.000 | z | 0.815 |
|---|---|---|---|---|---|
| α | 23.06 | β | 0.00 | γ | 0.00 |

Displacement and tilt (2)

| x | 0.000 | y | 0.433 | z | 3.776 |
|---|---|---|---|---|---|
| α | −36.70 | β | 0.00 | γ | 0.00 |

Displacement and tilt (3)

| x | 0.000 | y | 3.776 | z | 3.290 |
|---|---|---|---|---|---|
| α | 118.34 | β | 0.00 | γ | 0.00 |

Displacement and tilt (4)

| x | 0.000 | y | 1.487 | z | 5.797 |
|---|---|---|---|---|---|
| α | −44.31 | β | 0.00 | γ | 0.00 |

EXAMPLE 5

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Reference plane) | | | | |
| 2 | 4.056 | | (1) | 1.5163 | 64.1 |
| 3 | 7.976 | | (2) | | |
| 4 | ∞(Stop) | | (3) | | |
| 5 | FFS [1] | | (4) | 1.5400 | 59.4 |
| 6 | FFS [2] | | (5) | 1.5400 | 59.4 |
| 7 | FFS [3] | | (6) | 1.5400 | 59.4 |
| 8 | FFS [2] | | (5) | | |
| 9 | ∞ | 0.00 | (7) | | |
| 10 | ∞ | 1.50 | | 1.5163 | 64.1 |
| 11 | ∞ | 0.75 | | 1.5163 | 64.1 |
| Image plane | ∞ | | | | |

FFS [1]

| | | | | | |
|---|---|---|---|---|---|
| $C_5$ | $7.5879 \times 10^{-2}$ | $C_7$ | $9.6598 \times 10^{-2}$ | $C_8$ | $-6.2172 \times 10^{-3}$ |
| $C_{10}$ | $-6.4546 \times 10^{-3}$ | | | | |

FFS [2]

| | | | | | |
|---|---|---|---|---|---|
| $C_5$ | $3.9221 \times 10^{-3}$ | $C_7$ | $1.6474 \times 10^{-2}$ | $C_8$ | $-8.3043 \times 10^{-4}$ |
| $C_{10}$ | $-8.6373 \times 10^{-4}$ | | | | |

FFS [3]

| | | | | | |
|---|---|---|---|---|---|
| $C_5$ | $-2.1565 \times 10^{-2}$ | $C_7$ | $-2.8660 \times 10^{-2}$ | $C_8$ | $-4.4079 \times 10^{-4}$ |
| $C_{10}$ | $5.4262 \times 10^{-4}$ | $C_{12}$ | $5.6440 \times 10^{-4}$ | $C_{14}$ | $1.2660 \times 10^{-3}$ |
| $C_{16}$ | $1.1026 \times 10^{-3}$ | $C_{17}$ | $-2.4581 \times 10^{-5}$ | $C_{19}$ | $1.3297 \times 10^{-4}$ |
| $C_{21}$ | $-5.9604 \times 10^{-5}$ | | | | |

Displacement and tilt (1)

| x | 0.000 | y | 0.780 | z | 0.409 |
|---|---|---|---|---|---|
| α | −19.47 | β | 0.00 | γ | 0.00 |

Displacement and tilt (2)

| x | 0.000 | y | 0.470 | z | 1.210 |
|---|---|---|---|---|---|
| α | −19.47 | β | 0.00 | γ | 0.00 |

Displacement and tilt (3)

| x | 0.000 | y | 0.019 | z | 1.879 |
|---|---|---|---|---|---|
| α | 0.00 | β | 0.00 | γ | 0.00 |

Displacement and tilt (4)

| x | 0.000 | y | 0.051 | z | 2.322 |
|---|---|---|---|---|---|
| α | −4.32 | β | 0.00 | γ | 0.00 |

Displacement and tilt (5)

| x | 0.000 | y | 0.084 | z | 4.000 |
|---|---|---|---|---|---|
| α | −47.79 | β | 0.00 | γ | 0.00 |

Displacement and tilt (6)

| x | 0.000 | y | 2.040 | z | 4.230 |
|---|---|---|---|---|---|
| α | 109.78 | β | 0.00 | γ | 0.00 |

Displacement and tilt (7)

| x | 0.000 | y | 0.820 | z | 5.534 |
|---|---|---|---|---|---|
| α | −41.33 | β | 0.00 | γ | 0.00 |

EXAMPLE 6

| Surface No. | Radius of curvature | Surface separation | Displacement and tilt | Refractive index | Abbe's No. |
|---|---|---|---|---|---|
| Object plane | ∞ | ∞ | | | |
| 1 | 6.318 | 1.00 | | 1.4875 | 70.2 |
| 2 | 3.184 | 3.00 | | | |
| 3 | ∞ (Stop) (Reference plane) | | | | |
| 4 | FFS [1] | | (1) | 1.5400 | 59.4 |
| 5 | FFS [2] | | (2) | 1.5400 | 59.4 |
| 6 | FFS [3] | | (3) | 1.5400 | 59.4 |
| 7 | FFS [2] | | (2) | | |
| 8 | ∞ | 0.00 | (4) | | |
| 9 | ∞ | 1.50 | | 1.5163 | 64.2 |
| 10 | ∞ | 0.75 | | 1.5163 | 64.2 |
| 11 | ∞ | 0.50 | | | |
| Image plane | ∞ | | | | |

FFS [1]

| | | | | | |
|---|---|---|---|---|---|
| $C_5$ | $2.1413 \times 10^{-2}$ | $C_7$ | $3.7356 \times 10^{-2}$ | $C_8$ | $2.0784 \times 10^{-4}$ |
| $C_{10}$ | $-7.8354 \times 10^{-3}$ | $C_{12}$ | $1.5668 \times 10^{-5}$ | $C_{14}$ | $-1.3047 \times 10^{-3}$ |
| $C_{16}$ | $1.2548 \times 10^{-4}$ | $C_{17}$ | $-1.5018 \times 10^{-4}$ | $C_{19}$ | $5.4717 \times 10^{-4}$ |

FFS [2]

| | | | | | |
|---|---|---|---|---|---|
| $C_5$ | $8.8826 \times 10^{-5}$ | $C_7$ | $8.7982 \times 10^{-3}$ | $C_8$ | $3.7903 \times 10^{-4}$ |
| $C_{10}$ | $-1.8466 \times 10^{-3}$ | $C_{12}$ | $3.0293 \times 10^{-5}$ | $C_{14}$ | $-3.2298 \times 10^{-4}$ |
| $C_{16}$ | $2.6623 \times 10^{-4}$ | $C_{17}$ | $-3.3556 \times 10^{-6}$ | $C_{19}$ | $3.0087 \times 10^{-5}$ |

FFS [3]

| | | | | | |
|---|---|---|---|---|---|
| $C_5$ | $-2.8297 \times 10^{-2}$ | $C_7$ | $-3.6681 \times 10^{-2}$ | $C_8$ | $6.7550 \times 10^{-4}$ |
| $C_{10}$ | $-3.4843 \times 10^{-4}$ | $C_{12}$ | $-2.7812 \times 10^{-5}$ | $C_{14}$ | $4.3994 \times 10^{-4}$ |
| $C_{16}$ | $-8.2182 \times 10^{-5}$ | $C_{17}$ | $7.2013 \times 10^{-6}$ | $C_{19}$ | $1.2980 \times 10^{-6}$ |
| $C_{21}$ | $1.8223 \times 10^{-5}$ | | | | |

Displacement and tilt (1)

| x | 0.000 | y | 0.000 | z | 0.981 |
|---|---|---|---|---|---|
| α | 27.55 | β | 0.00 | γ | 0.00 |

-continued

| | | Displacement and tilt (2) | | | |
|---|---|---|---|---|---|
| x | 0.000 | y | 0.737 | z | 5.130 |
| α | −40.27 | β | 0.00 | γ | 0.00 |
| | | Displacement and tilt (3) | | | |
| x | 0.000 | y | 5.080 | z | 5.176 |
| α | 106.77 | β | 0.00 | γ | 0.00 |
| | | Displacement and tilt (4) | | | |
| x | 0.000 | y | 0.936 | z | 7.637 |
| α | −64.38 | β | 0.00 | γ | 0.00 |

EXAMPLE 7

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) (Reference plane) | | | | |
| 2 | FFS [1] | | (1) | 1.5638 | 60.7 |
| 3 | FFS [2] | | (2) | 1.5638 | 60.7 |
| 4 | FFS [3] | | (3) | 1.5638 | 60.7 |
| 5 | FFS [2] | | (2) | | |
| 6 | ∞ | 0.00 | (4) | | |
| 7 | ∞ | 1.00 | | 1.5163 | 64.1 |
| 8 | ∞ | 0.40 | | 1.5163 | 64.1 |
| Image plane | ∞ | | | | |

FFS [1]

$C_5$ 5.8550 × 10⁻² $C_7$ 9.6408 × 10⁻² $C_{10}$ −7.7195 × 10⁻³
$C_{14}$ −2.0262 × 10⁻³ $C_{19}$ −1.6058 × 10⁻³ $C_{21}$ −6.5159 × 10⁻⁴
$C_{25}$ −1.8786 × 10⁻³ $C_{27}$ 1.8236 × 10⁻³

FFS [2]

$C_5$ −1.0191 × 10⁻² $C_7$ 5.7259 × 10⁻³ $C_8$ −2.5994 × 10⁻⁴
$C_{10}$ −2.8707 × 10⁻³ $C_{12}$ −2.0828 × 10⁻⁴ $C_{14}$ −8.9923 × 10⁻⁴
$C_{16}$ −1.3406 × 10⁻⁴ $C_{19}$ 2.9458 × 10⁻⁵ $C_{21}$ −1.9774 × 10⁻⁴
$C_{25}$ −6.7794 × 10⁻⁶ $C_{27}$ 1.2814 × 10⁻⁵

FFS [3]

$C_5$ −6.7777 × 10⁻³ $C_7$ −2.7240 × 10⁻² $C_8$ 1.1060 × 10⁻⁴
$C_{10}$ −4.6180 × 10⁻⁴ $C_{12}$ 1.0032 × 10⁻³ $C_{14}$ 2.3164 × 10⁻³
$C_{16}$ 4.9903 × 10⁻⁴ $C_{17}$ 4.9167 × 10⁻⁵ $C_{19}$ 7.7573 × 10⁻⁵
$C_{21}$ −4.3921 × 10⁻⁵ $C_{23}$ 2.6022 × 10⁻⁵ $C_{25}$ 2.2066 × 10⁻⁴
$C_{27}$ 1.3540 × 10⁻⁴ $C_{29}$ 3.4703 × 10⁻⁵

| | | Displacement and tilt (1) | | | |
|---|---|---|---|---|---|
| x | 0.000 | y | 0.000 | z | 0.294 |
| α | 18.01 | β | 0.00 | γ | 0.00 |
| | | Displacement and tilt (2) | | | |
| x | 0.000 | y | 0.368 | z | 3.470 |
| α | −37.18 | β | 0.00 | γ | 0.00 |
| | | Displacement and tilt (3) | | | |
| x | 0.000 | y | 2.894 | z | 3.068 |
| α | 113.64 | β | 0.00 | γ | 0.00 |
| | | Displacement and tilt (4) | | | |
| x | 0.000 | y | 0.396 | z | 4.611 |
| α | −51.68 | β | 0.00 | γ | 0.00 |

EXAMPLE 8

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) (Reference plane) | | | | |
| 2 | FFS [1] | | (1) | 1.8061 | 40.9 |
| 3 | FFS [2] | | (2) | 1.8061 | 40.9 |
| 4 | FFS [3] | | (3) | 1.8061 | 40.9 |
| 5 | FFS [2] | | (2) | | |
| 6 | ∞ | 0.00 | (4) | | |
| 7 | ∞ | 1.00 | | 1.5163 | 64.1 |
| 8 | ∞ | 0.40 | | 1.5163 | 64.1 |
| Image plane | ∞ | | | | |

FFS [1]

$C_5$ −5.4098 × 10⁻⁴ $C_7$ −3.6662 × 10⁻² $C_8$ −3.9919 × 10⁻³
$C_{10}$ 4.2812 × 10⁻³ $C_{12}$ −2.8547 × 10⁻⁴ $C_{14}$ −9.5475 × 10⁻³
$C_{16}$ −7.2133 × 10⁻⁴ $C_{19}$ 2.0159 × 10⁻³ $C_{21}$ −1.2098 × 10⁻⁵
$C_{25}$ 6.1544 × 10⁻³ $C_{27}$ 5.3401 × 10⁻³

FFS [2]

$C_5$ 2.3890 × 10⁻² $C_7$ 1.3102 × 10⁻² $C_8$ −1.4977 × 10⁻⁴
$C_{10}$ 2.0852 × 10⁻³ $C_{12}$ 3.4984 × 10⁻⁵ $C_{14}$ −1.2395 × 10⁻³
$C_{16}$ 6.2888 × 10⁻⁵ $C_{19}$ 3.1597 × 10⁻⁴ $C_{21}$ −4.5153 × 10⁻⁵
$C_{25}$ 1.0390 × 10⁻⁵ $C_{27}$ 1.7082 × 10⁻⁵

FFS [3]

$C_5$ −4.5072 × 10⁻² $C_7$ −3.8407 × 10⁻² $C_8$ 6.5075 × 10⁻⁴
$C_{10}$ 8.0919 × 10⁻⁴ $C_{12}$ −1.4449 × 10⁻⁴ $C_{14}$ 5.5189 × 10⁻⁵
$C_{16}$ −9.4637 × 10⁻⁵ $C_{17}$ 1.9342 × 10⁻⁵ $C_{19}$ 1.0230 × 10⁻⁴
$C_{21}$ 7.0738 × 10⁻⁶ $C_{25}$ −1.7986 × 10⁻⁵ $C_{27}$ −1.4899 × 10⁻⁶

| | | Displacement and tilt (1) | | | |
|---|---|---|---|---|---|
| x | 0.000 | y | 0.000 | z | 0.484 |
| α | 14.26 | β | 0.00 | γ | 0.00 |
| | | Displacement and tilt (2) | | | |
| x | 0.000 | y | 0.310 | z | 3.235 |
| α | −34.47 | β | 0.00 | γ | 0.00 |
| | | Displacement and tilt (3) | | | |
| x | 0.000 | y | 2.988 | z | 2.536 |
| α | 119.43 | β | 0.00 | γ | 0.00 |
| | | Displacement and tilt (4) | | | |
| x | 0.000 | y | −2.312 | z | 6.945 |
| α | −50.07 | β | 0.00 | γ | 0.00 |

EXAMPLE 9

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS [1] | | (1) | 1.8061 | 40.9 |
| 3 | 25.588 | | (2) | 1.8061 | 40.9 |
| 4 | FFS [2] | | (3) | 1.8061 | 40.9 |
| 5 | 25.588 | | (2) | | |
| 6 | ∞ | 0.00 | (4) | | |
| 7 | ∞ | 1.00 | | 1.5163 | 64.1 |
| 8 | ∞ | 0.40 | | 1.5163 | 64.1 |
| Image plane | ∞ | | | | |

-continued

| FFS [1] | | | | | |
|---|---|---|---|---|---|
| $C_5$ | $-1.2542 \times 10^{-2}$ | $C_7$ | $-4.2947 \times 10^{-2}$ | $C_{10}$ | $2.5821 \times 10^{-3}$ |
| $C_{14}$ | $6.6025 \times 10^{-3}$ | $C_{19}$ | $-3.0926 \times 10^{-4}$ | $C_{21}$ | $-6.0066 \times 10^{-4}$ |
| FFS [2] | | | | | |
| $C_5$ | $-4.3080 \times 10^{-2}$ | $C_7$ | $-4.2205 \times 10^{-2}$ | $C_8$ | $6.5283 \times 10^{-4}$ |
| $C_{10}$ | $2.0953 \times 10^{-4}$ | $C_{12}$ | $-1.8831 \times 10^{-4}$ | $C_{14}$ | $-1.1569 \times 10^{-4}$ |
| $C_{16}$ | $-1.0976 \times 10^{-4}$ | $C_{17}$ | $2.0676 \times 10^{-5}$ | $C_{19}$ | $3.1183 \times 10^{-5}$ |
| $C_{21}$ | $1.7044 \times 10^{-5}$ | | | | |

Displacement and tilt (1)

| x | 0.000 | y | 0.000 | z | 1.768 |
|---|---|---|---|---|---|
| α | 14.63 | β | 0.00 | γ | 0.00 |

Displacement and tilt (2)

| x | 0.000 | y | 0.318 | z | 4.518 |
|---|---|---|---|---|---|
| α | −41.57 | β | 0.00 | γ | 0.00 |

Displacement and tilt (3)

| x | 0.000 | y | 3.086 | z | 4.506 |
|---|---|---|---|---|---|
| α | 109.22 | β | 0.00 | γ | 0.00 |

Displacement and tilt (4)

| x | 0.000 | y | −2.821 | z | 8.493 |
|---|---|---|---|---|---|
| α | −54.38 | β | 0.00 | γ | 0.00 |

EXAMPLE 10

| Surface No. | Radius of curvature | Surface separation | Displacement and tilt | Refractive index | Abbe's No. |
|---|---|---|---|---|---|
| Object plane | ∞ | ∞ | | | |
| 1 | FFS [1] | | (1) | 1.8061 | 40.9 |
| 2 | FFS [2] | | (2) | 1.8061 | 40.9 |
| 3 | ∞ (Stop) | | (3) | 1.8061 | 40.9 |
| 4 | FFS [3] | | (3) | 1.8061 | 40.9 |
| 5 | FFS [2] | | (2) | | |
| 6 | ∞ | 0.00 | (4) | | |
| 7 | ∞ | 1.00 | | 1.5163 | 64.1 |
| 8 | ∞ | 0.40 | | 1.5163 | 64.1 |
| Image plane | ∞ | | | | |

| FFS [1] | | | | | |
|---|---|---|---|---|---|
| $C_5$ | $4.1666 \times 10^{-2}$ | $C_7$ | $1.7130 \times 10^{-2}$ | $C_8$ | $-7.8013 \times 10^{-3}$ |
| $C_{10}$ | $-2.5957 \times 10^{-3}$ | $C_{12}$ | $-9.0153 \times 10^{-4}$ | $C_{14}$ | $-2.9032 \times 10^{-3}$ |
| $C_{16}$ | $-2.1507 \times 10^{-3}$ | $C_{19}$ | $3.7243 \times 10^{-4}$ | $C_{21}$ | $1.8921 \times 10^{-4}$ |
| $C_{25}$ | $-7.4923 \times 10^{-5}$ | $C_{27}$ | $-1.0832 \times 10^{-4}$ | | |
| FFS [2] | | | | | |
| $C_5$ | $2.0410 \times 10^{-2}$ | $C_7$ | $1.2173 \times 10^{-2}$ | $C_8$ | $-1.1783 \times 10^{-3}$ |
| $C_{10}$ | $5.8900 \times 10^{-4}$ | $C_{12}$ | $-1.4882 \times 10^{-4}$ | $C_{14}$ | $-3.6434 \times 10^{-4}$ |
| $C_{16}$ | $-9.7276 \times 10^{-4}$ | $C_{19}$ | $3.5787 \times 10^{-4}$ | $C_{21}$ | $1.7767 \times 10^{-4}$ |
| $C_{25}$ | $2.5538 \times 10^{-4}$ | $C_{27}$ | $1.2916 \times 10^{-4}$ | | |
| FFS [3] | | | | | |
| $C_5$ | $-3.9880 \times 10^{-2}$ | $C_7$ | $-3.4769 \times 10^{-2}$ | $C_8$ | $2.5963 \times 10^{-4}$ |
| $C_{10}$ | $1.8126 \times 10^{-3}$ | $C_{12}$ | $1.0148 \times 10^{-4}$ | $C_{14}$ | $-2.4042 \times 10^{-4}$ |
| $C_{16}$ | $2.7688 \times 10^{-4}$ | $C_{17}$ | $-1.2753 \times 10^{-4}$ | $C_{19}$ | $1.3090 \times 10^{-4}$ |
| $C_{21}$ | $-1.7726 \times 10^{-5}$ | $C_{25}$ | $-9.7686 \times 10^{-4}$ | $C_{27}$ | $-6.6247 \times 10^{-4}$ |

Displacement and tilt (1)

| x | 0.000 | y | 0.000 | z | 0.000 |
|---|---|---|---|---|---|
| α | 12.42 | β | 0.00 | γ | 0.00 |

Displacement and tilt (2)

| x | 0.000 | y | 0.336 | z | 3.430 |
|---|---|---|---|---|---|
| α | −35.11 | β | 0.00 | γ | 0.00 |

Displacement and tilt (3)

| x | 0.000 | y | 3.020 | z | 2.751 |
|---|---|---|---|---|---|
| α | 119.19 | β | 0.00 | γ | 0.00 |

Displacement and tilt (4)

| x | 0.000 | y | −0.999 | z | 6.048 |
|---|---|---|---|---|---|
| α | −46.56 | β | 0.00 | γ | 0.00 |

Values concerning the conditions (1) to (3) and (5) to (12) in each of Examples 1 to 8 are shown in the tables below. In the tables, DY1 and DY2 are the values DY of the first and second reflecting surfaces 6 and 7, respectively; Px1 and Px2 are the values Pxn of the first and second reflecting surfaces 6 and 7, respectively; Py1 and Py2 are the values Pyn of the first and second reflecting surfaces 6 and 7, respectively; and Cx1 and Cx2 are the values Cxn of the first and second reflecting surfaces 6 and 7, respectively. DTx and DTy are the maximum values (%) of distortions in the X- and Y-axis directions, respectively.

| | Ex. 1 | Ex. 2 | Ex. 3 | Ex. 4 | Ex. 5 |
|---|---|---|---|---|---|
| p × Py | 1.65 | 1.65 | 3.21 | 1.71 | 0.95 |
| Δθ | — | — | — | — | 4.0880 |
| Δh × Py | — | — | — | — | 0.0050 |
| \|Px2/Px1\| | 2.2959 | 2.6800 | 1.7121 | 2.4840 | 1.7397 |
| \|Px3/Px2\| | 0.0992 | 0.0338 | 0.0223 | 0.0357 | 0.0924 |
| DY1 | 0.0025 | −0.0031 | −0.0068 | −0.0032 | −0.0002 |
| DY2 | 0.0079 | 0.0027 | −0.0038 | 0.0028 | 0.0019 |
| \|Cx1/Px1\| | 0.0078 | 0.1694 | 0.1886 | 0.1607 | 0.0286 |
| \|Cx2/Px2\| | 0.0087 | 0.0059 | 0.0645 | 0.0074 | 0.0093 |
| \|Px1/Px\| | 1.0565 | 0.6552 | 0.7661 | 0.7250 | 0.8177 |
| \|Px2/Px\| | 2.4257 | 1.7559 | 1.3117 | 1.8008 | 1.4226 |
| \|Py1/Py\| | 1.4969 | 0.0030 | 0.1858 | 0.0351 | 0.1930 |
| \|Py2/Py\| | 2.6536 | 1.1452 | 0.9956 | 1.2001 | 1.0610 |
| \|Px/Py\| | 0.9869 | 0.9905 | 0.9820 | 0.9897 | 0.9912 |
| \|DTx\| max | 10.46 | 6.15 | 11.35 | 6.22 | 3.11 |
| \|DTy\| max | 10.58 | 5.54 | 8.93 | 5.54 | 2.91 |

| | Ex. 6 | Ex. 7 | Ex. 8 |
|---|---|---|---|
| p × Py | 4.36 | 0.64 | 0.53 |
| Δθ | — | — | — |
| Δh × Py | — | — | — |
| \|Px2/Px1\| | 4.1691 | 4.7573 | 2.9314 |
| \|Px3/Px2\| | 0.0116 | 0.1533 | 0.1346 |
| DY1 | −0.0053 | −0.0022 | 0.0013 |
| DY2 | 0.0052 | −0.0002 | 0.0001 |
| \|Cx1/Px1\| | 0.3098 | 0.3204 | 0.0656 |
| \|Cx2/Px2\| | 0.0219 | 0.0162 | 0.0166 |
| \|Px1/Px\| | 0.2202 | 0.1823 | 0.5057 |
| \|Px2/Px\| | 0.9181 | 0.8672 | 1.4823 |
| \|Py1/Py\| | 0.0022 | 0.3162 | 0.896 |
| \|Py2/Py\| | 0.7040 | 0.2103 | 1.6904 |
| \|Px/Py\| | 0.9939 | 0.9744 | 0.9718 |
| \|DTx\| max | 11.20 | 3.65 | 8.80 |
| \|DTy\| max | 10.31 | 2.68 | 7.49 |

Values concerning the conditions (13), (17) to (24) in Example 9 according to the second aspect of the present invention (described later) are shown in the tables below, in which some values concerning the first reflecting surface 6, which is a spherical surface, are also shown. In the tables, DY1 and DY2 are the values DY of the first and second reflecting surfaces 6 and 7, respectively; Px1 and Px2 are the values Pxn of the first and second reflecting surfaces 6 and 7, respectively; Py1 and Py2 are the values Pyn of the first and second reflecting surfaces 6 and 7, respectively; and Cx1 and Cx2 are the values Cxn of the first and second reflecting surfaces 6 and 7, respectively. DTx and DTy are the maximum values (%) of distortions in the X- and Y-axis directions, respectively.

| | | | |
|---|---|---|---|
| p x Py | 0.53105 | \|Px1/Px\| | 0.75329 |
| \|Px2/Px1\| | 2.15985 | \|Px2/Px\| | 1.627 |
| \|Px3/Px2\| | 0.475 | \|Py1/Py\| | 0.73106 |
| DY1 | 0.0000 | \|Py2/Py\| | 1.61172 |
| DY2 | 0.0000 | \|Px/Py\| | 0.97048 |
| \|Cx1/Px1\| | 0 | \|DTx\|max | 8.67646 |
| \|Cx2/Px2\| | 0.00612 | \|DTy\|max | 7.22528 |

Values concerning the conditions (25), (29) to (36) in Example 10 according to the third aspect of the present invention (described later) are shown in the tables below. In the tables, DY1 and DY2 are the values DY of the first and second reflecting surfaces 6 and 7, respectively; Px1 and Px2 are the values Pxn of the first and second reflecting surfaces 6 and 7, respectively; Py1 and Py2 are the values Pyn of the first and second reflecting surfaces 6 and 7, respectively; and Cx1 and Cx2 are the values Cxn of the first and second reflecting surfaces 6 and 7, respectively. DTx and DTy are the maximum values (%) of distortions in the X- and Y-axis directions, respectively.

| | | | |
|---|---|---|---|
| p x Py | 0.6695 | \|Px1/Px\| | 0.4588 |
| \|Px2/Px1\| | 2.8562 | \|Px2/Px\| | 1.3104 |
| \|Px3/Px2\| | 0.2232 | \|Py1/Py\| | 0.7554 |
| DY1 | 0.0002 | \|Py2/Py\| | 1.4760 |
| DY2 | 0.0000 | \|Px/Py\| | 0.9820 |
| \|Cx1/Px1\| | 0.0192 | \|DTx\|max | 6.2521 |
| \|Cx2/Px2\| | 0.0000 | \|DTy\|max | 6.0745 |

It should be noted that the present invention includes not only an image pickup optical system but also an image pickup apparatus incorporating the image pickup optical system.

Figure 11:
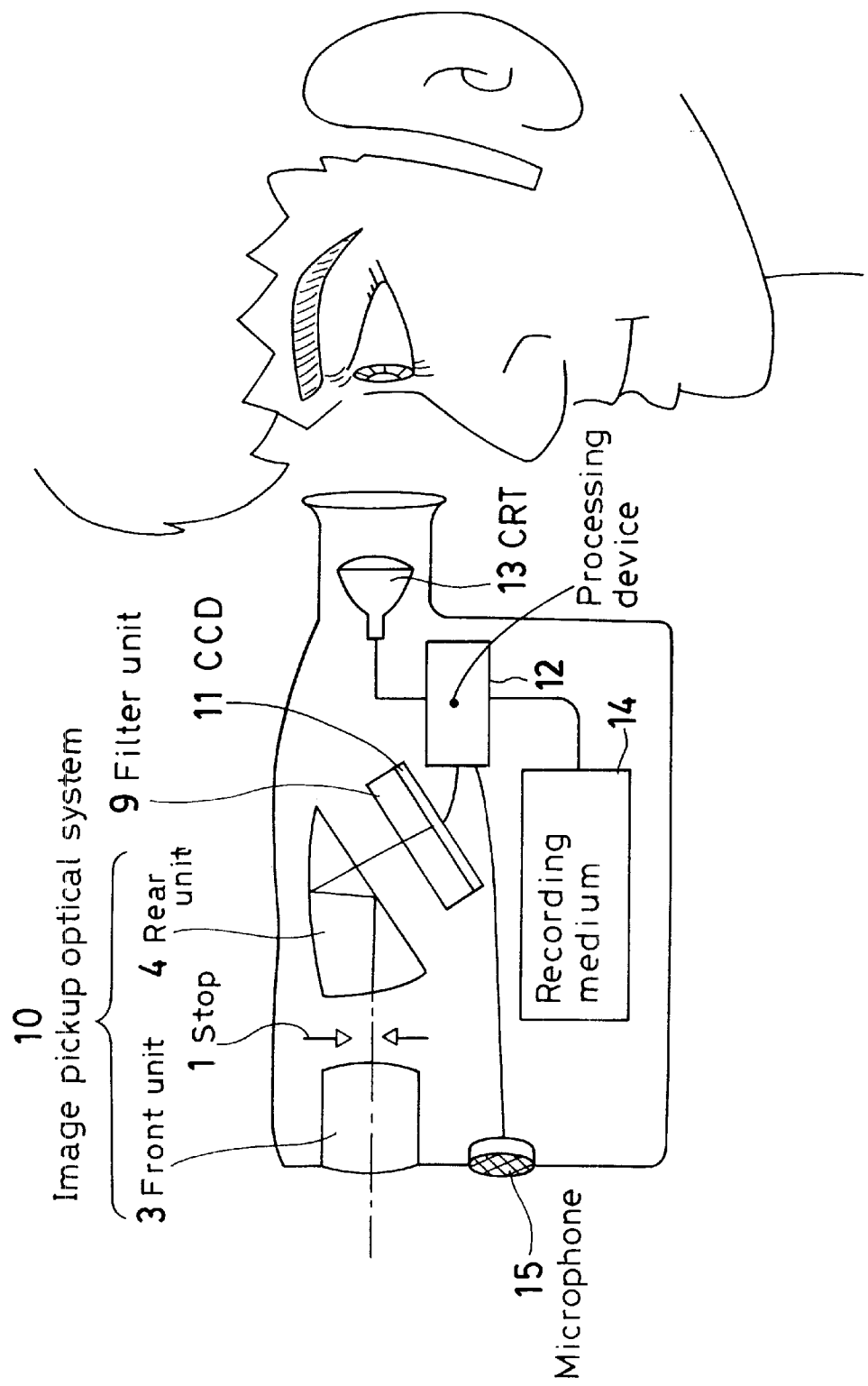
FIG. 11 is a conceptual view showing an arrangement in which an image pickup optical system according to the present invention is incorporated in an image pickup apparatus.

An image pickup optical system according to the present invention arranged as described above may be used in an image pickup apparatus such as a compact TV camera using, for example, a CCD as an image pickup device. FIG. 11 is a conceptual view showing an arrangement in which an image pickup optical system 10 according to the present invention (which may have no front unit 3; the stop 1 is disposed in the decentered prism optical system 4 according to the third aspect of the present invention) is incorporated into an image pickup apparatus using a CCD 11 as an electronic image pickup device. In the image pickup apparatus, an object image is formed on the CCD 11 disposed in the image plane by the image pickup optical system 10 through a filter unit 9 including an infrared cutoff filter, an optical low-pass filter, etc. The object image is converted into an image signal by the CCD 11. The image signal is processed by a processing device 12 and displayed directly on a CRT 13 operating as an electronic finder. In addition, the image signal is recorded on a recording medium 14 contained in the image pickup apparatus. Further, the image pickup apparatus has a microphone 15 to record sound information at the same time as the image signal is recorded. As stated above, the image pickup apparatus may be arranged such that the processing device 12 corrects distortion and lateral chromatic aberrations produced in the image pickup optical system 10 by using a digital image processing technique on the basis of information concerning distortion and lateral chromatic aberrations of the optical system 10 previously stored in the recording medium 14 or a memory or the like attached to the processing device 12.

The size and production cost of the image pickup apparatus can be reduced by reducing the number of constituent elements and size of the image pickup optical system 10 on the basis of the present invention.

The image pickup optical system according to the second aspect of the present invention, which is provided to attain the aforementioned object, will be described below in detail.

According to the second aspect of the present invention, there is provided an image pickup optical system for forming an image of an object on a surface of an image pickup device. The image pickup optical system has at least a rear optical unit on the image side of a pupil plane. The rear optical unit includes an optical system having at least three surfaces each decentered such that the whole surface is tilted with respect to an axial principal ray defined by a light ray emanating from the center of the object and passing through the center of the pupil to reach the center of the image. The at least three surfaces include a surface having a transmitting action, a curved surface with a rotationally symmetric surface configuration that has both reflecting and transmitting actions, and a curved surface with a rotationally asymmetric surface configuration that has a reflecting action and corrects rotationally asymmetric decentration aberrations caused by decentration.

In this case, it is desirable that the curved surface with a rotationally symmetric surface configuration that has both reflecting and transmitting actions should be formed from a totally reflecting surface or a semitransparent reflecting surface.

It is desirable that each surface having a reflecting action should be formed from a coated mirror surface.

It is desirable that the surface having a reflecting action should be disposed to face the surface having both reflecting and transmitting actions.

Moreover, assuming that a direction in which the axial principal ray travels until it reaches an entrance surface of the optical system is defined as a Z-axis direction, and a Y-axis direction is taken in the plane of decentration of the decentered surfaces, and further an axis constituting an orthogonal coordinate system in combination with the Y- and Z-axes is defined as an X-axis, and further that the axial principal ray and a light ray which is parallel to the axial principal ray at a slight distance d in the Y-axis direction are made to enter the optical system from the entrance surface side thereof, and the sine of an angle formed between the two rays in the YZ-plane at the exit side of the optical system is denoted by NA'yi, and further that a value obtained by dividing NA'yi by the distance d between the parallel rays, i.e. NA'yi/d, is defined as a power Py in the Y-axis direction of the optical system, and p is an optical path length for the axial principal ray from the entrance surface of the prism member to the exit surface of the prism member, it is desirable to satisfy the following condition:

$$0.1 < p \times Py < 8 \tag{13}$$

First of all, a coordinate system used in the following description will be explained.

Figure 12:
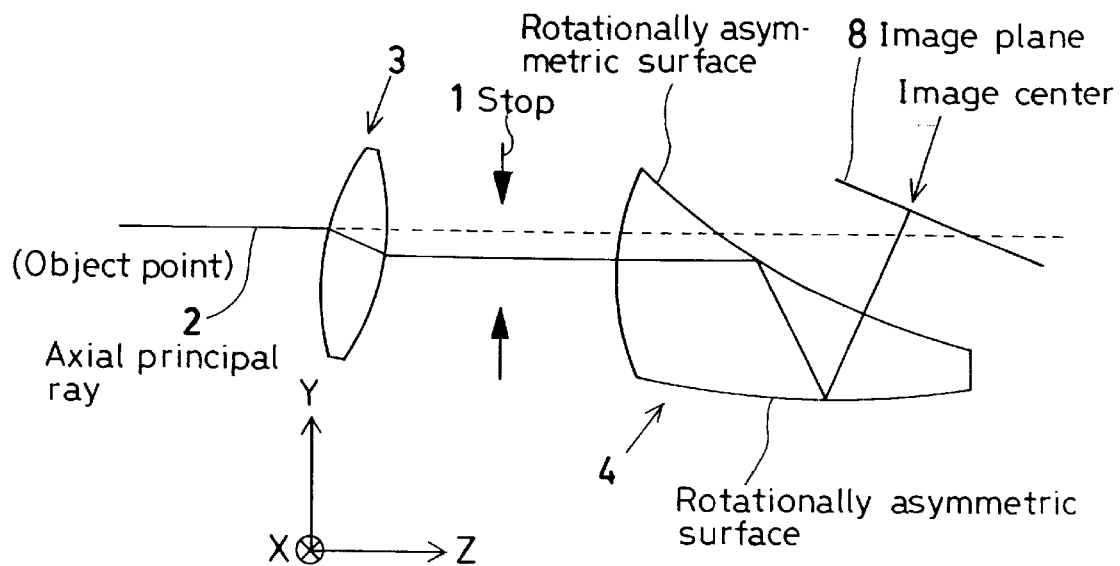
FIG. 12 is a diagram for explaining an axial principal ray and a coordinate system in the present invention.

As shown in FIG. 12, it is assumed that a light ray passing through the center of an object point and passing through the center of a stop 1 to reach the center of an image plane 8 is defined as an axial principal ray 2. It is also assumed that an optical axis defined by a straight line along which the axial principal ray 2 travels until it intersects the first surface of the optical system is defined as a Z-axis, and that an axis perpendicularly intersecting the Z-axis in the decentration plane of the decentered surfaces constituting the image pickup optical system is defined as a Y-axis, and further that an axis perpendicularly intersecting the Z-axis and also perpendicularly intersecting the Y-axis is defined as an X-axis.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole. On the other hand, aspherical surfaces and the like are used to favorably effect aberration correction with a minimal number of surfaces. The reason for this is to reduce various aberrations which would be produced by spherical surfaces. However, in a decentered optical system, rotationally asymmetric aberrations due to decentration cannot be corrected by a rotationally symmetric optical system.

The arrangement and operation of the image pickup optical system according to the second aspect of the present invention will be described below.

Figure 13:
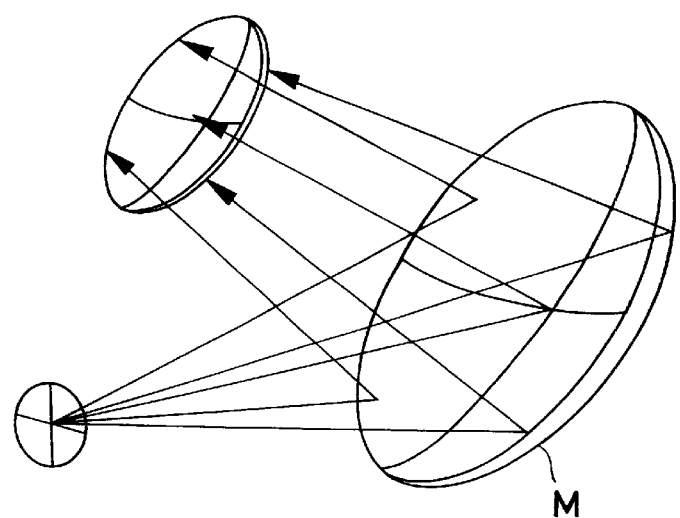
FIG. 13 is a conceptual view for explaining curvature of field produced by a decentered reflecting surface.
Figure 14:
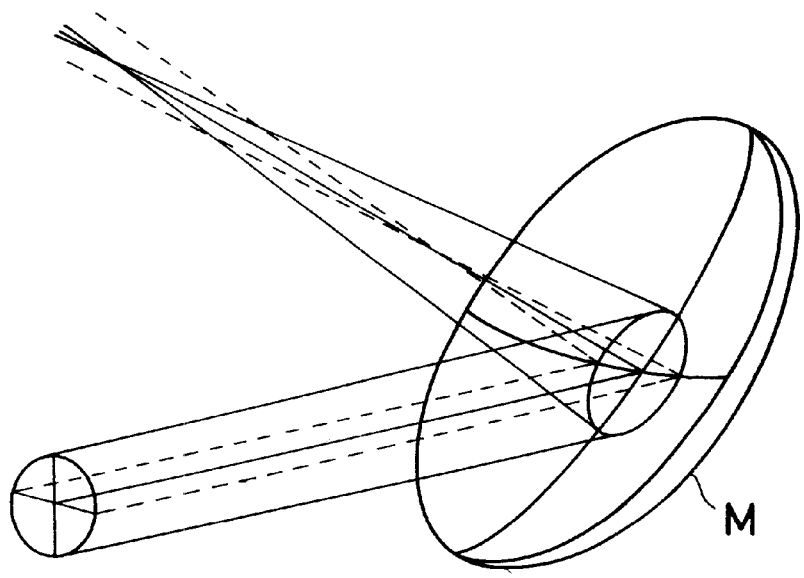
FIG. 14 is a conceptual view for explaining astigmatism produced by a decentered reflecting surface.
Figure 15:
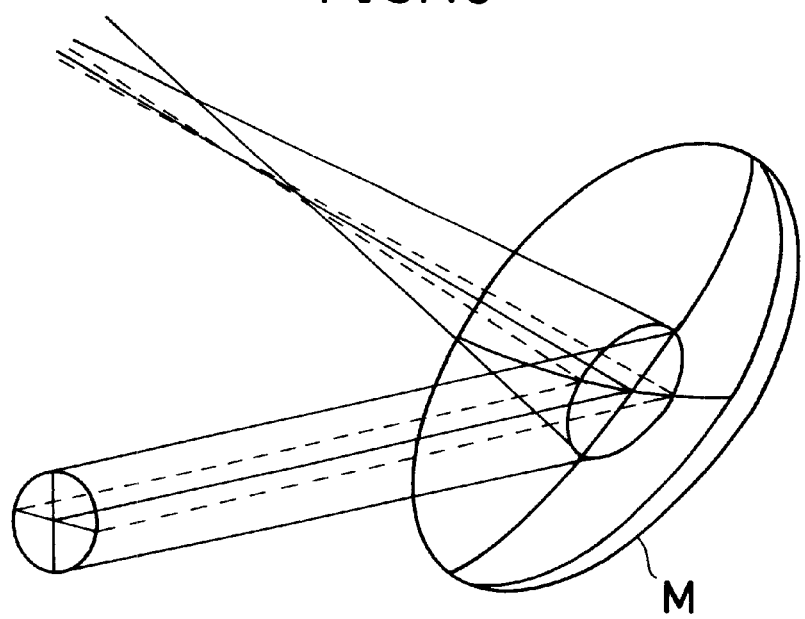
FIG. 15 is a conceptual view for explaining coma produced by a decentered reflecting surface.

When a rotationally symmetric optical system is decentered, rotationally asymmetric aberrations occur, and it is impossible to correct these aberrations only by a rotationally symmetric optical system. Rotationally asymmetric aberrations due to decentration include image distortion, curvature of field, and astigmatic and comatic aberrations, which occur even on the axis. FIG. 13 shows curvature of field produced by a decentered concave mirror M. FIG. 14 shows astigmatism produced by a decentered concave mirror M. FIG. 15 shows axial comatic aberration produced by a decentered concave mirror M. Accordingly to the second aspect of the present invention, a rotationally asymmetric surface is disposed in the optical system to correct such rotationally asymmetric aberrations caused by decentration.

Rotationally asymmetric aberrations produced by a decentered concave mirror include rotationally asymmetric curvature of field. For example, when light rays from an infinitely distant object point are incident on a decentered concave mirror, the light rays are reflected by the concave mirror to form an image. In this case, the back focal length from that portion of the concave mirror on which the light rays strike to the image surface is a half the curvature of the portion on which the light rays strike. Consequently, an image surface tilted with respect to the axial principal ray is formed as shown in FIG. 13. It has heretofore been impossible to correct such rotationally asymmetric curvature of field by a rotationally symmetric optical system. The tilted curvature of field can be corrected by forming the concave mirror M from a rotationally asymmetric surface, and, in this example, arranging it such that the curvature is made strong (refracting power is increased) in the positive Y-axis direction (the upward direction in the figure), whereas the curvature is made weak (refracting power is reduced) in the negative Y-axis direction (the downward direction in the figure). It is also possible to obtain a flat image surface with a minimal number of constituent surfaces by disposing a rotationally asymmetric surface having the same effect as that of the above-described arrangement in the optical system separately from the concave mirror M.

Next, rotationally asymmetric astigmatism will be explained. A decentered concave mirror M produces astigmatism even for axial rays, as shown in FIG. 14, as in the case of the above. The astigmatism can be corrected by appropriately changing the curvatures in the X- and Y-axis directions of the rotationally asymmetric surface as in the case of the above.

Rotationally asymmetric coma will be explained below. A decentered concave mirror M produces coma even for axial rays, as shown in FIG. 15, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

If the image pickup optical system according to the second aspect of the present invention is arranged to have a folded optical path, it is possible to impart power to a reflecting surface and hence possible to omit a transmission lens. Moreover, because the optical path is folded, the optical system can be formed in a compact structure.

If the reflecting surface is a totally reflecting surface tilted with respect to light rays so that the light rays are incident thereon at an angle exceeding the critical angle, a high reflectivity can be obtained, and it is possible to enable the surface to have both reflecting and transmitting actions. The reflecting surface is preferably a reflecting surface having a thin film of a metal, e.g. aluminum or silver, formed thereon, or a reflecting surface formed from a dielectric multilayer film, or a semitransparent reflecting surface. In the case of a metal thin film having reflecting action, a high reflectivity can be readily obtained. The use of a dielectric reflecting film is advantageous in a case where a reflecting film having wavelength selectivity or a reflecting film having minimal absorption is to be formed.

It is preferable to use a rotationally asymmetric surface as a reflecting surface. By doing so, no chromatic aberration is produced in contrast to a case where it is used as a transmitting surface. Moreover, even if the tilt of the surface is small, the surface can bend light rays. Accordingly, the amount of other aberrations produced by the surface is also small. In other words, when the same refracting power is to be obtained, the amount of aberration produced by a reflecting surface is smaller than by a refracting surface.

Regarding an optical system designed to form an image relatively small in size as in the image pickup optical system according to the second aspect of the present invention, the optical system can be made compact in size on drawings by the principle of coefficient multiplication. However, in view of the actual production, it is not preferable to make the image pickup optical system excessively small in size because the thickness of the edge and center of the lens would be excessively reduced and the lens diameter would become excessively small, causing the production cost to increase unfavorably. In the case of a conventional optical system comprising a refracting lens system, if the optical system is constructed in conformity to a producible size, an unfavorably long distance must be ensured between refracting surfaces having power because the optical axis is straight, resulting in a waste of space. If the optical axis is spatially folded by using reflecting surfaces, an optical path necessary for image formation can be ensured by effectively utilizing a relatively small space. In this case, if the optical path length of the image pickup optical system is unnecessarily long, the optical system increases in size contrary to the purpose of effectively using the space by employing an arrangement in which the optical axis is folded by decentration. In addition, if the optical path length is excessively long in comparison to the image formed by the optical system, it is difficult to ensure the back focus required for disposing a member for capturing an optical image, e.g. a film or an image pickup device.

According to the second aspect of the present invention, a compact optical system is successfully constructed by adopting a folded optical path and, at the same time, satisfying the following conditions.

That is, in the image pickup optical system according to the present invention, it is desirable for the rear optical unit to further have at least a second reflecting surface disposed to face the first reflecting surface.

Moreover, assuming that a direction in which the axial principal ray travels until it reaches a first surface of the optical system is defined as a Z-axis direction, and a Y-axis direction is taken in the plane of decentration of the decentered surfaces, and further an axis constituting an orthogonal coordinate system in combination with the Y- and Z-axes is defined as an X-axis, and further that the axial principal ray and a light ray which is parallel to the axial principal ray at a slight distance d in the Y-axis direction are made to enter the optical system from the entrance surface side thereof, and the sine of an angle formed between the two rays in the YZ-plane at the exit side of the optical system is denoted by NA'yi, and further that a value obtained by dividing NA'yi by the distance d between the parallel rays, i.e. NA'yi/d, is defined as a power Py in the Y-axis direction of the optical system, and p is an optical path length from a point at which the axial principal ray enters a constituent element of the optical system disposed closest to the object and having a rotationally asymmetric surface to a point at which the axial principal ray exits from a constituent element of the optical system disposed closest to the image and having a rotationally asymmetric surface, it is desirable to satisfy the following condition:

$$0.1 < p \times Py < 8 \tag{13}$$

Figure 16:
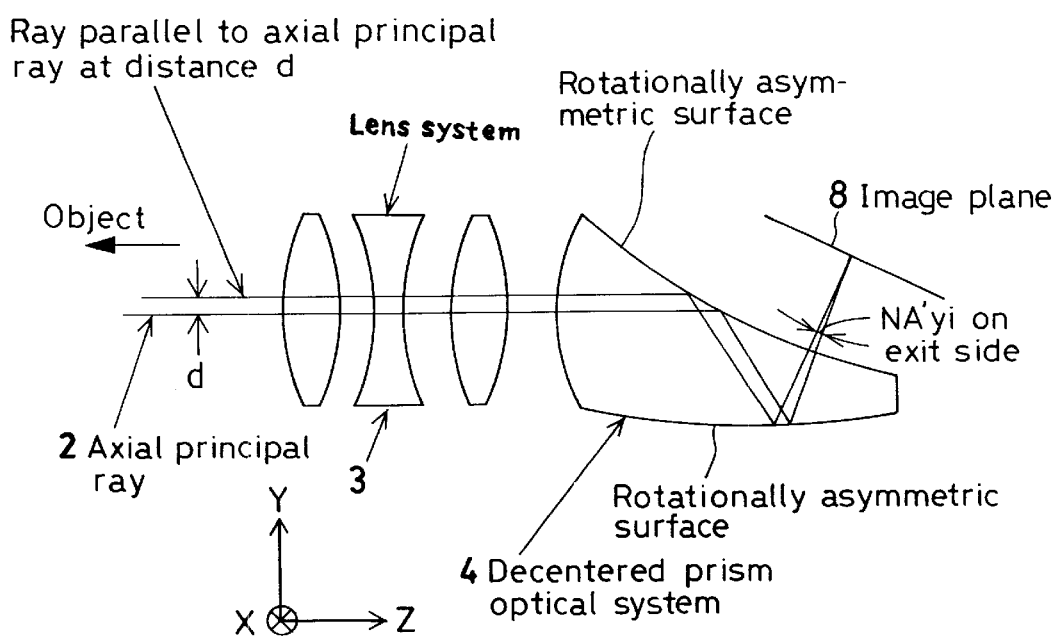
FIG. 16 is a diagram for explaining a power in an image pickup optical system according to the present invention.

First, let us define the power of the optical system according to the second aspect of the present invention. As shown in FIG. 16, when the direction of decentration of the optical system is taken in the Y-axis direction, the axial principal ray 2 and a light ray which is parallel to the axial principal ray 2 and which has a small height d in the YZ-plane are made to enter the optical system from the object side thereof, and the sine of an angle formed between the two rays in the YZ-plane at the exit side of the optical system is denoted by NA'yi. Further, NA'yi/d is defined as the power Py in the Y-axis direction of the entire optical system. Similarly, the axial principal ray 2 and a light ray which is parallel to the axial principal ray 2 and which has a small height d in the XZ-plane are made to enter the optical system from the object side thereof, and the sine of an angle formed between the two rays in a plane perpendicular to the YZ-plane and containing the emergent axial principal ray 2 at the exit side of the optical system is denoted by NA'xi. Further, NA'xi/d is defined as the power Px in the X-axis direction of the entire optical system.

Further, assuming that p is an optical path length from a point at which the axial principal ray enters a constituent element of the optical system disposed closest to the object and having a rotationally asymmetric surface to a point at which the axial principal ray exits from a constituent element of the optical system disposed closest to the image and having a rotationally asymmetric surface (in FIG. 16, the two optical system constituent elements form the same decentered prism optical system 4; therefore, p is the optical path length of the axial principal ray 2 in the decentered prism optical system 4), it is desirable to arrange the optical system so as to satisfy the above condition (13) from the viewpoint of forming the optical system in a compact structure.

It is more desirable to satisfy the following condition:

$$0.5 < p \times Py < 5.0 \tag{13'}$$

By satisfying the above condition (13)', a compact lens system can be attained.

It is even more desirable to satisfy the following condition:

$$0.5 < p \times Py < 0.7 \tag{13''}$$

By satisfying the above condition (13)", an even more compact lens system can be attained.

If the optical system constituent elements having rotationally asymmetric surfaces in the image pickup optical system according to the second aspect of the present invention are formed from a first and second reflecting surfaces and a first and second transmitting surfaces, the optical axis can be folded by the two reflecting surfaces, and thus the optical system can be made compact in size. Further, because there are two transmitting surfaces, even more favorable results can be obtained with respect to the principal point position and curvature of field.

Further, if the two reflecting surfaces are back-coated mirrors, even more favorable aberration correcting performance can be obtained.

Incidentally, if the pupil is not positioned outside the optical system on the object side, the optical system becomes large in size, and the optical path length p becomes excessively long. Alternatively, it becomes difficult to ensure the required back focus. Further, if a decentered rotationally asymmetric surface is assigned an excessively strong power, it becomes difficult to correct asymmetric aberrations caused by decentration, particularly comatic aberrations due to decentration. Therefore, it is useful for improving the optical performance to assign a part of the power to an optical system additionally disposed on the object side of the rotationally asymmetric surface.

In a case where a stop is disposed on the object side of an optical system constituent element having a rotationally asymmetric surface, it is useful for protecting the stop member to dispose an optical member on the object side of the stop. In a case where a reflecting surface is formed from a surface-coated mirror, the provision of such an optical member is useful as a dustproof measure.

In the image pickup optical system according to the second aspect of the present invention, decentration aberrations can be corrected by a decentered rotationally asymmetric surface, and it is preferable to dispose an optical member on the object side of the decentered rotationally asymmetric surface so that the optical member performs overall aberration correction in combination with the decentered rotationally asymmetric reflecting surface. In this case, if the optical member is decentered, aberration correction can be uniformly made. Therefore, it is preferable to decenter the optical member from the viewpoint of favorably correcting asymmetric aberrations.

In the image pickup optical system according to the second aspect of the present invention, if the number of surfaces of optical system constituent elements having decentered rotationally asymmetric reflecting surfaces is reduced or the optical system constituent elements are constructed in the form of a prism block, the optical system becomes large in size unless the stop is positioned outside the optical system on the object side. In this case, all the powers deviate to the image side relative to the stop. Correction of distortion needs both negative and positive powers. If the negative power is made excessively strong, the optical system becomes large in size, and the optical path length increases unfavorably. Therefore, it is preferable to dispose a positive lens on the object side of the stop to thereby correct distortion. In a case where the optical system constituent elements having decentered rotationally asymmetric reflecting surfaces are formed as a prism block, it becomes difficult to correct chromatic aberration produced to an extent by transmitting surfaces; the chromatic aberration can be effectively corrected by disposing a positive lens on the object side of the stop. To correct asymmetric aberrations in particular, it is preferable to decenter the positive lens.

When it is intended to construct a wide-angle lens system having a particularly wide field angle, the focal length shortens, making it difficult to ensure the required back focus. In such a case, it is preferable to adopt a retrofocus type in which a negative power and a positive power are distributed in order from the object side. Moreover, it is preferable to strengthen the negative power and to widen the distance between the negative and positive lens units as much as possible. However, if a negative power is given to a decentered rotationally asymmetric surface, decentration aberrations become so large that they are difficult to correct. In particular, it is difficult to correct the asymmetry of coma.

Therefore, it is preferable to dispose a concave lens on the object side, assign the negative power to an ordinary refracting lens, widen the distance between the negative and positive lens units and fold the optical axis to thereby arrange the optical system in a compact form.

In a case where the optical system constituent elements having decentered rotationally asymmetric reflecting surfaces are constructed in the form of a single block and a stop is provided, it is preferable to provide the stop on the object side of the block from the viewpoint of avoiding an increase in the size of the block. In this case, it is preferable to dispose on the object side of the stop an optical member which serves also as a stop protecting device and whose optical power is approximately zero. In a case where an electronic image pickup device is used, the back focus can be effectively shortened by imparting an optical low-pass filter function to a surface, for example, by a method wherein the area in the surface is divided into regions, and a small amount of tilt is given to the surface for each region, thereby providing the surface with the function of slightly changing the travel direction of light.

Assuming that θ and h are the amounts of change in angle and position, respectively, of the axial principal ray introduced between the entrance into and the exit from a front optical unit disposed on the object side of the optical system constituent elements having decentered rotationally asymmetric reflecting surfaces, it is desirable to satisfy at least one of the following conditions (14) and (15):

$$0.1°<\Delta\theta<45°\qquad(14)$$

$$0<\Delta h\times Py<1.0\qquad(15)$$

where Py is the power in the Y-axis direction of the optical system.

If Δθ is not larger than the lower limit of the condition (14) or Δh×Py is not larger than the lower limit of the condition (15), there is no sense in decentering the surfaces. If Δθ is not smaller than the upper limit of the condition (14) or Δh×Py is not smaller than the upper limit of the condition (15), decentration aberrations at each part become excessively large and hence difficult to correct.

It is more desirable to satisfy at least one of the following conditions (14)' and (15)':

$$1°<\Delta\theta<30°\qquad(14)'$$

$$0.005<\Delta h\times Py<0.5\qquad(15)'$$

Incidentally, if the first reflecting surface and second transmitting surface of the optical system constituent elements having decentered rotationally asymmetric reflecting surfaces are arranged to be the identical surface, the number of surfaces to be formed is three, and the productivity improves.

If the first reflecting surface is arranged to use total reflection as reflection taking place at it, a high reflectivity can be obtained as described above, and the loss of light can be minimized. In addition, the production becomes easy when the reflecting and transmitting surfaces are arranged to be the identical surface.

It is possible to expect reduction in the size and cost of the optical system through a reduction in the number of components by arranging the optical system constituent elements having decentered rotationally asymmetric reflecting surfaces in the form of a single block.

It is desirable that a rotationally asymmetric reflecting surface should be formed as a back-coated mirror of an optical material which has the function of a wavelength selecting device and that the wavelength selecting device should have an infrared cutoff function and further that the mole percentage a of CuO contained in the optical material should satisfy the following condition:

$$a<1\qquad(16)$$

Infrared cutoff filters and so forth can be produced by mixing impurities such as copper. However, as the impurity content increases, it becomes difficult to control the wavelength selectivity. Therefore, the lower the impurity content, the easier the production. It is common practice to use a fluorophosphate network for the purpose of improving the resistance of glass containing a large amount of copper or the like, and if the impurity content can be reduced, it is possible to adopt a network structure of high resistance effectively. However, if the impurity content is reduced, the thickness of the filter must be increased in order to ensure the wavelength selectivity, and this causes the lens system to increase in size because an extra space must be ensured.

In an optical system in which the optical axis is folded as in the optical system according to the second aspect of the present invention, an optical path length longer than the actual thickness of the optical system can be obtained; therefore, effective wavelength selecting characteristics can be attained by a reduced impurity content. The copper content may be adjusted according to the optical path length of each particular optical system designed. However, it is particularly desirable to satisfy the following condition:

$$a<1\qquad(16)$$

where a is the mole percentage of CuO.

It is more desirable to satisfy the following condition:

$$1\times10^{-5}<a<1\qquad(16)'$$

It is even more desirable to satisfy the following condition:

$$1\times10^{-5}<a<0.5\qquad(16)''$$

In the image pickup optical system according to the second aspect of the present invention, it is desirable that at least one reflecting surface having a decentered rotationally asymmetric surface configuration should use a plane-symmetry free-form surface having only one plane of symmetry. A free-form surface used in the present invention may be defined by the following equation:

$$Z = C_2 + C_3y + C_4x + C_5y^2 + C_6yx + C_7x^2 + C_8y^3 + C_9y^2x + \quad (a)$$
$$C_{10}yx^2 + C_{11}x^3 + C_{12}y^4 + C_{13}y^3x + C_{14}y^2x^2 + C_{15}yx^3 +$$
$$C_{16}x^4 + C_{17}y^5 + C_{18}y^4x + C_{19}y^3x^2 + C_{20}y^2x^3 + C_{21}yx^4 +$$
$$C_{22}x^5 + C_{23}y^6 + C_{24}y^5x + C_{25}y^4x^2 + C_{26}y^3x^3 + C_{27}y^2x^4 +$$
$$C_{28}yx^5 + C_{29}x^6 + C_{30}y^7 + C_{31}y^6x + C_{32}y^5x^2 + C_{33}y^4x^3 +$$
$$C_{34}y^3x^4 + C_{35}y^2x^5 + C_{36}yx^6 + C_{37}x^7 \ldots$$

where $C_m$ (m is an integer of 2 or higher) are coefficients.

In general, the above-described free-form surface does not have planes of symmetry in both the XZ- and YZ-planes. In the present invention, a free-form surface having only one plane of symmetry parallel to the YZ-plane is obtained by making all terms with odd-numbered powers of x zero. For example, in the above defining equation (a), the coefficients of the terms $C_4$, $C_6$, $C_9$, $C_{11}$, $C_{13}$, $C_{15}$, $C_{18}$, $C_{20}$, $C_{22}$, $C_{24}$, $C_{26}$, $C_{28}$, $C_{31}$, $C_{33}$, $C_{35}$, $C_{37}$, . . . are set equal to zero. By doing so, it is possible to obtain a free-form surface having only one plane of symmetry parallel to the YZ-plane.

A free-form surface having only one plane of symmetry parallel to the XZ-plane is obtained by making all terms with odd-numbered powers of y zero. For example, in the above defining equation (a), the coefficients of the terms $C_3$, $C_6$, $C_8$, $C_{10}$, $C_{13}$, $C_{15}$, $C_{17}$, $C_{19}$, $C_{21}$, $C_{24}$, $C_{26}$, $C_{28}$, $C_{30}$, $C_{32}$, $C_{34}$, $C_{36}$, . . . are set equal to zero. By doing so, it is possible to obtain a free-form surface having only one plane of symmetry parallel to the XZ-plane. The use of a free-form surface having such a plane of symmetry makes it possible to improve the productivity.

Rotationally asymmetric aberrations due to decentration can be effectively corrected by using a free-form surface having either a plane of symmetry parallel to the YZ-plane or a plane of symmetry parallel to the XZ-plane.

It should be noted that the above defining equation is shown as merely an example, and that the feature of the second aspect of the present invention resides in that rotationally asymmetric aberrations due to decentration are corrected by a rotationally asymmetric surface having only one plane of symmetry. Therefore, the same advantageous effect can be obtained for any other defining equation.

In general, it is difficult to produce an optical system constituent element (decentered prism optical system) having a decentered rotationally asymmetric reflecting surface by polishing, and it is common practice to form constituent surfaces by grinding one by one or by injection molding of a plastic material or molding of a glass material. At this time, it is necessary to check to see whether or not each surface of the decentered prism optical system has been produced with a predetermined configuration. A three-dimensional coordinate measuring device is generally used to measure such a three-dimensional rotationally asymmetric surface configuration. However, it takes a great deal of time to measure with a three-dimensional coordinate measuring device. Therefore, such a measuring method is impractical.

According to the second aspect of the present invention, it is important that at least one of the at least three surfaces constituting the decentered prism optical system 4 should be formed from a rotationally symmetric surface.

It is more desirable to use a rotationally symmetric surface for a surface which is disposed on a side of the decentered prism optical system closer to the pupil and has both transmitting and internally reflecting actions and which further has the widest effective area in the decentered prism optical system and suffers relatively large aberrational deterioration. By doing so, it is possible to construct a decentered prism optical system that enables the finished condition of a surface configuration to be readily evaluated in a short period of time.

In a case where the decentered prism optical system of the rear optical unit has a first transmitting surface, a first reflecting surface, a second reflecting surface and a second transmitting surface, and the second reflecting surface has a rotationally asymmetric surface configuration and is formed from a plane-symmetry free-form surface having only one plane of symmetry, and where the first reflecting surface and the second transmitting surface are formed from a common surface, if a strong power is given to this surface, chromatic aberrations occur to a considerable extent. It would be good if a region used as the first reflecting surface and a region used as the second transmitting surface can be substantially isolated from each other. However, if the two regions are isolated from each other, the prism block that constitutes the rear optical unit increases in size. Therefore, the area where the first reflecting surface and the second transmitting surface overlap each other inevitably enlarges. Accordingly, it is preferable not to give a strong power to the common surface from the viewpoint of facilitating the control for enabling the action at the first reflecting surface and the action at the second transmitting surface to be compatible with each other. More specifically, assuming that the only one plane of symmetry of the plane-symmetry free-form surface is a YZ-plane, and a direction perpendicularly intersecting the plane is defined as an X-axis direction, and further that Px1 and Px2 are powers in the X-axis direction in the vicinities of intersections between the axial principal ray on the one hand and the first and second reflecting surfaces on the other, it is desirable to satisfy the following condition:

$$|Px1|<|Px2| \quad (17)$$

It is more desirable to satisfy the following condition:

$$1<|Px2/Px1|<20 \quad (18)$$

If |Px2/Px1| is not smaller than the upper limit of the condition (18), i.e. 20, the power of the second reflecting surface becomes extremely strong, making it impossible to ensure the required back focus. Moreover, the surface configuration becomes more complicated unfavorably to correct aberrations. It is even more desirable to satisfy the following condition:

$$1.1<|Px2/Px1|<10 \quad (18)'$$

It is still more desirable to satisfy the following condition:

$$2.0<|Px2/Px1|<5 \quad (18)''$$

Assuming that Px3 is the power in the X-axis direction in the vicinity of an intersection between the axial principal ray and the second transmitting surface, it is desirable to satisfy the following condition:

$$|Px3/Px2|<0.5 \quad (19)$$

That is, if a strong power is given to the second transmitting surface, distortion and chromatic aberrations occur to a considerable extent unfavorably. Therefore, it is desirable to satisfy the condition (19):

It is more desirable to satisfy the following condition:

$$|Px3/Px2|<0.2 \quad (19)'$$

Assuming that the only one plane of symmetry of the plane-symmetry free-form surface is a YZ-plane, and a direction perpendicularly intersecting the plane is defined as an X-axis direction, and further that DY is a difference between the value of the tangent of a line normal to the surface in the YZ-plane at a position where a principal ray at the maximum field angle in the X-axis direction impinges on the surface and the value of the tangent of a line normal to the surface in the YZ-plane at a position where the axial principal ray impinges on the surface, it is desirable to satisfy the following condition:

$$0 \leq |DY| < 0.1 \tag{20}$$

Figure 17A:
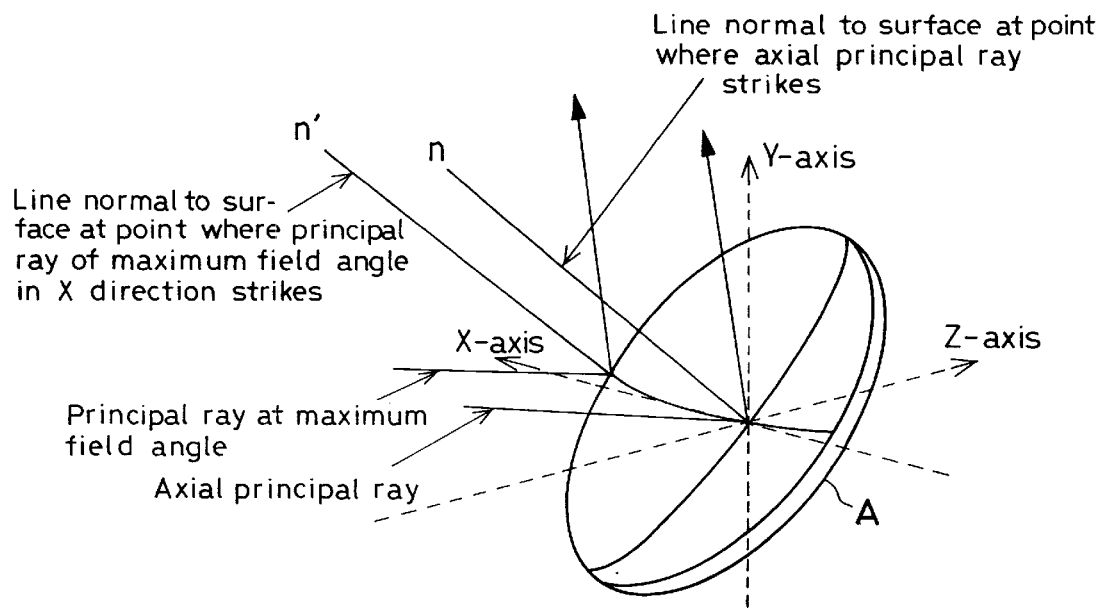
FIGS. 17(a) and 17(b) are diagrams for explaining parameter DY used in the present invention.
Figure 17B:
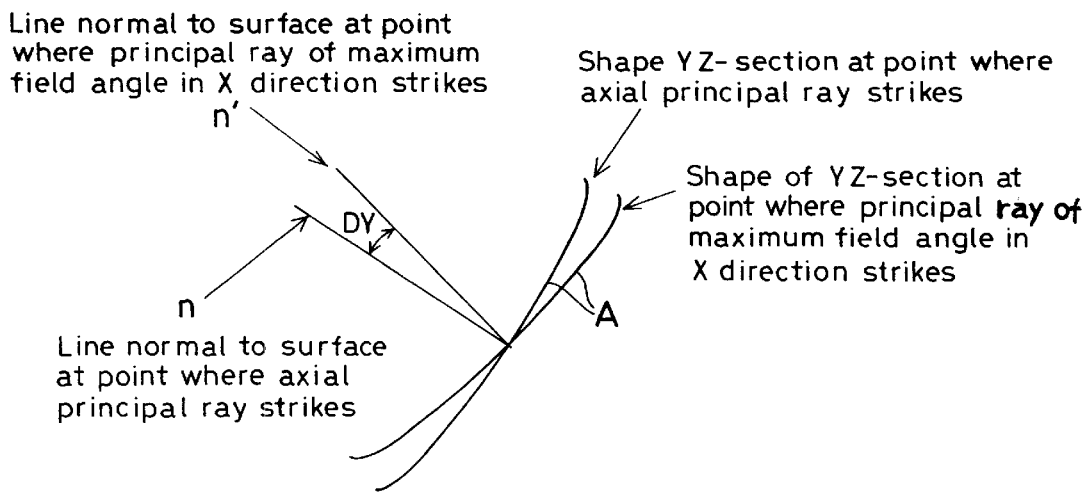

The condition (20) relates to a bow-shaped rotationally asymmetric image distortion in which a horizontal line, for example, is undesirably curved in a bow shape when imaged. Assuming that, as shown in the perspective view of FIG. 17(a) and FIG. 17(b), which is a projection of FIG. 17(a) onto the YZ-plane, DY denotes the difference between the value of the tangent in the YZ-plane of a line n' normal to a rotationally asymmetric surface A at a point where a principal ray at the maximum field angle in the direction X intersects the rotationally asymmetric surface A and the value of the tangent in the YZ-plane of a line n normal to the rotationally asymmetric surface A at a point where the axial principal ray intersects the rotationally asymmetric surface A, it is important to satisfy the condition (20). If |DY| is smaller than the lower limit of the condition (20), i.e. 0, it becomes impossible to correct the bow-shaped image distortion. If |DY| is not smaller than the upper limit, i.e. 0.1, the bow-shaped image distortion is over-corrected. In either case, the image is distorted in a bow shape.

It is more desirable to satisfy the following condition:

$$0 \leq |DY| < 0.01 \tag{20}$$

Assuming that a direction in which the axial principal ray travels until it reaches the first surface of the optical system is a Z-axis direction, and the only one plane of symmetry of the plane-symmetry free-form surface is a YZ-plane, and further a direction perpendicularly intersecting the YZ-plane is an X-axis, and further that Cxn is the difference between the curvature in the X-axis direction of a portion of the surface at which a principal ray at the maximum field angle in the positive direction of the Y-axis impinges on the surface and the curvature in the X-axis direction of a portion of the surface at which a principal ray at the maximum field angle in the negative direction of the Y-axis impinges on the surface, and Pxn is the power in the X-axis direction of a portion of the surface at which the axial principal ray impinges on the surface, it is important to satisfy the following condition:

$$0 \leq |Cxn/Pxn| < 10 \tag{21}$$

The condition (21) relates to a trapezoidal image distortion. If |Cxn/Pxn| is not smaller than the upper limit of the condition (21), i.e. 10, a trapezoidal distortion occurs to a considerable extent and becomes difficult to correct by another surface.

It is more desirable to satisfy the following condition:

$$0 \leq |Cxn/Pxn| < 1 \tag{21}'$$

If the rotationally asymmetric surface is a plane-symmetry free-form surface which is disposed in a decentered optical system and which has a plane of symmetry approximately coincident with the decentration plane of decentered surfaces, both sides of the plane of symmetry can be made symmetric. This makes it possible to favorably effect aberration correction and to improve the productivity to a considerable extent.

Assuming that Px is the power of the entire optical system in the X-axis direction, and Pxn is the power in the X-axis direction of that portion of the rotationally asymmetric surface on which the axial principal ray strikes, it is desirable from the viewpoint of aberration correction to satisfy the following condition:

$$0 < |Pxn/Px| < 100 \tag{22}$$

If |Pxn/Px| is not smaller than the upper limit of the condition (22), i.e. 100, the power of the rotationally asymmetric surface becomes excessively stronger than the power of the entire optical system. Consequently, the rotationally asymmetric surface has excessively strong refracting power, and aberrations produced by the rotationally asymmetric surface become impossible to correct by another surface. If |Pxn/Px| is not larger than the lower limit, i.e. 0, the power of the rotationally asymmetric surface in the X-axis direction becomes zero, and it becomes necessary to provide another surface that provides a power in the X-axis direction. Consequently, the number of necessary surfaces increases, which is contrary to the purpose of reducing the size of the optical system by using rotationally asymmetric surfaces according to the second aspect of the present invention.

It is more desirable from the viewpoint of aberration correction to satisfy the following condition:

$$0.05 < |Pxn/Px| < 10 \tag{22}'$$

By satisfying the condition (22)', rotationally asymmetric aberrations can be corrected even more favorably.

Assuming that Py is the power of the entire optical system in the Y-axis direction, and Pyn is the power in the Y-axis direction of that portion of the rotationally asymmetric surface on which the axial principal ray strikes, it is desirable from the viewpoint of aberration correction to satisfy the following condition:

$$0 < |Pyn/Py| < 100 \tag{23}$$

The meanings of the lower limit 0 and the upper limit 100 of the condition (23) are the same as in the condition (22).

It is more desirable from the viewpoint of aberration correction to satisfy the following condition:

$$0 < |Pyn/Py| < 10 \tag{23}'$$

By satisfying the condition (23)', rotationally asymmetric aberrations can be corrected even more favorably.

Assuming that Px and Py are the powers in the X- and Y-axis directions, respectively, of the entire optical system, it is desirable from the viewpoint of aberration correction to satisfy the following condition:

$$0.3 < |Px/Py| < 2 \tag{24}$$

If |Px/Py| is not larger than the lower limit of the condition (24), i.e. 0.3, or not smaller than the upper limit, i.e. 2, the focal lengths in the X- and Y-axis directions of the entire optical system become excessively different from each other, and it becomes difficult to favorably correct the image distortion. Consequently, the image is undesirably distorted.

It is more desirable from the viewpoint of aberration correction to satisfy the following condition:

$$0.8 < |Px/Py| < 1.2 \tag{24}'$$

By satisfying the condition (24)', rotationally asymmetric aberrations can be corrected even more favorably.

In the image pickup optical system according to the second aspect of the present invention, it is desirable that the transverse aberration of the optical system should be not more than 200 micrometers. In the optical system according to the second aspect of the present invention, if the transverse aberration is not more than 200 micrometers, the aberration can be satisfactorily ignored. Thus, favorable image-formation performance can be obtained.

It is desirable that the image distortion of the image pickup optical system according to the second aspect of the present invention should be not more than 20%. In the optical system according to the second aspect of the present invention, if the image distortion is not more than 20%, the aberration can be satisfactorily ignored. Thus, favorable image-formation performance can be obtained.

It is preferable that the first transmitting surface should be a lens having a positive power with respect to transmitted light. If the first transmitting surface is such a lens, it is possible to suppress divergence of light rays at the first reflecting surface and hence possible to reduce the size of the first reflecting surface.

If the optical system is arranged such that light rays travel successively via the first transmitting surface, the first reflecting surface and the second transmitting surface, it is possible to form the first reflecting surface from a back-coated mirror. If the first reflecting surface is formed from a back-coated mirror, curvature of field can be corrected more favorably than in the case of a surface-coated mirror.

If either or both of the first and second transmitting surfaces are given a power of the same sign as that of the first reflecting surface, curvature of field can be corrected approximately completely.

On the other hand, if the powers of the first and second transmitting surfaces are made approximately zero, favorable effects can be produced on chromatic aberrations. That is, the first reflecting surface produces no chromatic aberration in theory and hence need not correct chromatic aberration with another surface. Therefore, the powers of the first and second transmitting surfaces are made approximately zero so that no chromatic aberration is produced by these surfaces. This makes it possible to construct an optical system having minimal chromatic aberration as a whole.

It is preferable that the rear optical unit should have, in order from the object side toward the image side thereof, at least a first transmitting surface, a first reflecting surface, a second reflecting surface and a second transmitting surface, and the second reflecting surface should be formed from a rotationally asymmetric surface configuration. In this case, it is possible to vary the powers of the two reflecting surfaces. Accordingly, the principal point can be positioned in front of or behind the optical system by using a combination of a positive power and a negative power or a combination of a negative power and a positive power. This also makes it possible to produce favorable effects on the curvature of field.

Further, it is also possible to substantially eliminate field curvature by forming the two reflecting surfaces from back-coated mirrors. In the case of an electronic image pickup optical system requiring a long back focus in comparison to the focal length in particular, it is desirable to distribute a negative power to the object side or to give a negative power to the first reflecting surface. However, if a strong negative power is given to the first reflecting surface, distortion is aggravated. In such a case, if the first reflecting surface and the second transmitting surface are identical with each other, the negative power of the transmitting surface also becomes strong, causing chromatic aberrations to be aggravated.

Therefore, it is preferable for the first reflecting surface to have a configuration in which a region used as a reflecting surface has a negative power, and in which the negative power weakens as the distance from a predetermined point in the region increases toward a region used as the second transmitting surface, and the second transmitting surface has a weak power. It should be noted that in a case where a negative power is distributed to the object side as stated above, the first reflecting surface should be arranged to have a weak positive or negative power.

In a case where the image pickup optical system according to the second aspect of the present invention is used as a taking lens of an electronic image pickup apparatus in which an image is formed on an electronic image pickup device, it is preferable to provide a function whereby distortion and lateral chromatic aberrations produced in the optical system are corrected by using a digital image processing technique on the basis of information concerning distortion and lateral chromatic aberrations of the optical system previously stored in a memory or the like in a processing part of the image pickup apparatus. By doing so, the amount of aberration to be corrected by the optical system reduces. Consequently, the load of correcting aberrations that is imposed on the optical system is reduced. This is particularly effective in the case of a compact taking lens arranged to exhibit satisfactory optical performance with a reduced number of lens constituent elements as in the optical system according to the second aspect of the present invention. The arrangement may be such that information concerning aberrations in the optical system is prepared in the form of data written in image processing software instead of storing the information in the processing part of a camera, and the software is installed in a processor, e.g. a personal computer, so that the image is subjected to image processing on the processor. This arrangement also provides the same function as the above.

It should be noted that the technique according to the second aspect of the present invention includes an image pickup apparatus having an image pickup device provided to capture an object image formed by an image pickup optical system arranged as described above. In this case, the image pickup device is desirably an electronic image pickup device having the function of converting light received thereby into electrical information, and it is desirable for the image pickup apparatus to have an observation device for observing the object image captured by the electronic image pickup device.

The image pickup optical system according to the third aspect of the present invention, which is provided to attain the aforementioned object, will be described below in detail.

According to the third aspect of the present invention, there is provided an image pickup optical system for forming an image of an object on a surface of an image pickup device. A pupil is disposed at any position between a first surface of the optical system that is closest to the object and a final surface of the optical system that is closest to the image, inclusive of the position of the first surface and the position of the final surface. The optical system has at least one reflecting surface decentered such that the whole surface is tilted with respect to an axial principal ray defined by a light ray emanating from the center of the object and passing through the center of the pupil to reach the center of the image. The reflecting surface has a rotationally asymmetric surface configuration that corrects rotationally asymmetric decentration aberrations caused by decentration, thereby reducing rotationally asymmetric aberrations of the object image.

In this case, the reflecting surface may be formed from a totally reflecting surface or a semitransparent reflecting surface so as to have both transmitting and reflecting actions. The reflecting surface may be formed from a coated mirror surface.

It is desirable for the optical system to further have at least a second reflecting surface disposed to face the first reflecting surface.

Moreover, assuming that a direction in which the axial principal ray travels until it reaches a first surface of the optical system is defined as a Z-axis direction, and a Y-axis direction is taken in the plane of decentration of decentered surfaces, and further an axis constituting an orthogonal coordinate system in combination with the Y- and Z-axes is defined as an X-axis, and further that the axial principal ray and a light ray which is parallel to the axial principal ray at a slight distance d in the Y-axis direction are made to enter the optical system from the entrance surface side thereof, and the sine of an angle formed between the two rays in the YZ-plane at the exit side of the optical system is denoted by NA'yi, and further that a value obtained by dividing NA'yi by the distance d between the parallel rays, i.e. NA'yi/d, is defined as a power Py in the Y-axis direction of the optical system, and p is an optical path length from a point at which the axial principal ray enters a constituent element of the optical system disposed closest to the object and having a rotationally asymmetric surface to a point at which the axial principal ray exits from a constituent element of the optical system disposed closest to the image and having a rotationally asymmetric surface, it is desirable to satisfy the following condition:

$$0.1 < p \times Py < 8 \qquad (25)$$

First of all, a coordinate system used in the following description will be explained.

As shown in FIG. 19, it is assumed that a light ray passing through the center of an object point and passing through the center of a stop 1 to reach the center of an image plane 8 is defined as an axial principal ray 2. It is also assumed that an optical axis defined by a straight line along which the axial principal ray 2 travels until it intersects a first surface 5 of an optical system 4 is defined as a Z-axis, and that an axis perpendicularly intersecting the Z-axis in the decentration plane of decentered surfaces constituting the image pickup optical system is defined as a Y-axis, and further that an axis perpendicularly intersecting the Z-axis and also perpendicularly intersecting the Y-axis is defined as an X-axis.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole. On the other hand, aspherical surfaces and the like are used to favorably effect aberration correction with a minimal number of surfaces. The reason for this is to reduce various aberrations which would be produced by spherical surfaces. However, in a decentered optical system, rotationally asymmetric aberrations due to decentration cannot be corrected by a rotationally symmetric optical system.

The arrangement and operation of the image pickup optical system according to the third aspect of the present invention will be described below.

When a rotationally symmetric optical system is decentered, rotationally asymmetric aberrations occur, and it is impossible to correct these aberrations only by a rotationally symmetric optical system. Rotationally asymmetric aberrations due to decentration include image distortion, curvature of field, and astigmatic and comatic aberrations, which occur even on the axis. FIG. 13 shows curvature of field produced by a decentered concave mirror M. FIG. 14 shows astigmatism produced by a decentered concave mirror M. FIG. 15 shows axial comatic aberration produced by a decentered concave mirror M. Accordingly to the third aspect of the present invention, a rotationally asymmetric surface is disposed in the optical system to correct such rotationally asymmetric aberrations caused by decentration.

Rotationally asymmetric aberrations produced by a decentered concave mirror include rotationally asymmetric curvature of field. For example, when light rays from an infinitely distant object point are incident on a decentered concave mirror, the light rays are reflected by the concave mirror to form an image. In this case, the back focal length from that portion of the concave mirror on which the light rays strike to the image surface is a half the curvature of the portion on which the light rays strike. onsequently, an image surface tilted with respect to the axial principal ray is formed as shown in FIG. 13. It has heretofore been impossible to correct such rotationally asymmetric curvature of field by a rotationally symmetric optical system. The tilted curvature of field can be corrected by forming the concave mirror M from a rotationally asymmetric surface, and, in this example, arranging it such that the curvature is made strong (refracting power is increased) in the positive Y-axis direction (the upward direction in the figure), whereas the curvature is made weak (refracting power is reduced) in the negative Y-axis direction (the downward direction in the figure). It is also possible to obtain a flat image surface with a minimal number of constituent surfaces by disposing a rotationally asymmetric surface having the same effect as that of the above-described arrangement in the optical system separately from the concave mirror M.

Next, rotationally asymmetric astigmatism will be explained. A decentered concave mirror M produces astigmatism even for axial rays, as shown in FIG. 14, as in the case of the above. The astigmatism can be corrected by appropriately changing the curvatures in the X- and Y-axis directions of the rotationally asymmetric surface as in the case of the above.

Rotationally asymmetric coma will be explained below. A decentered concave mirror M produces coma even for axial rays, as shown in FIG. 15, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

If the image pickup optical system according to the third aspect of the present invention is arranged to have a folded optical path, it is possible to impart power to a reflecting surface and hence possible to omit a transmission lens. Moreover, because the optical path is folded, the optical system can be formed in a compact structure.

If the reflecting surface is a totally reflecting surface tilted with respect to light rays so that the light rays are incident thereon at an angle exceeding the critical angle, a high reflectivity can be obtained, and it is possible to enable the surface to have both reflecting and transmitting actions. The reflecting surface is preferably a reflecting surface having a thin film of a metal, e.g. aluminum or silver, formed thereon, or a reflecting surface formed from a dielectric multilayer film, or a semitransparent reflecting surface. In the case of a metal thin film having reflecting action, a high reflectivity can be readily obtained. The use of a dielectric reflecting film is advantageous in a case where a reflecting film having wavelength selectivity or a reflecting film having minimal absorption is to be formed.

It is preferable to use a rotationally asymmetric surface as a reflecting surface. By doing so, no chromatic aberration is produced in contrast to a case where it is used as a transmitting surface. Moreover, even if the tilt of the surface is small, the surface can bend light rays. Accordingly, the amount of other aberration produced by the surface is also small. In other words, when the same refracting power is to be obtained, the amount of aberration produced by a reflecting surface is smaller than by a refracting surface.

Regarding an optical system designed to form an image relatively small in size as in the image pickup optical system according to the third aspect of the present invention, the optical system can be made compact in size on drawings by the principle of coefficient multiplication. However, in view of the actual production, it is not preferable to make the image pickup optical system excessively small in size because the thickness of the edge and center of the lens would be excessively reduced and the lens diameter would become excessively small, causing the production cost to increase unfavorably. In the case of a conventional optical system comprising a refracting lens system, if the optical system is constructed in conformity to a producible size, an unfavorably long distance must be ensured between refracting surfaces having power because the optical axis is straight, resulting in a waste of space. If the optical axis is spatially folded by using reflecting surfaces, an optical path necessary for image formation can be ensured by effectively utilizing a relatively small space. In this case, if the optical path length of the image pickup optical system is unnecessarily long, the optical system increases in size contrary to the purpose of effectively using the space by employing an arrangement in which the optical axis is folded by decentration. In addition, if the optical path length is excessively long in comparison to the image formed by the optical system, it is difficult to ensure the back focus required for disposing a member for capturing an optical image, e.g. a film or an image pickup device.

According to the third aspect of the present invention, a compact optical system is successfully constructed by adopting a folded optical path and, at the same time, satisfying the following conditions.

That is, it is desirable for the image pickup optical system according to the third aspect of the present invention to further have at least a second reflecting surface disposed to face the first reflecting surface.

Moreover, assuming that a direction in which the axial principal ray travels until it reaches a first surface of the optical system is defined as a Z-axis direction, and a Y-axis direction is taken in the plane of decentration of decentered surfaces, and further an axis constituting an orthogonal coordinate system in combination with the Y- and Z-axes is defined as an X-axis, and further that the axial principal ray and a light ray which is parallel to the axial principal ray at a slight distance d in the Y-axis direction are made to enter the optical system from the entrance surface side thereof, and the sine of an angle formed between the two rays in the YZ-plane at the exit side of the optical system is denoted by NA'yi, and further that a value obtained by dividing NA'yi by the distance d between the parallel rays, i.e. NA'yi/d, is defined as a power Py in the Y-axis direction of the optical system, and p is an optical path length from a point at which the axial principal ray enters a constituent element of the optical system disposed closest to the object and having a rotationally asymmetric surface to a point at which the axial principal ray exits from a constituent element of the optical system disposed closest to the image and having a rotationally asymmetric surface, it is desirable to satisfy the following condition:

$$0.1 < p \times Py < 8 \tag{25}$$

Figure 20:
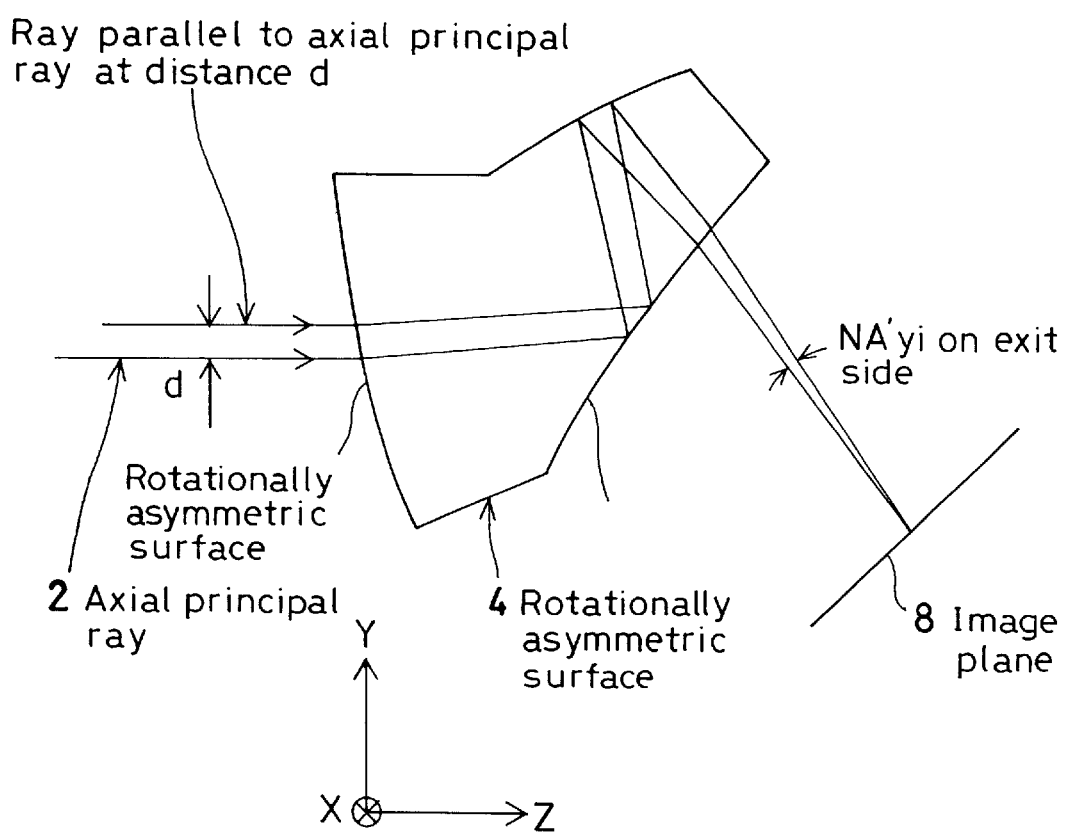
FIG. 20 is a diagram for explaining a power in an image pickup optical system according to the present invention (according to the third aspect of the present invention).

First, let us define the power of the optical system according to the third aspect of the present invention. As shown in FIG. 20, when the direction of decentration of the optical system 4 is taken in the Y-axis direction, the axial principal ray 2 and a light ray which is parallel to the axial principal ray 2 and which has a small height d in the YZ-plane are made to enter the optical system 4 from the object side thereof, and the sine of an angle formed between the two rays in the YZ-plane at the exit side of the optical system 4 is denoted by NA'yi. Further, NA'yi/d is defined as the power Py in the Y-axis direction of the entire optical system 4. Similarly, the axial principal ray 2 and a light ray which is parallel to the axial principal ray 2 and which has a small height d in the XZ-plane are made to enter the optical system 4 from the object side thereof, and the sine of an angle formed between the two rays in a plane perpendicular to the YZ-plane and containing the emergent axial principal ray 2 at the exit side of the optical system 4 is denoted by NA'xi. Further, NA'xi/d is defined as the power Px in the X-axis direction of the entire optical system 4.

Further, assuming that p is an optical path length from a point at which the axial principal ray enters a constituent element of the optical system disposed closest to the object and having a rotationally asymmetric surface to a point at which the axial principal ray exits from a constituent element of the optical system disposed closest to the image and having a rotationally asymmetric surface (in FIG. 20, the two optical system constituent elements form the same decentered prism optical system 4; therefore, p is the optical path length of the axial principal ray 2 in the decentered prism optical system 4), it is desirable to arrange the optical system so as to satisfy the above condition (25) from the viewpoint of forming the optical system in a compact structure.

It is more desirable to satisfy the following condition:

$$0.5 < p \times Py < 5.0 \tag{25'}$$

By satisfying the above condition (25)', a compact lens system can be attained.

It is even more desirable to satisfy the following condition:

$$0.5 < p \times Py < 0.7 \tag{25''}$$

By satisfying the above condition (25)", an even more compact lens system can be attained.

If the optical system constituent elements having rotationally asymmetric surfaces in the image pickup optical system according to the third aspect of the present invention are formed from a first and second reflecting surfaces and a first and second transmitting surfaces, the optical axis can be folded by the two reflecting surfaces, and thus the optical system can be made compact in size. Further, because there are two transmitting surfaces, even more favorable results can be obtained with respect to the principal point position and curvature of field.

Further, if the two reflecting surfaces are back-coated mirrors, even more favorable aberration correcting performance can be obtained.

By disposing a stop at any position between the first surface, which is closest to the object in the optical system, and the final surface, which is closest to the image in the optical system (inclusive of the position of the first surface and the position of the final surface), the optical system can be constructed in a compact form, and at the same time, the stop member can be protected advantageously.

In the image pickup optical system according to the third aspect of the present invention, decentration aberrations can be corrected by a decentered rotationally asymmetric surface, and it is preferable to dispose an optical member on the object side of the decentered rotationally asymmetric surface so that the optical member performs overall aberration correction in combination with the decentered rotationally asymmetric reflecting surface. In this case, if the optical member is decentered, aberration correction can be uniformly made. Therefore, it is preferable to decenter the optical member from the viewpoint of favorably correcting asymmetric aberrations.

In the image pickup optical system according to the third aspect of the present invention, if the number of surfaces of optical system constituent elements having decentered rotationally asymmetric reflecting surfaces is reduced or the optical system constituent elements are constructed in the form of a prism block, the optical system becomes large in size unless the stop is positioned outside the optical system on the object side. In this case, all the powers deviate to the image side relative to the stop. Correction of distortion needs both negative and positive powers. If the negative power is made excessively strong, the optical system becomes large in size, and the optical path length increases unfavorably. Therefore, it is preferable to dispose a positive lens on the object side of the stop to thereby correct distortion. In a case where the optical system constituent elements having decentered rotationally asymmetric reflecting surfaces are formed as a prism block, it becomes difficult to correct chromatic aberration produced to an extent by transmitting surfaces; the chromatic aberration can be effectively corrected by disposing a positive lens on the object side of the stop. To correct asymmetric aberrations in particular, it is preferable to decenter the positive lens.

When it is intended to construct a wide-angle lens system having a particularly wide field angle, the focal length shortens, making it difficult to ensure the required back focus. In such a case, it is preferable to adopt a retrofocus type in which a negative power and a positive power are distributed in order from the object side. Moreover, it is preferable to strengthen the negative power and to widen the distance between the negative and positive lens units as much as possible. However, if a negative power is given to a decentered rotationally asymmetric surface, decentration aberrations become so large that they are difficult to correct. In particular, it is difficult to correct the asymmetry of coma.

Therefore, it is preferable to dispose a concave lens on the object side, assign the negative power to an ordinary refracting lens, widen the distance between the negative and positive lens units and fold the optical axis to thereby arrange the optical system in a compact form.

In a case where the optical system constituent elements having decentered rotationally asymmetric reflecting surfaces are constructed in the form of a single block and a stop is provided, it is preferable to provide the stop in a plane on the object side of the block from the viewpoint of avoiding an increase in the size of the block. In this case, it is preferable to dispose on the object side of the stop an optical member which serves also as a stop protecting device and whose optical power is approximately zero. In a case where an electronic image pickup device is used, the back focus can be effectively shortened by imparting an optical low-pass filter function to a surface, for example, by a method wherein the area in the surface is divided into regions, and a small amount of tilt is given to the surface for each region, thereby providing the surface with the function of slightly changing the travel direction of light.

Incidentally, if the first reflecting surface and second transmitting surface of the optical system constituent elements having decentered rotationally asymmetric reflecting surfaces are arranged to be the identical surface, the number of surfaces to be formed is three, and the productivity improves.

If the first reflecting surface is arranged to use total reflection as reflection taking place at it, a high reflectivity can be obtained as described above, and the loss of light can be minimized. In addition, the production becomes easy when the reflecting and transmitting surfaces are arranged to be the identical surface.

It is possible to expect reduction in the size and cost of the optical system through a reduction in the number of components by arranging the optical system constituent elements having decentered rotationally asymmetric reflecting surfaces in the form of a single block.

It is desirable that a rotationally asymmetric reflecting surface should be formed as a back-coated mirror of an optical material which has the function of a wavelength selecting device and that the wavelength selecting device should have an infrared cutoff function and further that the mole percentage a of CuO contained in the optical material should satisfy the following condition:

$$a<1 \tag{28}$$

Infrared cutoff filters and so forth can be produced by mixing impurities such as copper. However, as the impurity content increases, it becomes difficult to control the wavelength selectivity. Therefore, the lower the impurity content, the easier the production. It is common practice to use a fluorophosphate network for the purpose of improving the resistance of glass containing a large amount of copper or the like, and if the impurity content can be reduced, it is possible to adopt a network structure of high resistance effectively. However, if the impurity content is reduced, the thickness of the filter must be increased in order to ensure the wavelength selectivity, and this causes the lens system to increase in size because an extra space must be ensured.

In an optical system in which the optical axis is folded as in the optical system according to the third aspect of the present invention, an optical path length longer than the actual thickness of the optical system can be obtained; therefore, effective wavelength selecting characteristics can be attained by a reduced impurity content. The copper content may be adjusted according to the optical path length of each particular optical system designed. However, it is particularly desirable to satisfy the following condition:

$$a<1 \tag{28}$$

where a is the mole percentage of CuO.

It is more desirable to satisfy the following condition:

$$1\times10^{-5}<a<1 \tag{28}'$$

It is even more desirable to satisfy the following condition:

$$1\times10^{-5}<a<0.5 \tag{28}''$$

In the image pickup optical system according to the third aspect of the present invention, it is desirable that at least one reflecting surface having a decentered rotationally asymmetric surface configuration should use a plane-symmetry free-form surface having only one plane of symmetry. A free-form surface used in the present invention may be defined by the following equation:

$$Z = C_2 + C_3 y + C_4 x + C_5 y^2 + C_6 yx + C_7 x^2 + C_8 y^3 + C_9 y^2 x + \quad (a)$$
$$C_{10} yx^2 + C_{11} x^3 + C_{12} y^4 + C_{13} y^3 x + C_{14} y^2 x^2 + C_{15} yx^3 +$$
$$C_{16} x^4 + C_{17} y^5 + C_{18} y^4 x + C_{19} y^3 x^2 + C_{20} y^2 x^3 + C_{21} yx^4 +$$
$$C_{22} x^5 + C_{23} y^6 + C_{24} y^5 x + C_{25} y^4 x^2 + C_{26} y^3 x^3 + C_{27} y^2 x^4 +$$
$$C_{28} x^5 + C_{29} x^6 + C_{30} y^7 + C_{31} y^6 x + C_{32} y^5 x^2 + C_{33} y^4 x^3 +$$
$$C_{34} y^3 x^4 + C_{35} y^2 x^5 + C_{36} yx^6 + C_{37} x^7 \ldots$$

where $C_m$ (m is an integer of 2 or higher) are coefficients.

In general, the above-described free-form surface does not have planes of symmetry in both the XZ- and YZ-planes. In the present invention, a free-form surface having only one plane of symmetry parallel to the YZ-plane is obtained by making all terms with odd-numbered powers of x zero. For example, in the above defining equation (a), the coefficients of the terms $C_4$, $C_6$, $C_9$, $C_{11}$, $C_{13}$, $C_{15}$, $C_{18}$, $C_{20}$, $C_{22}$, $C_{24}$, $C_{26}$, $C_{28}$, $C_{31}$, $C_{33}$, $C_{35}$, $C_{37}$, . . . are set equal to zero. By doing so, it is possible to obtain a free-form surface having only one plane of symmetry parallel to the YZ-plane.

A free-form surface having only one plane of symmetry parallel to the XZ-plane is obtained by making all terms with odd-numbered powers of y zero. For example, in the above defining equation (a), the coefficients of the terms $C_3$, $C_6$, $C_8$, $C_{10}$, $C_{13}$, $C_{15}$, $C_{17}$, $C_{19}$, $C_{21}$, $C_{24}$, $C_{26}$, $C_{28}$, $C_{30}$, $C_{32}$, $C_{34}$, $C_{36}$, . . . are set equal to zero. By doing so, it is possible to obtain a free-form surface having only one plane of symmetry parallel to the XZ-plane. The use of a free-form surface having such a plane of symmetry makes it possible to improve the productivity.

Rotationally asymmetric aberrations due to decentration can be effectively corrected by using a free-form surface having either a plane of symmetry parallel to the YZ-plane or a plane of symmetry parallel to the XZ-plane.

It should be noted that the above defining equation is shown as merely an example, and that the feature of the third aspect of the present invention resides in that rotationally asymmetric aberrations due to decentration are corrected by a rotationally asymmetric surface having only one plane of symmetry. Therefore, the same advantageous effect can be obtained for any other defining equation.

In a case where the image pickup optical system according to the third aspect of the present invention has a first transmitting surface, a first reflecting surface, a second reflecting surface and a second transmitting surface, and the first and second reflecting surfaces each have a rotationally asymmetric surface configuration, and where at least one of the first and second reflecting surfaces is formed from a plane-symmetry free-form surface having only one plane of symmetry, and the first reflecting surface and the second transmitting surface are formed from a common surface, if a strong power is given to this surface, chromatic aberrations occur to a considerable extent. It would be good if a region used as the first reflecting surface and a region used as the second transmitting surface can be substantially isolated from each other. However, if the two regions are isolated from each other, the prism block that constitutes the optical system according to the third aspect of the present invention increases in size. Therefore, the area where the first reflecting surface and the second transmitting surface overlap each other inevitably enlarges. Accordingly, it is preferable not to give a strong power to the common surface from the viewpoint of facilitating the control for enabling the action at the first reflecting surface and the action at the second transmitting surface to be compatible with each other. More specifically, assuming that the only one plane of symmetry of the plane-symmetry free-form surface is a YZ-plane, and a direction perpendicularly intersecting the plane is defined as an X-axis direction, and further that Px1 and Px2 are powers in the X-axis direction in the vicinities of intersections between the axial principal ray on the one hand and the first and second reflecting surfaces on the other, it is desirable to satisfy the following condition:

$$|Px1|<|Px2| \qquad (29)$$

It is more desirable to satisfy the following condition:

$$1<|Px2/Px1|<20 \qquad (30)$$

If |Px2/Px1| is not smaller than the upper limit of the condition (30), i.e. 20, the power of the second reflecting surface becomes extremely strong, making it impossible to ensure the required back focus. Moreover, the surface configuration becomes more complicated unfavorably to correct aberrations. It is even more desirable to satisfy the following condition:

$$1.1<|Px2/Px1|<10 \qquad (30)'$$

It is still more desirable to satisfy the following condition:

$$2.0<|Px2/Px1|<5 \qquad (30)''$$

Assuming that Px3 is the power in the X-axis direction in the vicinity of an intersection between the axial principal ray and the second transmitting surface, it is desirable to satisfy the following condition:

$$|Px3/Px2|<0.5 \qquad (31)$$

It should be noted that if the second transmitting surface has a plurality or infinite number of planes of symmetry, a plane that forms the smallest angle with the only one plane of symmetry of the second reflecting surface among those planes is defined as the plane of symmetry of the second transmitting surface. That is, if a strong power is given to the second transmitting surface, distortion and chromatic aberrations occur to a considerable extent unfavorably. Therefore, it is desirable to satisfy the condition (31):

It is more desirable to satisfy the following condition:

$$|Px3/Px2|<0.2 \qquad (31)'$$

Assuming that the only one plane of symmetry of the plane-symmetry free-form surface is a YZ-plane, and a direction perpendicularly intersecting the plane is defined as an X-axis direction, and further that DY is a difference between the value of the tangent of a line normal to the surface in the YZ-plane at a position where a principal ray at the maximum field angle in the X-axis direction impinges on the surface and the value of the tangent of a line normal to the surface in the YZ-plane at a position where the axial principal ray impinges on the surface, it is desirable to satisfy the following condition:

$$023 \ |DY|<0.1 \qquad (32)$$

The condition (32) relates to a bow-shaped rotationally asymmetric image distortion in which a horizontal line, for example, is undesirably curved in a bow shape when imaged. Assuming that, as shown in the perspective view of FIG. 17(a) and FIG. 17(b), which is a projection of FIG. 17(a) onto the YZ-plane, DY denotes the difference between the value of the tangent in the YZ-plane of a line n' normal to a rotationally asymmetric surface A at a point where a principal ray at the maximum field angle in the direction X intersects the rotationally asymmetric surface A and the value of the tangent in the YZ-plane of a line n normal to the rotationally asymmetric surface A at a point where the axial principal ray intersects the rotationally asymmetric surface A, it is important to satisfy the condition (32). If |DY| is smaller than the lower limit of the condition (32), i.e. 0, it becomes impossible to correct the bow-shaped image distortion. If |DY| is not smaller than the upper limit, i.e. 0.1, the bow-shaped image distortion is over-corrected. In either case, the image is distorted in a bow shape.

It is more desirable to satisfy the following condition:

$$0 \leq |DY| < 0.01 \tag{32}'$$

Assuming that a direction in which the axial principal ray travels until it reaches the first surface of the optical system is a Z-axis direction, and the only one plane of symmetry of the plane-symmetry free-form surface is a YZ-plane, and further a direction perpendicularly intersecting the YZ-plane is an X-axis, and further that Cxn is the difference between the curvature in the X-axis direction of a portion of the surface at which a principal ray at the maximum field angle in the positive direction of the Y-axis impinges on the surface and the curvature in the X-axis direction of a portion of the surface at which a principal ray at the maximum field angle in the negative direction of the Y-axis impinges on the surface, and Pxn is the power in the X-axis direction of a portion of the surface at which the axial principal ray impinges on the surface, it is important to satisfy the following condition:

$$0 \leq |Cxn/Pxn| < 10 \tag{33}$$

The condition (33) relates to a trapezoidal image distortion. If |Cxn/Pxn| is not smaller than the upper limit of the condition (33), i.e. 10, a trapezoidal distortion occurs to a considerable extent and becomes difficult to correct by another surface.

It is more desirable to satisfy the following condition:

$$0 \leq |Cxn/Pxn| < 1 \tag{33}'$$

If the rotationally asymmetric surface is a plane-symmetry free-form surface which is disposed in a decentered optical system and which has a plane of symmetry approximately coincident with the decentration plane of decentered surfaces, both sides of the plane of symmetry can be made symmetric. This makes it possible to favorably effect aberration correction and to improve the productivity to a considerable extent.

Assuming that Px is the power of the entire optical system in the X-axis direction, and Pxn is the power in the X-axis direction of that portion of the rotationally asymmetric surface on which the axial principal ray strikes, it is desirable from the viewpoint of aberration correction to satisfy the following condition:

$$0 < |Pxn/Px| < 100 \tag{34}$$

If |Pxn/Px| is not smaller than the upper limit of the condition (34), i.e. 100, the power of the rotationally asymmetric surface becomes excessively stronger than the power of the entire optical system. Consequently, the rotationally asymmetric surface has excessively strong refracting power, and aberrations produced by the rotationally asymmetric surface become impossible to correct by another surface. If |Pxn/Px| is not larger than the lower limit, i.e. 0, the power of the rotationally asymmetric surface in the X-axis direction becomes zero, and it becomes necessary to provide another surface that provides a power in the X-axis direction. Consequently, the number of necessary surfaces increases, which is contrary to the purpose of reducing the size of the optical system by using rotationally asymmetric surfaces according to the third aspect of the present invention.

It is more desirable from the viewpoint of aberration correction to satisfy the following condition:

$$0.05 < |Pxn/Px| < 10 \tag{34}'$$

By satisfying the condition (34)', rotationally asymmetric aberrations can be corrected even more favorably.

Assuming that Py is the power of the entire optical system in the Y-axis direction, and Pyn is the power in the -axis direction of that portion of the rotationally symmetric surface on which the axial principal ray strikes, it is desirable from the viewpoint of aberration correction to satisfy the following condition:

$$0 < |Pyn/Py| < 100 \tag{35}$$

The meanings of the lower limit 0 and the upper limit 100 of the condition (35) are the same as in the condition (34).

It is more desirable from the viewpoint of aberration correction to satisfy the following condition:

$$0 < |Pyn/Py| < 10 \tag{35}'$$

By satisfying the condition (35)', rotationally asymmetric aberrations can be corrected even more favorably.

Assuming that Px and Py are the powers in the X- and Y-axis directions, respectively, of the entire optical system, it is desirable from the viewpoint of aberration correction to satisfy the following condition:

$$0.3 < |Px/Py| < 2 \tag{36}$$

If |Px/Py| is not larger than the lower limit of the condition (36), i.e. 0.3, or not smaller than the upper limit, i.e. 2, the focal lengths in the X- and Y-axis directions of the entire optical system become excessively different from each other, and it becomes difficult to favorably correct the image distortion. Consequently, the image is undesirably distorted.

It is more desirable from the viewpoint of aberration correction to satisfy the following condition:

$$0.8 < |Px/Py| < 1.2 \tag{36}$$

By satisfying the condition (36)', rotationally asymmetric aberration can be corrected even more favorably.

In the image pickup optical system according to the third aspect of the present invention, it is desirable that the transverse aberration of the optical system should be not more than 200 micrometers. In the optical system according to the third aspect of the present invention, if the transverse aberration is not more than 200 micrometers, the aberration can be satisfactorily ignored. Thus, favorable image-formation performance can be obtained.

It is desirable that the image distortion of the image pickup optical system according to the third aspect of the present invention should be not more than 20%. In the optical system according to the third aspect of the present invention, if the image distortion is not more than 20%, the aberration can be satisfactorily ignored. Thus, favorable image-formation performance can be obtained.

It is preferable that the first transmitting surface should be a lens having a positive power with respect to transmitted light. If the first transmitting surface is such a lens, it is possible to suppress divergence of light rays at the first reflecting surface and hence possible to reduce the size of the first reflecting surface.

If the optical system is arranged such that light rays travel successively via the first transmitting surface, the first reflecting surface and the second transmitting surface, it is possible to form the first reflecting surface from a back-coated mirror. If the first reflecting surface is formed from a back-coated mirror, curvature of field can be corrected more favorably than in the case of a surface-coated mirror.

If either or both of the first and second transmitting surfaces are given a power of the same sign as that of the first reflecting surface, curvature of field can be corrected approximately completely.

On the other hand, if the powers of the first and second transmitting surfaces are made approximately zero, favorable effects can be produced on chromatic aberrations. That is, the first reflecting surface produces no chromatic aberration in theory and hence need not correct chromatic aberration with another surface. Therefore, the powers of the first and second transmitting surfaces are made approximately zero so that no chromatic aberration is produced by these surfaces. This makes it possible to construct an optical system having minimal chromatic aberration as a whole.

It is preferable that the optical system according to the third aspect of the present invention should have, in order from the object side toward the image side thereof, at least a first transmitting surface, a first reflecting surface, a second reflecting surface and a second transmitting surface, and the first and second reflecting surfaces should be each formed from a rotationally asymmetric surface configuration. In this case, it is possible to vary the powers of the two reflecting surfaces. Accordingly, the principal point can be positioned in front of or behind the optical system by using a combination of a positive power and a negative power or a combination of a negative power and a positive power. This also makes it possible to produce favorable effects on the curvature of field.

Further, it is also possible to substantially eliminate field curvature by forming the two reflecting surfaces from back-coated mirrors. In the case of an electronic image pickup optical system requiring a long back focus in comparison to the focal length in particular, it is desirable to distribute a negative power to the object side or to give a negative power to the first reflecting surface. However, if a strong negative power is given to the first reflecting surface, distortion is aggravated. In such a case, if the first reflecting surface and the second transmitting surface are identical with each other, the negative power of the transmitting surface also becomes strong, causing chromatic aberrations to be aggravated. Therefore, it is preferable for the first reflecting surface to have a configuration in which a region used as a reflecting surface has a negative power, and in which the negative power weakens as the distance from a predetermined point in the region increases toward a region used as the second transmitting surface, and the second transmitting surface has a weak power. It should be noted that in a case where a negative power is distributed to the object side as stated above, the first reflecting surface should be arranged to have a weak positive or negative power.

In a case where the image pickup optical system according to the third aspect of the present invention is used as a taking lens of an electronic image pickup apparatus in which an image is formed on an electronic image pickup device, it is preferable to provide a function whereby distortion and lateral chromatic aberrations produced in the optical system are corrected by using a digital image processing technique on the basis of information concerning distortion and lateral chromatic aberrations of the optical system previously stored in a memory or the like in a processing part of the image pickup apparatus. By doing so, the amount of aberration to be corrected by the optical system reduces. Consequently, the load of correcting aberrations that is imposed on the optical system is reduced. This is particularly effective in the case of a compact taking lens arranged to exhibit satisfactory optical performance with a reduced number of lens constituent elements as in the optical system according to the third aspect of the present invention. The arrangement may be such that information concerning aberrations in the optical system is prepared in the form of data written in image processing software instead of storing the information in the processing part of a camera, and the software is installed in a processor, e.g. a personal computer, so that the image is subjected to image processing on the processor. This arrangement also provides the same function as the above.

It should be noted that the technique according to the third aspect of the present invention includes an image pickup apparatus having an image pickup device provided to capture an object image formed by an image pickup optical system arranged as described above. In this case, the image pickup device is desirably an electronic image pickup device having the function of converting light received thereby into electrical information, and it is desirable for the image pickup apparatus to have an observation device for observing the object image captured by the electronic image pickup device.

The above-described image pickup optical system and image pickup apparatus using it according to the second aspect of the present invention may be arranged, for example, as follows:

[1] An image pickup optical system for forming an image of an object on a surface of an image pickup device, said image pickup optical system comprising:

at least a rear optical unit on an image side of a pupil plane, said rear optical unit having a prism member which has at least three surfaces each decentered such that a whole of the surface is tilted with respect to an axial principal ray defined by a light ray emanating from a center of the object and passing through a center of a pupil to reach a center of the image, said at least three surfaces including a surface having a transmitting action, a curved surface with a rotationally symmetric surface configuration that has both reflecting and transmitting actions, and a curved surface with a rotationally asymmetric surface configuration that has a reflecting action and corrects rotationally asymmetric decentration aberrations caused by decentration.

[2] An image pickup optical system according to [1], wherein said curved surface with a rotationally symmetric surface configuration that has both reflecting and transmitting actions is formed from one of a totally reflecting surface and a semitransparent reflecting surface.

[3] An image pickup optical system according to [1], wherein each surface having a reflecting action is formed from a coated mirror surface.

[4] An image pickup optical system according to [1], wherein said surface having a reflecting action is disposed to face said surface having both reflecting and transmitting actions, and assuming that a direction in which said axial principal ray travels until it reaches an entrance surface of said optical system is defined as a Z-axis direction, and a Y-axis direction is taken in a plane of decentration of the decentered surfaces, and further an axis constituting an orthogonal coordinate system in combination with the Y- and Z-axes is defined as an X-axis, and further that said axial principal ray and a light ray which is parallel to said axial principal ray at a slight distance d in the Y-axis direction are made to enter said optical system from an entrance surface side thereof, and a sine of an angle formed between the two rays in the YZ-plane at an exit side of said optical system is denoted by NA'yi, and further that a value obtained by dividing said NA'yi by said distance d between said parallel rays, i.e. NA'yi/d, is defined as a power Py in the Y-axis direction of said optical system, and p is an optical path length for said axial principal ray from the entrance surface of said prism member to an exit surface of said prism member, the following condition is satisfied:

$$0.1 < p \times Py < 8 \qquad (13)$$

[5] An image pickup optical system according to any one of [2] to [4], wherein said prism member comprises three surfaces consisting of a first surface having a transmitting surface, a second surface having both reflecting and transmitting actions, and a third surface having a reflecting action, the first, second and third surfaces being disposed to face each other across a medium having a refractive index larger than 1 such that light from the object enters said prism member through the first surface and is reflected by the second surface and further reflected by the third surface so as to exit from said prism member through said second surface.

[6] An image pickup optical system according to [5], wherein said prism member comprises an integrally-formed unitized block.

[7] An image pickup optical system according to any one of [1] to [6], further comprising:
an infrared cutoff filter disposed in said optical system to cut off an infrared component of the object image formed by said optical system.

[8] An image pickup optical system according to any one of [1] to [6], wherein at least one of said reflecting surfaces is a back-coated mirror formed on a back of a wavelength selecting optical member which transmits or cuts off a specific wavelength.

[9] An image pickup optical system according to [8], wherein said wavelength selecting optical member has an infrared cutoff action.

[10] An image pickup optical system according to [6], wherein the medium of said prism member has an infrared cutoff action.

[11] An image pickup optical system according to [10], wherein the medium of said prism member satisfies the following condition (16):

$$a < 1 \qquad (16)$$

where a is a mole percentage of CuO contained in said prism member.

[12] An image pickup optical system according to [11], wherein the medium of said prism member satisfies the following condition (16)':

$$1 \times 10^{-5} < a < 1 \qquad (16)'$$

[13] An image pickup optical system according to any one of [1] to [12], wherein said reflecting surface having a rotationally asymmetric surface configuration is a plane-symmetry free-form surface having only one plane of symmetry.

[14] An image pickup optical system according to [13], wherein, assuming that the only one plane of symmetry of said plane-symmetry free-form surface is a YZ-plane, and a direction perpendicularly intersecting said plane is an X-axis direction, and further that Px1 and Px2 are powers in the X-axis direction in vicinities of intersections between said axial principal ray on the one hand and said first and second reflecting surfaces on the other, the following condition is satisfied:

$$|Px1| < |Px2| \qquad (17)$$

[15] An image pickup optical system according to [14], wherein the following condition is satisfied:

$$1 < |Px2/Px1| < 20 \qquad (18)$$

[16] An image pickup optical system according to [13], wherein, assuming that the only one plane of symmetry of said plane-symmetry free-form surface is a YZ-plane, and a direction perpendicularly intersecting said plane is an X-axis direction, and further that Px2 is a power in the X-axis direction in a vicinity of an intersection between said axial principal ray and said second reflecting surface, and Px3 is a power in the X-axis direction in a vicinity of an intersection between said axial principal ray and said second transmitting surface, the following condition is satisfied:

$$|Px3/Px2| < 0.5 \qquad (19)$$

[17] An image pickup optical system according to [13], wherein, assuming that the only one plane of symmetry of said plane-symmetry free-form surface is a YZ-plane, and a direction perpendicularly intersecting said plane is an X-axis direction, and further that DY is a difference between a value of a tangent of a line normal to said surface in the YZ-plane at a position where a principal ray at a maximum field angle in the X-axis direction impinges on said surface and a value of a tangent of a line normal to said surface in the YZ-plane at a position where said axial principal ray impinges on said surface, the following condition is satisfied:

$$0 \leq |DY| < 0.1 \qquad (20)$$

[18] An Image pickup optical system according to [13], wherein, assuming that a direction in which said axial principal ray travels until it reaches a first surface of said optical system is defined as a Z-axis direction, and the only one plane of symmetry of said plane-symmetry free-form surface is a YZ-plane, and further a direction perpendicularly intersecting said plane is an X-axis direction, and further that Cxn is a difference between a curvature in the X-axis direction of a portion of said surface at which a principal ray at a maximum field angle in a positive direction of the Y-axis impinges on said surface and a curvature in the X-axis direction of a portion of said surface at which a principal ray at a maximum field angle in a negative direction of the Y-axis impinges on said surface, and Pxn is a power in the X-axis direction of a portion of said surface at which said axial principal ray impinges on the surface, the following condition is satisfied:

$$0 \leq |Cxn/Pxn| < 10 \qquad (21)$$

[19] An image pickup optical system according to any one of [13] to [18], wherein at least one of the decentered surfaces of said prism member is decentered such that a plane containing a direction of decentration of the decentered surface is approximately coincident with said plane of symmetry.

[20] An image pickup optical system according to [19], wherein all the decentered surfaces of said prism member are formed such that directions of decentration of said decentered surfaces are in an identical plane, and the plane containing the directions of decentration is approximately coincident with said plane of symmetry.

[21] An image pickup optical system according to [18] or [19], wherein, assuming that a direction in which said axial principal ray travels until it reaches a first surface of said optical system is defined as a Z-axis direction, and a Y-axis direction is taken in a plane of decentration of the decentered surfaces, and further an axis constituting an orthogonal coordinate system in combination with the Y- and Z-axes is defined as an X-axis, and that said axial principal ray and a light ray which is parallel to said axial principal ray at a slight distance d in the X-axis direction are made to enter said optical system from an entrance surface side thereof, and a sine of an angle formed between the two rays in a plane perpendicular to a YZ-plane and containing said axial principal ray at an exit side of said optical system is denoted by NA'xi, and further that a value obtained by dividing said NA'xi by said distance d between said parallel rays, i.e. NA'xi/d, is defined as a power Px in the X-axis direction of said optical system, and Pxn is a power in the X-axis direction of a portion of said rotationally asymmetric surface at which said axial principal ray impinges on said surface, the following condition is satisfied:

$$0 < |Pxn/Px| < 100 \qquad (22)$$

[22] An image pickup optical system according to [21], which satisfies the following condition:

$$0.05 < |Pxn/Px| < 10 \qquad (22)'$$

[23] An image pickup optical system according to [18] or [19], wherein, assuming that a direction in which said axial principal ray travels until it reaches a first surface of said optical system is defined as a Z-axis direction, and a Y-axis direction is taken in a plane of decentration of the decentered surfaces, and further an axis constituting an orthogonal coordinate system in combination with the Y- and Z-axes is defined as an X-axis, and further that said axial principal ray and a light ray which is parallel to said axial principal ray at a slight distance d in the Y-axis direction are made to enter said optical system from an entrance surface side thereof, and a sine of an angle formed between the two rays in the YZ-plane at an exit side of said optical system is denoted by NA'yi, and further that a value obtained by dividing said NA'yi by said distance d between said parallel rays, i.e. NA'yi/d, is defined as a power Py in the Y-axis direction of said optical system, and Pyn is a power in the Y-axis direction of a portion of said rotationally asymmetric surface at which said axial principal ray impinges on said surface, the following condition is satisfied:

$$0 < |Pyn/Py| < 100 \qquad (23)$$

[24] An image pickup optical system according to [23], which satisfies the following condition:

$$0 < |Pyn/Py| < 10 \qquad (23)'$$

[25] An image pickup optical system according to [19] or [20], wherein, assuming that a direction in which said axial principal ray travels until it reaches a first surface of said optical system is defined as a Z-axis direction, and a Y-axis direction is taken in a plane of decentration of the decentered surfaces, and further an axis constituting an orthogonal coordinate system in combination with the Y- and Z-axes is defined as an X-axis, and further that said axial principal ray and a light ray which is parallel to said axial principal ray at a slight distance d in the Y-axis direction are made to enter said optical system from an entrance surface side thereof, and a sine of an angle formed between the two rays in the YZ-plane at an exit side of said optical system is denoted by NA'yi, and further that a value obtained by dividing said NA'yi by said distance d between said parallel rays, i.e. NA'yi/d, is defined as a power Py in the Y-axis direction of said optical system, and further that said axial principal ray and a light ray which is parallel to said axial principal ray at a slight distance d in the X-axis direction are made to enter said optical system from the entrance surface side thereof, and a sine of an angle formed between the two rays in a plane perpendicular to the YZ-plane and containing said axial principal ray at the exit side of said optical system is denoted by NA'xi, and further that a value obtained by dividing said NA'xi by said distance d between said parallel rays, i.e. NA'xi/d, is defined as a power Px in the X-axis direction of said optical system, the following condition is satisfied:

$$0.3 < |Px/Py| < 2 \qquad (24)$$

[26] An image pickup optical system according to [25], which satisfies the following condition:

$$0.8 < |Px/Py| < 1.2 \qquad (24)'$$

[27] An image pickup optical system according to any one of [1] to [26], wherein a transverse aberration is not more than 200 micrometers.

[28] An image pickup optical system according to any one of [1] to [26], wherein an image distortion is not more than 20%.

[29] An image pickup apparatus according to any one of [1] to [27], which has an image pickup device provided to capture the object image formed by said optical system.

[30] An image pickup apparatus according to [29], wherein said image pickup device is an electronic image pickup device which converts light received thereby into electrical information.

[31] An image pickup apparatus according to [30], which has observation means for observing the object image captured by said electronic image pickup device.

The above-described image pickup optical system and image pickup apparatus using it according to the third aspect of the present invention may be arranged, for example, as follows:

[1] An image pickup optical system for forming an image of an object on a surface of an image pickup device, wherein a pupil is disposed at any position between a first surface of said optical system that is closest to the object and a final surface of said optical system that is closest to the image, inclusive of the first surface and the final surface, said optical system having at least one reflecting surface decentered such that a whole of said surface is tilted with respect to an axial principal ray defined by a light ray emanating from a center of the object and passing through a center of the pupil to reach a center of the image, said reflecting surface having a rotationally asymmetric surface configuration that corrects rotationally asymmetric decentration aberrations caused by decentration, thereby reducing rotationally asymmetric aberrations of the image of said object.

[2] An image pickup optical system according to [1], wherein said reflecting surface is formed from one of a totally reflecting surface and a semitransparent reflecting surface so as to have both transmitting and reflecting actions.

[3] An image pickup optical system according to [1], wherein said reflecting surface is formed from a coated mirror surface.

[4] An image pickup optical system according to [1], which further has at least a second reflecting surface disposed to face said reflecting surface, and assuming that a direction in which said axial principal ray travels until it reaches a first surface of said optical system is defined as a Z-axis direction, and a Y-axis direction is taken in a plane of decentration of the decentered surface, and further an axis constituting an orthogonal coordinate system in combination with the Y- and Z-axes is defined as an X-axis, and further that said axial principal ray and a light ray which is parallel to said axial principal ray at a slight distance d in the Y-axis direction are made to enter said optical system from an entrance surface side thereof, and a sine of an angle formed between the two rays in the YZ-plane at an exit side of said optical system is denoted by NA'yi, and further that a value obtained by dividing said NA'yi by said distance d between said parallel rays, i.e. NA'yi/d, is defined as a power Py in the Y-axis direction of said optical system, and p is an optical path length from a point at which said axial principal ray enters a constituent element of said optical system disposed closest to said object and having said rotationally asymmetric surface to a point at which said axial principal ray exits from a constituent element of said optical system disposed closest to said image and having said rotationally asymmetric surface, the following condition is satisfied:

$$0.1 < p \times Py < 8 \tag{25}$$

[5] An image pickup optical system according to any one of [1] to [4], which has, in order from an object side toward an image side thereof, at least a first transmitting surface, a first reflecting surface, a second reflecting surface and a second transmitting surface, and said first reflecting surface and said second reflecting surfaces are each formed from a rotationally asymmetric surface configuration that corrects rotationally asymmetric decentration aberrations caused by decentration.

[6] An image pickup optical system according to [5], which has a front optical unit disposed on an object side of said pupil, said front optical unit having an optical surface.

[7] An image pickup optical system according to [5], wherein said first reflecting surface and said second transmitting surface are formed from an identical surface serving both as reflecting and transmitting surfaces.

[8] An image pickup optical system according to [7], wherein said axial principal ray is totally reflected by said first reflecting surface in said optical system and then pass through said first reflecting surface, whereby said second transmitting surface is also used as said first reflecting surface.

[9] An image pickup optical system according to [5], [7] or [8], wherein said first transmitting surface, said first reflecting surface, said second reflecting surface, and said second transmitting surface form optical surfaces of a prism member made of a medium having a refractive index (n) larger than 1 (n>1).

[10] An image pickup optical system according to [9], wherein said prism member comprises an integrally-formed unitized block.

[11] An image pickup optical system according to any one of [1] to [10], wherein an infrared cutoff filter is disposed in said optical system to cut off an infrared component of the object image formed by said optical system.

[12] An image pickup optical system according to any one of [1] to [10], wherein at least one of said reflecting surfaces having a rotationally asymmetric surface configuration is a back-coated mirror formed on a back of a wavelength selecting optical member which transmits or cuts off a specific wavelength.

[13] An image pickup optical system according to [12], wherein said wavelength selecting optical member has an infrared cutoff action.

[14] An image pickup optical system according to [9] or [10], wherein the medium of said prism member has an infrared cutoff action.

[15] An image pickup optical system according to [14], wherein the medium of said prism member satisfies the following condition (28):

$$a < 1 \tag{28}$$

where a is a mole percentage of CuO contained in said prism member.

[16] An image pickup optical system according to [15], wherein the medium of said prism member satisfies the following condition (28)':

$$1 \times 10^{-5} < a < 1 \tag{28)'}$$

[17] An image pickup optical system according to any one of [1] to [16], wherein at least one of said reflecting surfaces having a rotationally asymmetric surface configuration is a plane-symmetry free-form surface having only one plane of symmetry.

[18] An image pickup optical system according to [17], wherein, assuming that the only one plane of symmetry of said plane-symmetry free-form surface is a YZ-plane, and a direction perpendicularly intersecting said plane is an X-axis direction, and further that Px1 and Px2 are powers in the X-axis direction in vicinities of intersections between said axial principal ray on the one hand and said first and second reflecting surfaces on the other, the following condition is satisfied:

$$|Px1| < |Px2| \tag{29}$$

[19] An image pickup optical system according to [18], wherein the following condition is satisfied:

$$1 < |Px2/Px1| < 20 \tag{30}$$

[20] An image pickup optical system according to [17], wherein, assuming that the only one plane of symmetry of said plane-symmetry free-form surface is a YZ-plane, and a direction perpendicularly intersecting said plane is an X-axis direction, and further Px2 is a power in the X-axis direction in a vicinity of an intersection between said axial principal ray and said second reflecting surface, and further that said second transmitting surface is a plane-symmetry curved surface having at least one plane of symmetry, which is a YZ-plane, and a direction perpendicularly intersecting said plane is an X-axis direction, and further Px3 is a power in the X-axis direction in a vicinity of an intersection between said axial principal ray and said second transmitting surface, the following condition is satisfied:

$$|Px3/Px2|<0.5 \quad (31)$$

where if said second transmitting surface has a plurality or infinite number of planes of symmetry, a plane that forms a smallest angle with the only one plane of symmetry of said second reflecting surface among those planes is defined as a plane of symmetry of said second transmitting surface.

[21] An image pickup optical system according to [17], wherein, assuming that the only one plane of symmetry of said plane-symmetry free-form surface is a YZ-plane, and a direction perpendicularly intersecting said plane is an X-axis direction, and further that DY is a difference between a value of a tangent of a line normal to said surface in the YZ-plane at a position where a principal ray at a maximum field angle in the X-axis direction impinges on said surface and a value of a tangent of a line normal to said surface in the YZ-plane at a position where said axial principal ray impinges on said surface, the following condition is satisfied:

$$0 \leq |DY| < 0.1 \quad (32)$$

[22] An image pickup optical system according to [17], wherein, assuming that a direction in which said axial principal ray travels until it reaches a first surface of said optical system is defined as a Z-axis direction, and the only one plane of symmetry of said plane-symmetry free-form surface is a YZ-plane, and further a direction perpendicularly intersecting said plane is an X-axis direction, and further that Cxn is a difference between a curvature in the X-axis direction of a portion of said surface at which a principal ray at a maximum field angle in a positive direction of the Y-axis impinges on said surface and a curvature in the X-axis direction of a portion of said surface at which a principal ray at a maximum field angle in a negative direction of the Y-axis impinges on said surface, and Pxn is a power in the X-axis direction of a portion of said surface at which said axial principal ray impinges on the surface, the following condition is satisfied:

$$0 \leq |Cxn/Pxn| < 10 \quad (33)$$

[23] An image pickup optical system according to any one of [17] to [22], wherein at least one of the decentered surfaces of said optical system is decentered such that a plane containing a direction of decentration of the decentered surface is approximately coincident with said plane of symmetry.

[24] An image pickup optical system according to [23], wherein all the decentered surfaces of said optical system are formed such that directions of decentration of said decentered surfaces are in an identical plane, and the plane containing the directions of decentration is approximately coincident with said plane of symmetry.

[25] An image pickup optical system according to [23] or [24], wherein, assuming that a direction in which said axial principal ray travels until it reaches a first surface of said optical system is defined as a Z-axis direction, and a Y-axis direction is taken in a plane of decentration of the decentered surfaces, and further an axis constituting an orthogonal coordinate system in combination with the Y- and Z-axes is defined as an X-axis, and that said axial principal ray and a light ray which is parallel to said axial principal ray at a slight distance d in the X-axis direction are made to enter said optical system from an entrance surface side thereof, and a sine of an angle formed between the two rays in a plane perpendicular to a YZ-plane and containing said axial principal ray at an exit side of said optical system is denoted by NA'xi, and further that a value obtained by dividing said NA'xi by said distance d between said parallel rays, i.e. NA'xi/d, is defined as a power Px in the X-axis direction of said optical system, and Pxn is a power in the X-axis direction of a portion of said rotationally asymmetric surface at which said axial principal ray impinges on said surface, the following condition is satisfied:

$$0 < |Pxn/Px| < 100 \quad (34)$$

[26] An image pickup optical system according to [25], which satisfies the following condition:

$$0.05 < |Pxn/Px| < 10 \quad (34)'$$

[27] An image pickup optical system according to [23] or [24], wherein, assuming that a direction in which said axial principal ray travels until it reaches a first surface of said optical system is defined as a Z-axis direction, and a Y-axis direction is taken in a plane of decentration of the decentered surfaces, and further an axis constituting an orthogonal coordinate system in combination with the Y- and Z-axes is defined as an X-axis, and further that said axial principal ray and a light ray which is parallel to said axial principal ray at a slight distance d in the Y-axis direction are made to enter said optical system from an entrance surface side thereof, and a sine of an angle formed between the two rays in the YZ-plane at an exit side of said optical system is denoted by NA'yi, and further that a value obtained by dividing said NA'yi by said distance d between said parallel rays, i.e. NA'yi/d, is defined as a power Py in the Y-axis direction of said optical system, and Pyn is a power in the Y-axis direction of a portion of said rotationally asymmetric surface at which said axial principal ray impinges on said surface, the following condition is satisfied:

$$0 < |Pyn/Py| < 100 \quad (35)$$

[28] An image pickup optical system according to [27], which satisfies the following condition:

$$0 < |Pyn/Py| < 10 \quad (35)'$$

[29] An image pickup optical system according to [23] or [24], wherein, assuming that a direction in which said axial principal ray travels until it reaches a first surface of said optical system is defined as a Z-axis direction, and a Y-axis direction is taken in a plane of decentration of the decentered surfaces, and further an axis constituting an orthogonal coordinate system in combination with the Y- and Z-axes is defined as an X-axis, and further that said axial principal ray and a light ray which is parallel to said axial principal ray at a slight distance d in the Y-axis direction are made to enter said optical system from an entrance surface side thereof, and a sine of an angle formed between the two rays in the YZ-plane at an exit side of said optical system is denoted by NA'yi, and further that a value obtained by dividing said NA'yi by said distance d between said parallel rays, i.e. NA'yi/d, is defined as a power Py in the Y-axis direction of said optical system, and further that said axial principal ray and a light ray which is parallel to said axial principal ray at a slight distance d in the X-axis direction are made to enter said optical system from the entrance surface side thereof, and a sine of an angle formed between the two rays in a plane perpendicular to the YZ-plane and containing said axial principal ray at the exit side of said optical system is denoted by NA'xi, and further that a value obtained by dividing said NA'xi by said distance d between said parallel rays, i.e. NA'xi/d, is defined as a power Px in the X-axis direction of said optical system, the following condition is satisfied:

$$0.3 < |Px/Py| < 2 \qquad (36)$$

[30] An image pickup optical system according to [29], which satisfies the following condition:

$$0.8 < |Px/Py| < 1.2 \qquad (36)'$$

[31] An image pickup optical system according to any one of [1] to [30], wherein a transverse aberration is not more than 200 micrometers.

[32] An image pickup optical system according to any one of [1] to [30], wherein an image distortion is not more than 20%.

[33] An image pickup apparatus according to any one of [1] to [32], which has an image pickup device provided to capture the object image formed by said optical system.

[34] An image pickup apparatus according to [33], wherein said image pickup device is an electronic image pickup device which converts light received thereby into electrical information.

[35] An image pickup apparatus according to [34], which has observation means for observing the object image captured by said electronic image pickup device.

As will be clear from the foregoing description, it is possible according to the present invention to provide an image pickup optical system which is compact and has minimal aberrations in comparison to rotationally symmetric transmission optical systems.

What we claim is:

1. An image pickup optical system, for forming an image of an object on a surface of an image pickup device, said image pickup optical system comprising:

at least a rear optical unit on an image side of a pupil plane, said rear optical unit having at least one reflecting surface decentered such that a whole of said surface is tilted with respect to an axial principal ray defined by a light ray emanating from a center of the object and passing through a center of a pupil to reach a center of the image, and said reflecting surface having a rotationally asymmetric surface configuration that corrects rotationally asymmetric decentration aberrations caused by decentration, thereby reducing rotationally asymmetric aberrations of said image of the object, wherein said rear optical unit further has at least a second reflecting surface disposed to face said reflecting surface, and assuming that a direction in which said axial principal ray travels until it reaches a first surface of said optical system is defined as a Z-axis direction, and a Y-axis direction is taken in a plane of decentration of the decentered surface, and further an axis constituting an orthogonal coordinate system in combination with the Y- and Z-axes is defined as an X-axis, and further that said axial principal ray and a light ray which is parallel to said axial principal ray at a slight distance d in the Y-axis direction are made to enter said optical system from an entrance surface side thereof, and a sine of an angle formed between the two rays in the YZ-plane at an exit side of said optical system is denoted by NA'yi, and further that a value obtained by dividing said NA'yi by said distance d between said parallel rays, i.e. NA'yi/d, is defined as a power Py in the Y-axis direction of said optical system, and p is an optical path length from a point at which said axial principal ray enters a constituent element of said optical system disposed closest to said object and having said rotationally asymmetric surface to a point at which said axial principal ray exits from a constituent element of said optical system disposed closest to said image and having said rotationally asymmetric surface, the following condition is satisfied:

$$0.1 < p \times Py < 8. \qquad (1)$$

2. An image pickup optical system for forming an image of an object on a surface of an image pickup device, said image pickup optical system comprising:

at least a rear optical unit on an image side of a pupil plane, said rear optical unit having at least one reflecting surface decentered such that a whole of said surface is tilted with respect to an axial principal ray defined by a light ray emanating from a center of the object and passing through a center of a pupil to reach a center of the image, and said reflecting surface having a rotationally asymmetric surface configuration that corrects rotationally asymmetric decentration aberrations caused by decentration, thereby reducing rotationally asymmetric aberrations of said image of the object;

wherein said reflecting surface is formed from one of a totally reflecting surface and a semitransparent reflecting surface so as to have both transmitting and reflecting actions, wherein said rear optical unit has, in order from an object side toward an image side of said rear optical unit, at least a first transmitting surface, a first reflecting surface, a second reflecting surface and a second transmitting surface, and said first reflecting surface and said second reflecting surfaces are each formed from a rotationally asymmetric surface configuration that corrects rotationally asymmetric decentration aberrations caused by decentration, said optical system further comprising a front optical unit disposed on an object side of said pupil, said front optical unit having an optical surface, wherein said front optical unit includes only a transmitting surface, not including a reflecting surface, wherein said front optical unit includes an optical element that bends said axial pricipal ray, wherein said optical element includes a lens decentered with respect to said axial principal ray, and wherein said decentered lens is a positive lens decentered by tilting.

3. An image pickup optical system for forming an image of an object on a surface of an image pickup device, said image pickup optical system comprising:

at least a rear optical unit on an image side of a pupil plane, said rear optical unit having at least one reflecting surface decentered such that a whole of said surface is tilted with respect to an axial principal ray defined by a light ray emanating from a center of the object and passing through a center of a pupil to reach a center of the image, and said reflecting surface having a rotationally asymmetric surface configuration that corrects rotationally asymmetric decentration aberrations caused by decentration, thereby reducing rotationally asymmetric aberrations of said image of the object, wherein said reflecting surface is formed from one of a totally reflecting surface and a semitransparent reflecting surface so as to have both transmitting and reflecting actions, wherein said rear optical unit has, in order from an object side toward an image side of said rear optical unit, at least a first transmitting surface, a first reflecting surface, a second reflecting surface and a second transmitting surface, and said first reflecting surface and said second reflecting surfaces are each formed from a rotationally asymmetric surface configuration that corrects rotationally asymmetric decentration aberrations caused by decentration said optical system further comprising:
  a front optical unit disposed on an object side of said pupil, said front optical unit having an optical surface,
  wherein said front optical unit has at least one optical element whose optical power is approximately zero (including a powerless lens).

4. An image pickup optical system for forming an image of an object on a surface of an image pickup device, said image pickup optical system comprising:
  at least a rear optical unit on an image side of a pupil plane,
  said rear optical unit having at least one reflecting surface decentered such that a whole of said surface is tilted with respect to an axial principal ray defined by a light ray emanating from a center of the object and passing through a center of a pupil to reach a center of the image, and
  said reflecting surface having a rotationally asymmetric surface configuration that corrects rotationally asymmetric decentration aberrations caused by decentration, thereby reducing rotationally asymmetric aberrations of said image of the object,
  wherein said reflecting surface is formed from one of a totally reflecting surface and a semitransparent reflecting surface so as to have both transmitting and reflecting actions,
  wherein said rear optical unit has, in order from an object side toward an image side of said rear optical unit, at least a first transmitting surface, a first reflecting surface, a second reflecting surface and a second transmitting surface, and said first reflecting surface and said second reflecting surfaces are each formed from a rotationally asymmetric surface configuration that corrects rotationally asymmetric decentration aberrations caused by decentration,
  said optical system further comprising:
    a front optical unit disposed on an object side of said pupil, said front optical unit having an optical surface,
    wherein said front optical unit includes only a transmitting surface, not including a reflecting surface, and
    wherein said front optical unit includes an optical element that bends said axial principal ray,
  said optical system satisfying the following condition:

$$0.1° < \Delta\theta < 45° \quad (2)$$

where $\Delta\theta$ is an amount of change in angle of said axial principal ray introduced between entrance into and exit from said front optical unit.

5. An image pickup optical system for forming an image of an object on a surface of an image pickup device, said image pickup optical system comprising:
  at least a rear optical unit on an image side of a pupil plane,
  said rear optical unit having at least one reflecting surface decentered such that a whole of said surface is tilted with respect to an axial principal ray defined by a light ray emanating from a center of the object and passing through a center of a pupil to reach a center of the image, and
  said reflecting surface having a rotationally asymmetric surface configuration that corrects rotationally asymmetric decentration aberrations caused by decentration, thereby reducing rotationally asymmetric aberrations of said image of the object,
  wherein said reflecting surface is formed from one of a totally reflecting surface and a semitransparent reflecting surface so as to have both transmitting and reflecting actions,
  wherein said rear optical unit has, in order from an object side toward an image side of said rear optical unit, at least a first transmitting surface, a first reflecting surface, a second reflecting surface and a second transmitting surface, and said first reflecting surface and said second reflecting surfaces are each formed from a rotationally asymmetric surface configuration that corrects rotationally asymmetric decentration aberrations caused by decentration,
  said optical system further comprising:
    a front optical unit disposed on an object side of said pupil, said front optical unit having an optical surface,
    wherein said front optical unit includes only a transmitting surface, not including a reflecting surface, and
    wherein said front optical unit includes an optical element that bends said axial principal ray,
  said optical system satisfying the following condition:

$$0 < \Delta h \times Py < 1.0 \quad (3)$$

where $\Delta h$ is an amount of change in position of said axial principal ray introduced between entrance into and exit from said front optical unit, and Py is a power in the Y-axis direction of said optical system defined such that, assuming that a direction in which said axial principal ray travels until it reaches a first surface of said optical system is defined as a Z-axis direction, and a Y-axis direction is taken in a plane of decentration of the decentered surfaces, and further an axis constituting an orthogonal coordinate system in combination with the Y- and Z-axes is defined as an X-axis, and further that said axial principal ray and a light ray which is parallel to said axial principal ray at a slight distance d in the Y-axis direction are made to enter said optical system from an entrance surface side thereof, and a sine of an angle formed between the two rays in the YZ-plane at an exit side of said optical system is denoted by NA'yi, and further that a value obtained by dividing said NA'yi by said distance d between said parallel rays, i.e. NA'yi/d, is defined as a power Py in the Y-axis direction of said optical system.

6. An image pickup optical system according to claim 1 or 2, further comprising:
  an infrared cutoff filter disposed in said optical system to cut off an infrared component of the object image formed by said optical system.

7. An image pickup optical system according to claim 1 or 2, wherein at least one of said reflecting surfaces having said rotationally asymmetric surface configuration is a back-coated mirror formed on a back of a wavelength selecting optical member which transmits or cuts off a specific wavelength.

8. An image pickup optical system according to claim 7, wherein said wavelength selecting optical member has an infrared cutoff action.

9. An image pickup optical system for forming an image of an object on a surface of an image pickup device, said image pickup optical system comprising:

at least a rear optical unit on an image side of a pupil plane, said rear optical unit having at least one reflecting surface decentered such that a whole of said surface is tilted with respect to an axial principal ray defined by a light ray emanating from a center of the object and passing through a center of a pupil to reach a center of the image, and said reflecting surface having a rotationally asymmetric surface configuration that corrects rotationally asymmetric decentration aberrations caused by decentration, thereby reducing rotationally asymmetric aberrations of said image of the object, wherein said reflecting surface is formed from one of a totally reflecting surface and a semitransparent reflecting surface so as to have both transmitting and reflecting actions, wherein said rear optical unit has, in order from an object side toward an image side of said rear optical unit, at least a first transmitting surface, a first reflecting surface, a second reflecting surface and a second transmitting surface, and said first reflecting surface and said second reflecting surfaces are each formed from a rotationally asymmetric surface configuration that corrects rotationally asymmetric decentration aberrations caused by decentration, wherein said first reflecting surface and said second transmitting surface are formed from an identical surface serving both as reflecting and transmitting surfaces, wherein said first transmitting surface, said first reflecting surface, said second reflecting surface, and said second transmitting surface form optical surfaces of a prism member made of a medium having a refractive index (n) larger than 1 (n>1), wherein said prism member comprises an integrally-formed unitized block, and wherein the medium of said prism member has an infrared cutoff action.

10. An image pickup optical system according to claim 9, wherein the medium of said prism member satisfies the following condition (4):

$$a<1 \tag{4}$$

where a is a mole percentage of CuO contained in said prism member.

11. An image pickup optical system according to claim 10, wherein the medium of said prism member satisfies the following condition (4)':

$$1 \times 10^{-5} < a < 1. \tag{4}'$$

12. An image pickup optical system according to claim 1 or 2, wherein at least one of said reflecting surfaces having said rotationally asymmetric surface configuration is a plane-symmetry free-form surface having only one plane of symmetry.

13. An image pickup optical system according to claim 12, wherein, assuming that the only one plane of symmetry of said plane-symmetry free-form surface is a YZ-plane, and a direction perpendicularly intersecting said plane is an X-axis direction, and further that Px1 and Px2 are powers in the X-axis direction in vicinities of intersections between said axial principal ray on the one hand and said first and second reflecting surfaces on the other, the following condition is satisfied:

$$|Px1|<|Px2|. \tag{5}$$

14. An image pickup optical system according to claim 13, wherein the following condition is satisfied:

$$1<|Px2/Px1|<20. \tag{6}$$

15. An image pickup optical system according to claim 12, wherein, assuming that the only one plane of symmetry of said plane-symmetry free-form surface is a YZ-plane, and a direction perpendicularly intersecting said plane is an X-axis direction, and further Px2 is a power in the X-axis direction in a vicinity of an intersection between said axial principal ray and said second reflecting surface, and further that said second transmitting surface is a plane-symmetry curved surface having at least one plane of symmetry, which is a YZ-plane, and a direction perpendicularly intersecting said plane is an X-axis direction, and further Px3 is a power in the X-axis direction in a vicinity of an intersection between said axial principal ray and said second transmitting surface, the following condition is satisfied:

$$|Px3/Px2|<0.5 \tag{7}$$

where if said second transmitting surface has a plurality or infinite number of planes of symmetry, a plane that forms a smallest angle with the only one plane of symmetry of said second reflecting surface among those planes is defined as a plane of symmetry of said second transmitting surface.

16. An image pickup optical system according to claim 12, wherein, assuming that the only one plane of symmetry of said plane-symmetry free-form surface is a YZ-plane, and a direction perpendicularly intersecting said plane is an X-axis direction, and further that DY is a difference between a value of a tangent of a line normal to said surface in the YZ-plane at a position where a principal ray at a maximum field angle in the X-axis direction impinges on said surface and a value of a tangent of a line normal to said surface in the YZ-plane at a position where said axial principal ray impinges on said surface, the following condition is satisfied:

$$0 \leq |DY|<0.1. \tag{8}$$

17. An image pickup optical system according to claim 12, wherein, assuming that a direction in which said axial principal ray travels until it reaches a first surface of said optical system is defined as a Z-axis direction, and the only one plane of symmetry of said plane-symmetry free-form surface is a YZ-plane, and further a direction perpendicularly intersecting said plane is an X-axis direction, and further that Cxn is a difference between a curvature in the X-axis direction of a portion of said surface at which a principal ray at a maximum field angle in positive direction of the Y-axis impinges on said surface and a curvature in the X-axis direction of a portion of said surface at which a principal ray at a maximum field angle in a negative direction of the Y-axis impinges on said surface, and Pxn is a power in the X-axis direction of a portion of said surface at which said axial principal ray impinges on said surface, the following condition is satisfied:

$$0 \leq |Cxn/Pxn| < 10. \qquad (9)$$

18. An image pickup optical system according to claim 12, wherein at least one of the decentered surfaces of said optical system is decentered such that a plane containing a direction of decentration of the decentered surface is approximately coincident with said plane of symmetry.

19. An image pickup optical system according to claim 18, wherein all the decentered surfaces of said optical system are formed such that directions of decentration of said decentered surfaces are in an identical plane, and the plane containing the directions of decentration is approximately coincident with said plane of symmetry.

20. An image pickup optical system according to claim 18, wherein, assuming that a direction in which said axial principal ray travels until it reaches a first surface of said optical system is defined as a Z-axis direction, and a Y-axis direction is taken in a plane of decentration of the decentered surfaces, and further an axis constituting an orthogonal coordinate system in combination with the Y- and Z-axes is defined as an X-axis, and that said axial principal ray and a light ray which is parallel to said axial principal ray at a slight distance d in the X-axis direction are made to enter said optical system from an entrance surface side thereof, and a sine of an angle formed between the two rays in a plane perpendicular to a YZ-plane and containing said axial principal ray at an exit side of said optical system is denoted by NA'xi, and further that a value obtained by dividing said NA'xi by said distance d between said parallel rays, i.e. NA'xi/d, is defined as a power Px in the X-axis direction of said optical system, and Pxn is a power in the X-axis direction of a portion of said rotationally asymmetric surface at which said axial principal ray impinges on said surface, the following condition is satisfied:

$$0 < |Pxn/Px| < 100. \qquad (10)$$

21. An image pickup optical system according to claim 20, which satisfies the following condition:

$$0.05 < |Pxn/Px| < 10. \qquad (10)'$$

22. An image pickup optical system according to claim 18, wherein, assuming that a direction in which said axial principal ray travels until it reaches a first surface of said optical system is defined as a Z-axis direction, and a Y-axis direction is taken in a plane of decentration of the decentered surfaces, and further an axis constituting an orthogonal coordinate system in combination with the Y- and Z-axes is defined as an X-axis, and further that said axial principal ray and a light ray which is parallel to said axial principal ray at a slight distance d in the Y-axis direction are made to enter said optical system from an entrance surface side thereof, and a sine of an angle formed between the two rays in the YZ-plane at an exit side of said optical system is denoted by NA'yi, and further that a value obtained by dividing said NA'yi by said distance d between said parallel rays, i.e. NA'yi/d, is defined as a power Py in the Y-axis direction of said optical system, and Pyn is a power in the Y-axis direction of a portion of said rotationally asymmetric surface at which said axial principal ray impinges on said surface, the following condition is satisfied:

$$0 < |Pyn/Py| < 100. \qquad (11)$$

23. An image pickup optical system according to claim 22, which satisfies the following condition:

$$0 < |Pyn/Py| < 10. \qquad (11)'$$

24. An image pickup optical system according to claim 18, wherein, assuming that a direction in which said axial principal ray travels until it reaches a first surface of said optical system is defined as a Z-axis direction, and a Y-axis direction is taken in a plane of decentration of the decentered surfaces, and further an axis constituting an orthogonal coordinate system in combination with the Y- and Z-axes is defined as an X-axis, and further that said axial principal ray and a light ray which is parallel to said axial principal ray at a slight distance d in the Y-axis direction are made to enter said optical system from an entrance surface side thereof, and a sine of an angle formed between the two rays in the YZ-plane at an exit side of said optical system is denoted by NA'yi, and further that a value obtained by dividing said NA'yi by said distance d between said parallel rays, i.e. NA'yi/d, is defined as a power Py in the Y-axis direction of said optical system, and further that said axial principal ray and a light ray which is parallel to said axial principal ray at a slight distance d in the X-axis direction are made to enter said optical system from the entrance surface side thereof, and a sine of an angle formed between the two rays in a plane perpendicular to the YZ-plane and containing said axial principal ray at the exit side of said optical system is denoted by NA'xi, and further that a value obtained by dividing said NA'xi by said distance d between said parallel rays, i.e. NA'xi/d, is defined as a power Px in the X-axis direction of said optical system, the following condition is satisfied:

$$0.3 < |Px/Py| < 2. \qquad (12)$$

25. An image pickup optical system according to claim 24, which satisfies the following condition:

$$0.8 < |Px/Py| < 1.2. \qquad (12)'$$

26. An image pickup optical system according to claim 1 or 2, wherein a transverse aberration is not more than 200 micrometers.

27. An image pickup optical system according to claim 1 or 2, wherein an image distortion is not more than 20%.

28. An image pickup apparatus according to claim 1 or 2, which has an image pickup device provided to capture the object image formed by said optical system.

29. An image pickup apparatus according to claim 28, wherein said image pickup device is an electronic image pickup device which converts light received thereby into electrical information.

30. An image pickup apparatus according to claim 29, which has observation means for observing the object image captured by said electronic image pickup device.

* * * * *